(12) United States Patent
Shirahata et al.

(10) Patent No.: US 11,625,517 B2
(45) Date of Patent: Apr. 11, 2023

(54) INFORMATION PROCESSING METHOD, AND INFORMATION PROCESSING APPARATUS

(71) Applicant: FUJITSU LIMITED, Kawasaki (JP)

(72) Inventors: Koichi Shirahata, Yokohama (JP); Amir Haderbache, Kawasaki (JP); Yasumoto Tomita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 377 days.

(21) Appl. No.: 16/928,049

(22) Filed: Jul. 14, 2020

(65) Prior Publication Data
US 2021/0027004 A1    Jan. 28, 2021

(30) Foreign Application Priority Data

Jul. 22, 2019 (JP) .............................. JP2019-134863

(51) Int. Cl.
*G06F 30/27* (2020.01)
*G06N 20/00* (2019.01)
*G06F 9/54* (2006.01)
*G06N 3/08* (2023.01)

(52) U.S. Cl.
CPC .............. *G06F 30/27* (2020.01); *G06F 9/544* (2013.01); *G06N 20/00* (2019.01); *G06N 3/08* (2013.01)

(58) Field of Classification Search
CPC ...... G06F 30/27; G06F 9/544; G06F 2111/10; G06F 30/20; G06F 17/11; G06F 9/54; G06N 20/00; G06N 3/08; G06Q 10/04
See application file for complete search history.

(56) References Cited

U.S. PATENT DOCUMENTS

2017/0185707 A1    6/2017    Rao et al.

FOREIGN PATENT DOCUMENTS

| JP | 2000-339179 A | 12/2000 |
| JP | 2003-162517 A | 6/2003 |
| JP | 2016-146139 A | 8/2016 |
| JP | 2017-123160 A | 7/2017 |

OTHER PUBLICATIONS

Wang, Tingyu et al., "Inexact Krylov iterations and relaxation strategies with fast-multipole boundary element method", XP055938968, pp. 1-22, Oct. 1, 2016, Retrieved from the Internet:URL:https://arxiv.org/pdf/1506.05957.pdf [retrieved on Jul. 6, 2022].

(Continued)

*Primary Examiner* — Roy Y Yi
*Assistant Examiner* — Geoffrey T Evans
(74) *Attorney, Agent, or Firm* — Fujitsu Patent Center

(57) ABSTRACT

An information processing method includes executing a first process of performing a non-linear analysis by iterating a linear analysis, and executing a second process of predicting a residual threshold to be used for determination of convergence of the linear analysis by a prediction model, based on a residual transition and calculation time for each iteration of the linear analysis obtained for each residual threshold using a plurality of experimental values by the first process. The information processing method further includes performing passage of data between the first process and the second process through an inter-process communication using a shared memory set in a memory.

7 Claims, 45 Drawing Sheets

(56) References Cited

OTHER PUBLICATIONS

European Office Action dated Jul. 12, 2022 for corresponding European Patent Application No. 20185931.1, 8 pages. * Please note D1-D8 cited herewith, were previously cited in an IDS filed on Jan. 22, 2021 and Jul. 14, 2020.*

Haderbache, Amir et al., "Acceleration of Structural Analysis Simulations using CNN-based Auto-Tuning of Solver Tolerance", 2020 IEEE International Parallel and Distributed Processing Symposium Workshops (IPDPSW), pp. 777-786, May 18, 2020, [retrieved on Jul. 27, 2020], XP33799426.

Kadupitiya, JCS et al., "Machine Learning for Parameter Auto-tuning in Molecular Dynamics Simulations: Efficient Dynamics of Ions near Polarizable Nanoparticles", Technical Report, Indiana University, pp. 1-15, Nov. 2018 Retrieved from the Internet:URL:http://dsc.soic.indiana.edu/publications/Manuscript.IJHPCA.Nov2018. pdf [retrieved on Dec. 23, 2020], XP55762470.

Fox, Geoffrey et al., "Learning Everywhere: Pervasive Machine Learning for Effective High-Performance Computation", 2019 IEEE International Parallel and Distributed Processing Symposium Workshops (IPDPSW), pp. 422-429, May 20, 2019, [retrieved on Jul. 26, 2019], XP33583429.

Stornaiuolo, L. et al., "FIDA: A Framework to Automatically Integrate FPGA Kernels Within Data-Science Applications", 2018 IEEE International Parallel and Distributed Processing Symposium Workshops (IPDPSW), pp. 198-201, May 21, 2018, [retrieved on Aug. 3, 2018], XP33379815.

Haderbache, Amir et al., "Spark as Data Supplier for MPI Deep Learning Processes", IPSJ SIG Technical Report, vol. 2016-HPC-156, No. 11, pp. 1-9, Sep. 16, 2016, XP55762473.

Anonymous, "Building a Scalable and Language Agnostic Data Processing Pipeline", Turbolent, pp. 1-11, Jan. 15, 2019, Retrieved from the Internet:URL:https://turbolent.com/data-processing-pipeline.html [retrieved on Dec. 23, 2020], XP55762476.

Anonymous, "Turbolent Posts", Internet Archive record of Turbolent Posts webpage, 1 page, Jan. 15, 2019 Retrieved from the Internet:URL:https://web.archive.org/web/20190115233113id_/https://turbolent.com/ [retrieved on Dec. 23, 2020], XP55762477.

Anonymous, "What is the best approach to let C# and Python communicate for this machine learning task?", Stack Overflow, pp. 1-3, 2018, Retrieved from the Internet:URL:https://stackoverflow.com/questions/49017084/what-is-thebest-approach-to-let-c-sharp-and-python-communicate-for-thismachine, [retrieved on Dec. 23, 2020], XP55762475.

Extended European Search Report dated Jan. 18, 2021 for corresponding European Patent Application No. 20185931.1, 11 pages.

FIG. 16A

STATE OF SHARED MEMORY IMMEDIATELY AFTER SIMULATION HAS BEEN ITERATED 4 TIMES

| #nonlin_iter | #lin_iter | nonlin_data | lin_data | empty cells |
|---|---|---|---|---|
| 4 | 12 | | | |

STATE OF MACHINE LEARNING

TIMING: 2
CURRENT #nonlin_iter : 2
CURRENT #lin_iter : 6
NEW ADJUSTMENT REQUEST? →YES

4=2+2 AND 12 != 6

FIG. 16B

STATE IN WHICH DATA HAS BEEN WRITTEN IN SIMULATION BUT COUNTER HAS NOT BEEN UPDATED

| 4 | 12 | | | |
|---|---|---|---|---|

CURRENT #nonlin_iter : 4
CURRENT #lin_iter : 12
NEW ADJUSTMENT REQUEST? →NO

4 != 4+2 AND 12 == 12

FIG. 16C

STATE IN WHICH AFTER COMPLETION OF WRITING OF DATA, SIMULATION HAS STORED COUNTER IN SHARED MEMORY

| 6 | 16 | | | |
|---|---|---|---|---|

CURRENT #nonlin_iter : 4
CURRENT #lin_iter : 12
NEW ADJUSTMENT REQUEST? →YES

6=4+2 AND 16 != 12

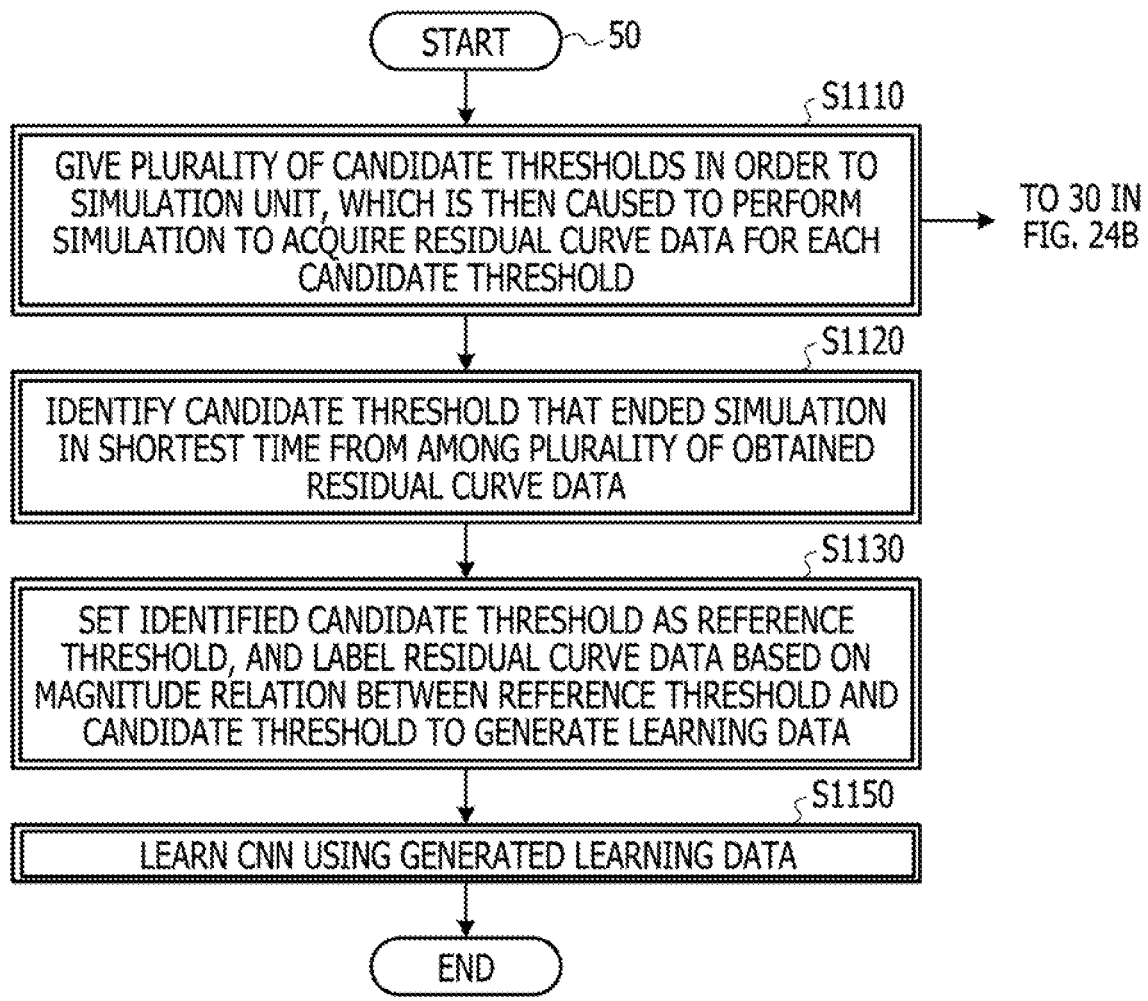

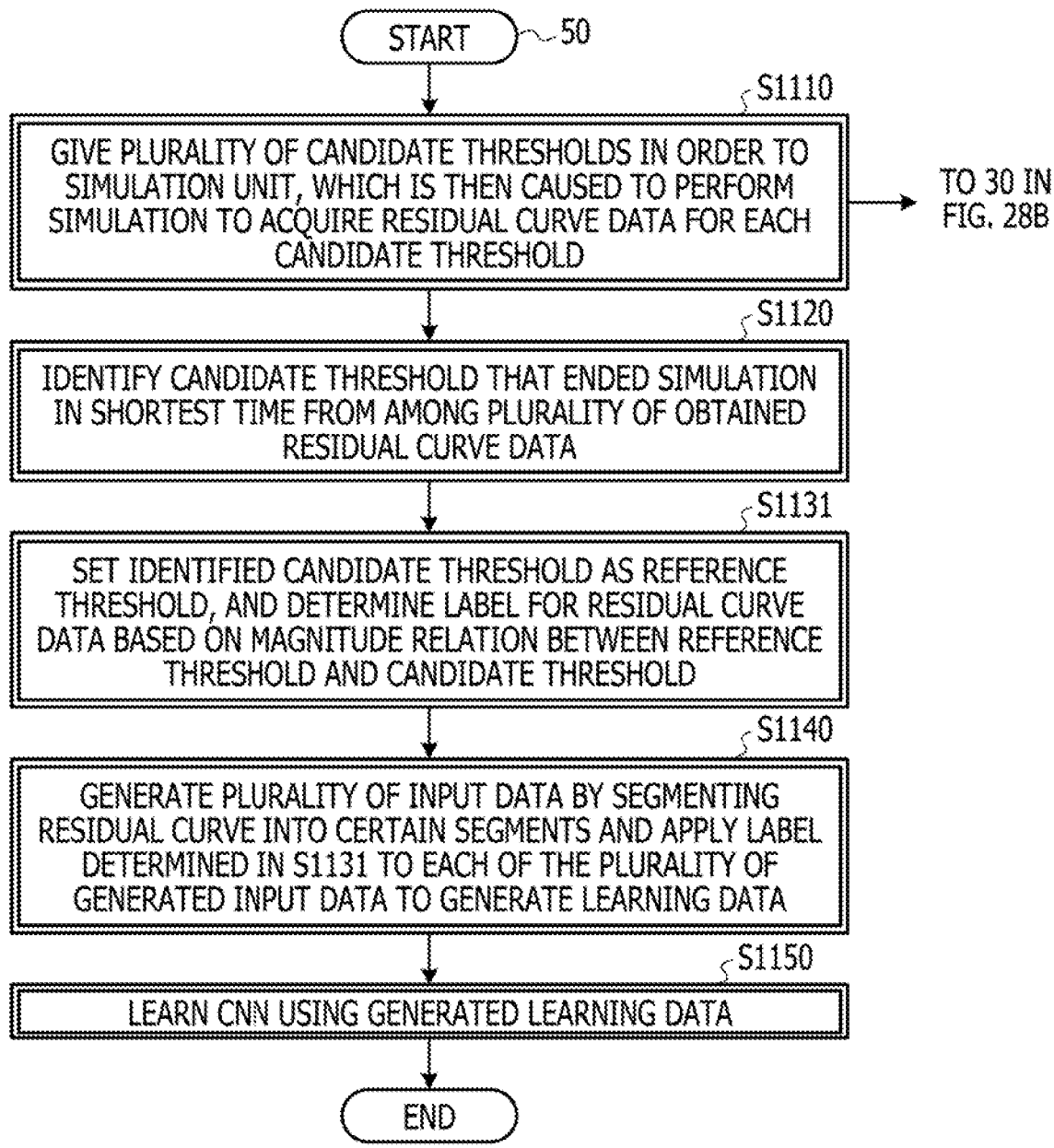

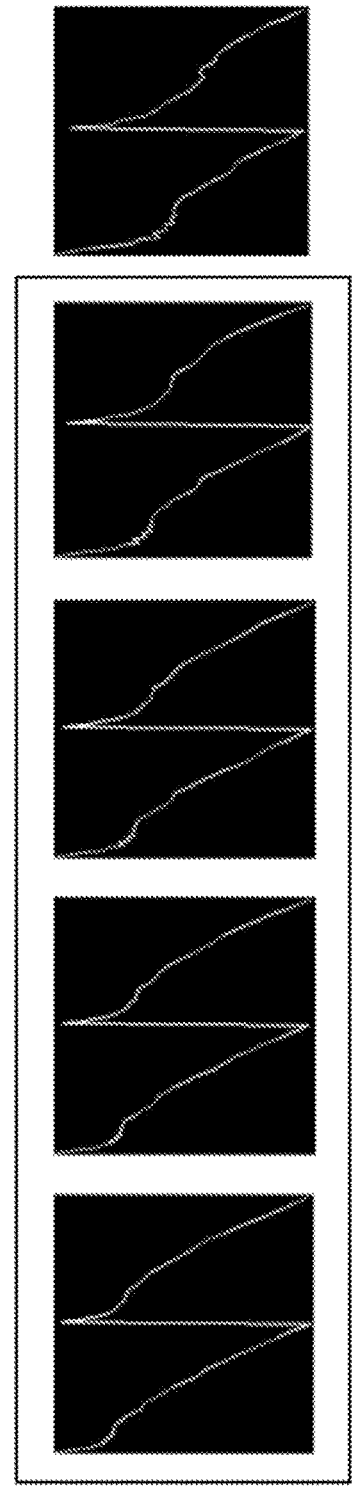
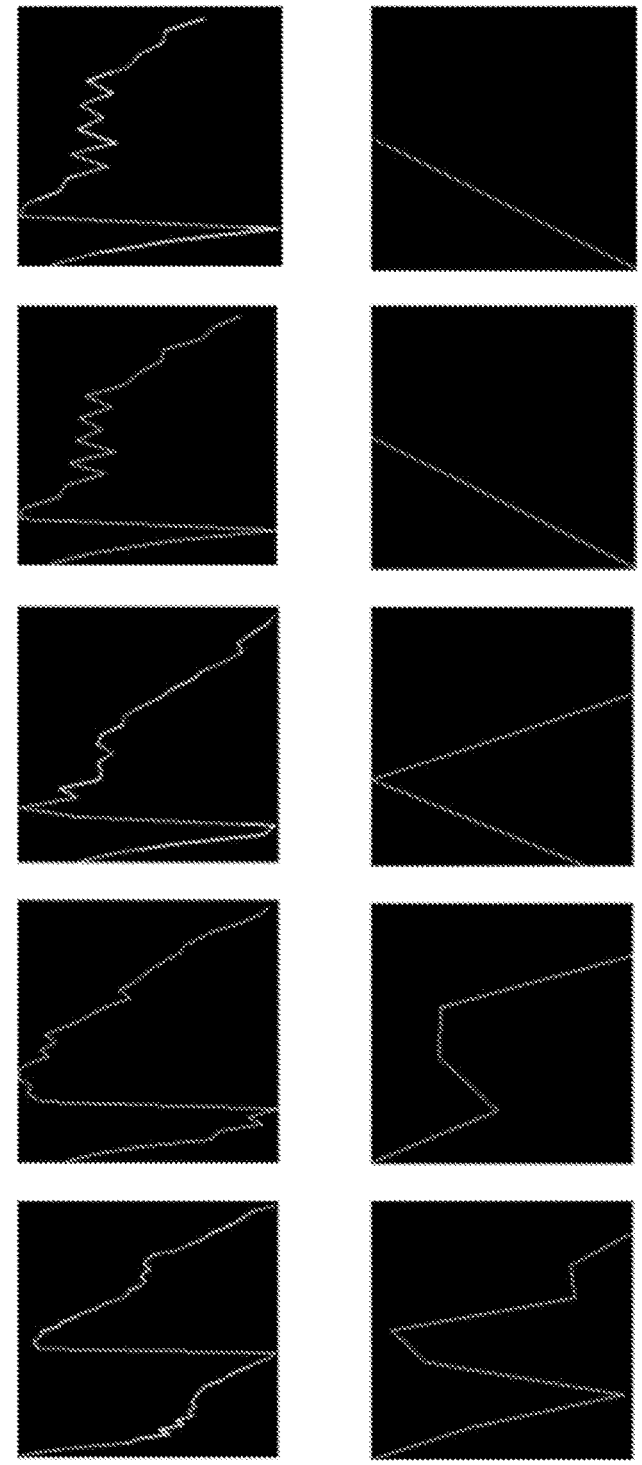
FIG. 34

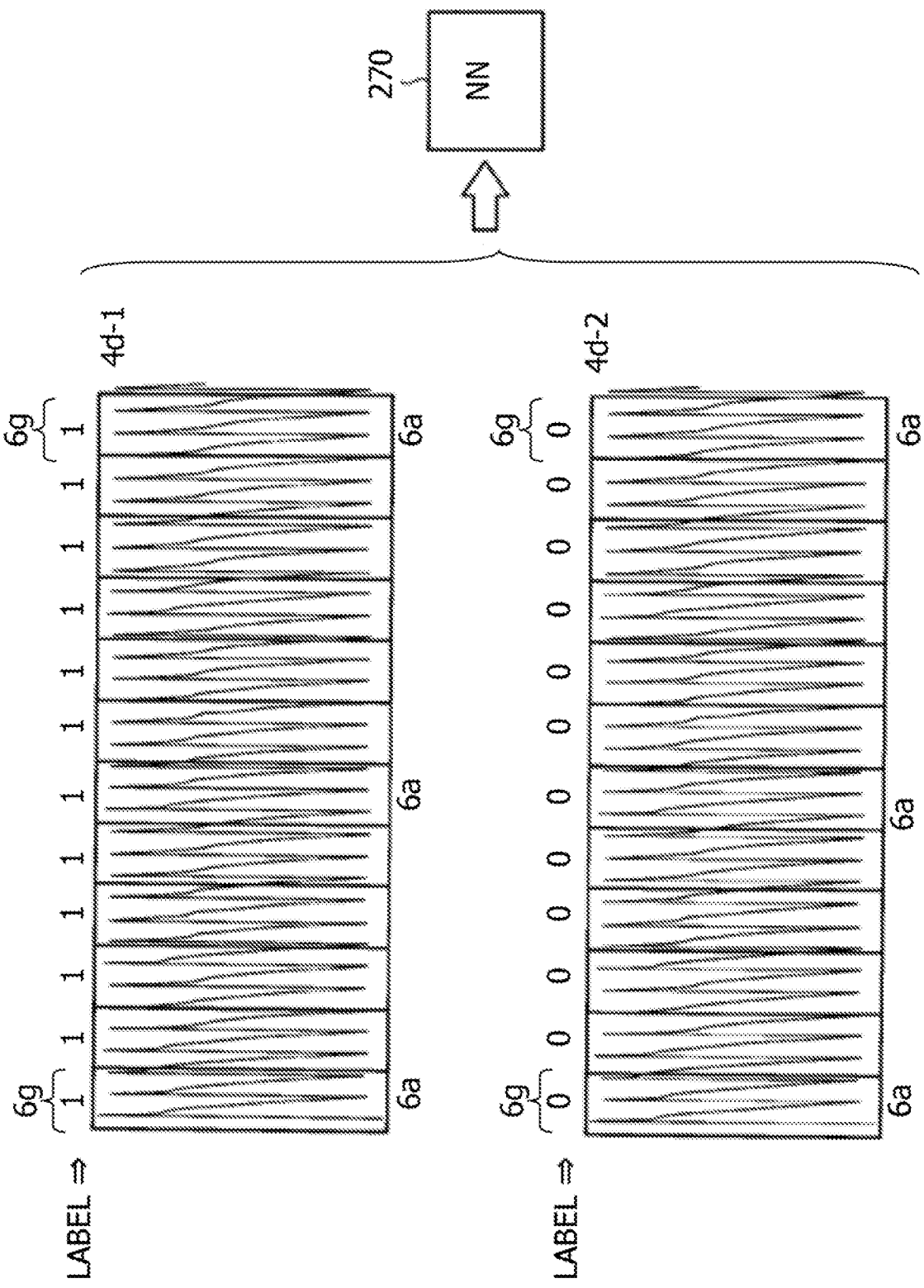

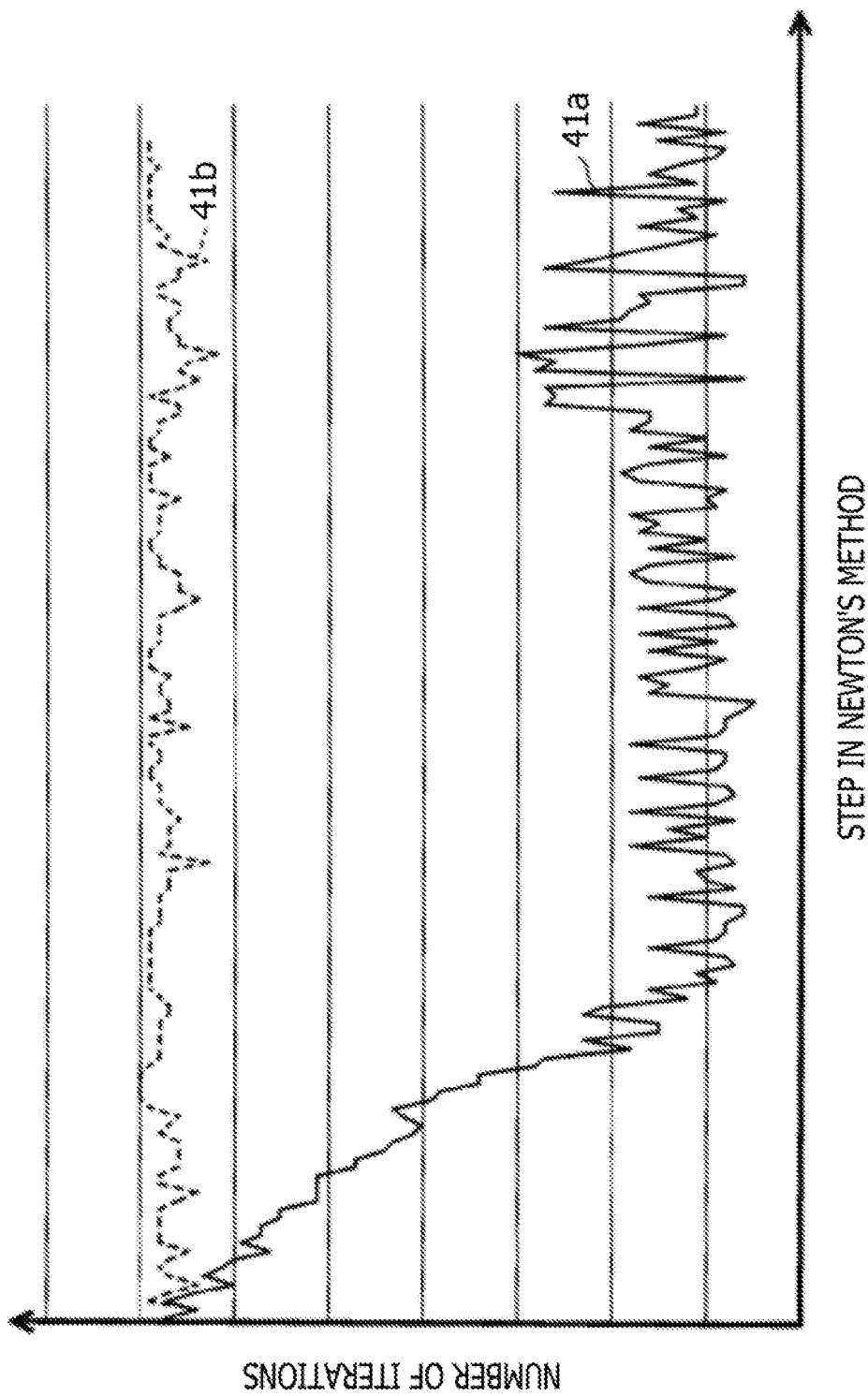

FIG. 42

```
fstr_setup: OK
fstr_static_analysis
...
2019-xx-xx 14:29:01.777508: I tensorflow/core/common_runtime/gpu/gpu_device.cc xxxx]
Found device 0 with properties:
name: Txxxx xxxx, ...          ~ 42a
2019-xx-xx 14:29:02.292061: I tensorflow/core/common_runtime/gpu/gpu_device.cc:xxxx]
Creating TensorFlow device (/device:GPU:1) -> (device: 1, name: Txxxx xxxx, ...)   ~ 42b
...
    1   3.052037E-01
    2   2.134830E-01
...
   67   7.702350E-09
Relative residual = 7.702350E-09 fstr_Newton: rank, step, substep, non-linear_iter:       0       1       1       2
fstr_Newton: call linear solver
...
    1   2.200415E-01
    2   5.587836E-02
...
   64   9.887162E-09
Relative residual = 9.88716E-09  ~ 42c
get_resid:TOL  1.0000000000000000E-008  9.8888893923290E-009 fstr_Newton: rank, step, substep, non-linear_iter:       0       1       1       3
fstr_Newton: call linear solver
...
    1   2.473787E-01
    2   9.809088E-02
...
   67   1.716821E-08
Relative residual = 1.71682E-08  ~ 42d
...
```

INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2019-134863, filed on Jul. 22, 2019, the entire contents of which are incorporated herein by reference.

FIELD

The embodiments discussed herein are related to an information processing method, and an information processing apparatus.

BACKGROUND

In recent years, simulations such as a structural analysis and a fluid analysis have been used for checking stresses to be applied to structures of products, checking behaviors of gases and liquids, and the like. In an analytical simulation, iterative methods such as the Newton's method are used for a non-linear analysis, and a linear solver is solved in each iteration. The linear solver is also solved by an iterative method in many cases.

There are known techniques such as one that changes conditions for determination of convergence depending on whether a matrix of a solution obtained using an equation using predetermined conditions on device characteristics for an analysis satisfies conditions for convergence of a linear equation so as to shorten the calculation time taken for the conditions for convergence to be satisfied through a non-linear equation of a matrix of the solution.

Related techniques are disclosed in for example Japanese Laid-open Patent Publication Nos. 2003-162517, 2017-123160, 2016-146139, and 2000-339179.

SUMMARY

According to one aspect, an information processing method includes executing a first process of performing a non-linear analysis by iterating a linear analysis; executing a second process of predicting a residual threshold to be used for determination of convergence of the linear analysis by a prediction model, based on a residual transition and calculation time for each iteration of the linear analysis obtained for each residual threshold using a plurality of experimental values by the first process; and performing passage of data between the first process and the second process through an inter-process communication using a shared memory set in a memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWING(S)

FIG. 16A is diagram illustrating state examples of the inter-process communication;

FIG. 16B is diagram illustrating state examples of the inter-process communication;

FIG. 16C is diagram illustrating state examples of the inter-process communication;

FIG. 24A is a flowchart for explaining a learning process in the first functional configuration example;

FIG. 28A is a flowchart for explaining a first example of a learning process in the second functional configuration example;

FIG. 34 is a diagram illustrating a learning result for each candidate threshold in the second example of the learning process;

FIG. 36 is a diagram illustrating a learning result for each candidate threshold in the second example of the learning process;

FIG. 41 is a diagram illustrating an example of transition of the number of iterations; and FIG. 42 is a diagram illustrating an example of an execution log in the second embodiment.

DESCRIPTION OF EMBODIMENTS

In simulations for the structural analysis and fluid analysis, a non-linear analysis is sometimes carried out. In a non-linear analysis, there is a residual threshold as a condition for convergence in an iterative method such as the Newton's method. Although it is effective to set the residual threshold to an optimum value to shorten the calculation time for a simulation, it is impossible to obtain an optimum residual threshold in advance.

Hence, in one aspect, an object of the present disclosure is to make it possible to set an optimum residual threshold and shorten the calculation time by reducing the number of iterations of the non-linear analysis.

It is made possible to set an optimum residual threshold and shorten the calculation time by reducing the number of iterations of the non-linear analysis.

Hereinafter, embodiments of the present disclosure are described with reference to the drawings. In a simulation of a structural analysis or a fluid analysis, the analysis using a non-linear equation (referred to as a "non-linear analysis") is carried out. In a non-linear analysis, a solution is obtained by iteratively solving a linear solver using the Newton's method or the like. The linear solver itself often obtains a solution using an iterative method (a conjugate gradient (CG) method) for a large-scale problem.

In order to shorten the calculation time of a simulation, the present inventors found executing the simulation by causing an artificial intelligence (AI) to learn the direction of adjusting the residual threshold, which serves as a condition for convergence in an iterative process in a non-linear analysis to achieve a dynamic increase or decrease. In this case, the learning of the residual threshold is carried out by transferring a series of residual with the elapse of time until the convergence is achieved by the iterative process by the linear solver (referred to as a "residual curve" or a "residual transition") from a simulation program to a machine learning program. This approach is described in detail in a second embodiment.

However, since the simulation program and the machine learning program use different languages, a file access for transferring data between the simulation and the learning takes time. In order to solve this problem, the present inventors found an inter-process communication according to a first embodiment. In the second embodiment, a dynamic approach to adjust a residual threshold is described.

Figure 1:
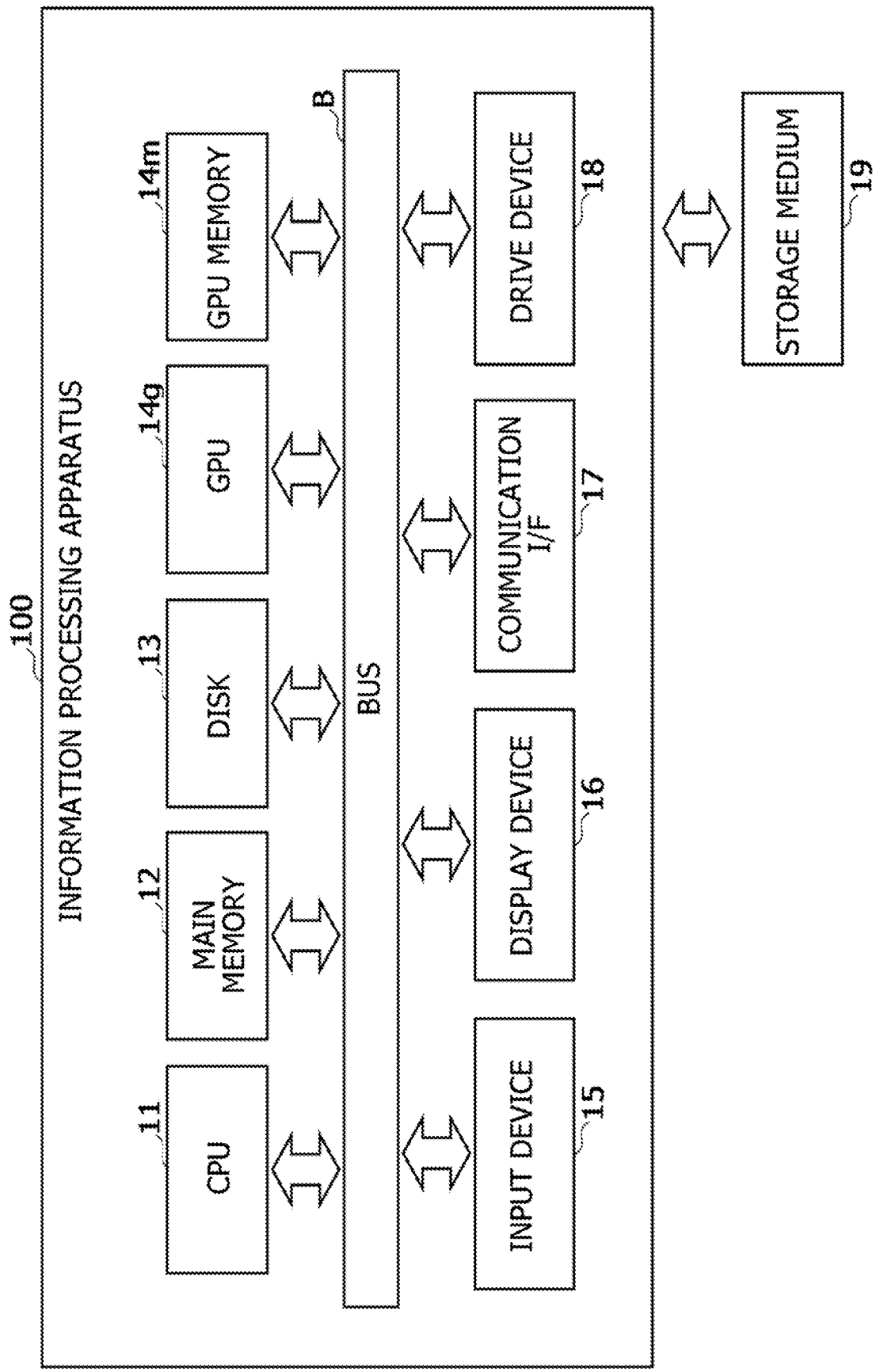
FIG. 1 is a diagram illustrating an example of a hardware configuration of an information processing apparatus.

The first and second embodiments to be described below may be implemented in an information processing apparatus having a hardware configuration as illustrated in FIG. 1. The processing speed of a simulation may be improved by implementing one or both of the first and second embodiments.

FIG. 1 illustrates an example of a hardware configuration of an information processing apparatus. As illustrated in FIG. 1, an information processing apparatus 100 is a computer including a central processing unit (CPU) 11, a main memory 12, a disk 13, a graphics processing unit (GPU) 14g, a GPU memory 14m, an input device 15, a display device 16, a communication I/F 17, and a drive device 18, and is coupled to a bus B. This hardware configuration is also applied to the second embodiment.

The CPU 11 corresponds to a processor that controls the entire information processing apparatus 100 and executes a simulation program read from the disk 13 and stored in the main memory 12 (for example, a random-access memory (RAM)) to achieve processing in the present embodiment, which is described below. The CPU 11 also executes various processes other than the simulation.

The GPU 14g corresponds to a processor for AI prediction and executes AI prediction to predict the direction of adjusting the residual threshold in the present embodiment using simulation data obtained by executing the simulation. The GPU memory 14m is a local memory utilized by the GPU 14g and stores a program of a NN 270 (FIG. 3), which performs the AI prediction. In the AI prediction, the GPU 14g learns an optimum parameter value for the NN 270 by executing the program stored in the GPU memory 14m.

The input device 15 is operated by a user and inputs data in response to the operation, and the display device 16 serves as a user interface to display various screens. The communication I/F 17 controls communication with an external device.

A simulation program according to the present embodiment stored in a storage medium 19 (for example, a compact disc read-only memory (CD-ROM) or the like) is installed in the disk 13 via the drive device 18 and may be executed by the CPU 11. The machine learning program is similarly installed from the storage medium 19 in the disk 13 via the drive device 18 and may be executed by the GPU 14g.

The simulation program and the machine learning program according to this embodiment stored in the storage medium 19 (for example, a compact disc read-only memory (CD-ROM)) Is Installed on the disk 13 via the drive device 18 and may be executed by the CPU 11. The simulation program and the machine learning program may be installed from different storage media 19, respectively.

The storage medium 19 for storing the program according to this embodiment is not limited to the CD-ROM, and it may be any one or more non-transitory and tangible media having a computer-readable structure. As the computer-readable storage medium, in addition to the CD-ROM, a portable recording medium such as a digital versatile disk (DVD), a Universal Serial Bus (USB) memory, or the like, or a semiconductor memory such as a flash memory may be used.

First Embodiment

Figure 2:
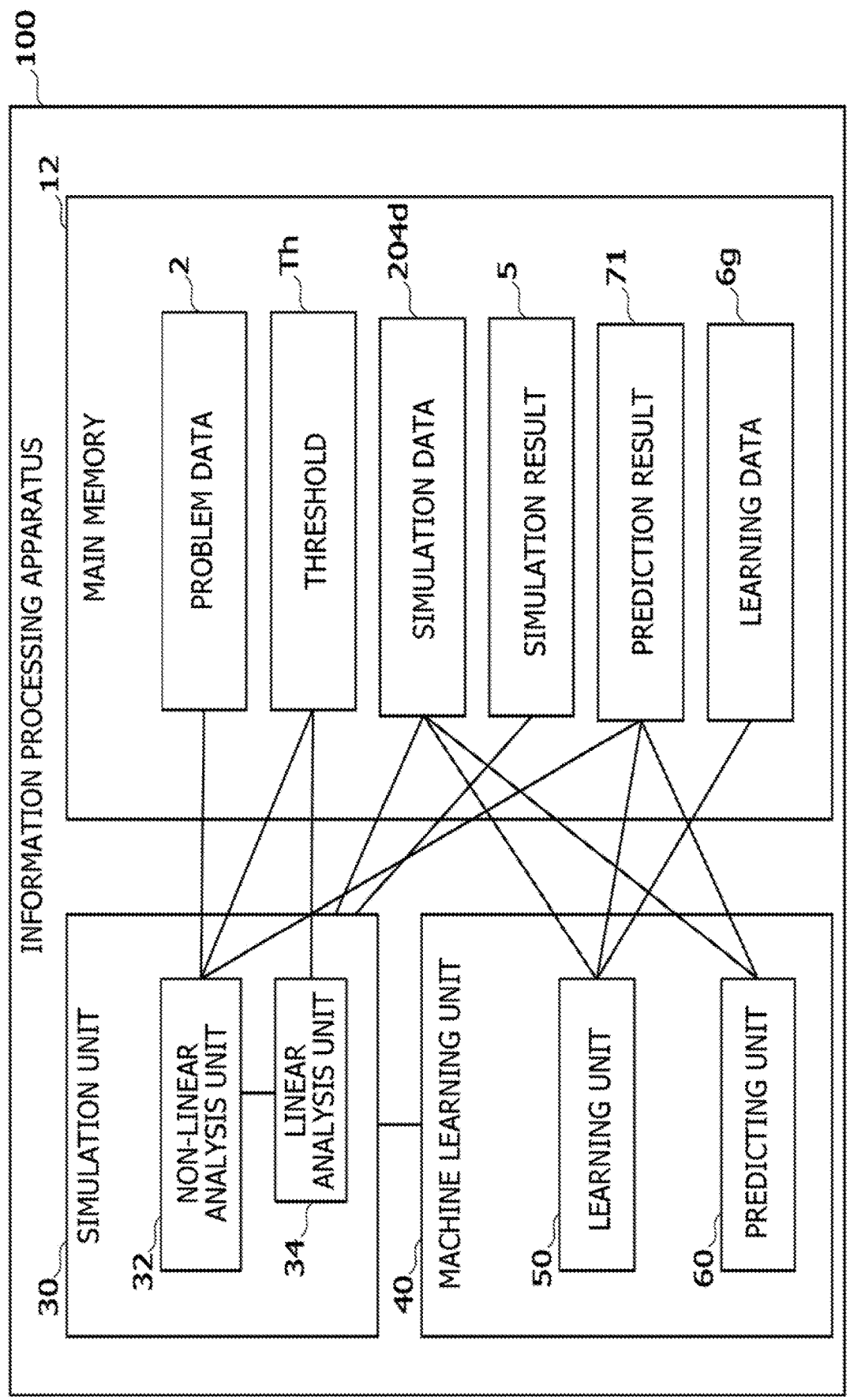
FIG. 2 is a diagram illustrating a functional configuration example of the information processing apparatus.

In the first embodiment, an approach to increase the speed of the simulation by the inter-process communication in the information processing apparatus 100 having the functional configuration as illustrated in FIG. 2 is described. FIG. 2 is a diagram illustrating a functional configuration example of the information processing apparatus.

As illustrated in FIG. 2, the information processing apparatus 100 mainly includes a simulation unit 30 and a machine learning unit 40 as processing units. The problem data 2, the threshold Th, the simulation data 204d, the simulation result 5, the prediction result 71, and other data are illustrated as being stored in the main memory 12 part of which is used as a shared memory 12a (FIG. 8) as described in the first embodiment.

The simulation unit 30 is a processing unit achieved by the CPU 11 executing the simulation program, conducts a predetermined analysis on the problem data 2, and mainly includes a non-linear analysis unit 32 and a linear analysis unit 34. The predetermined analysis includes a structural analysis, a fluid analysis, and the like. The analysis result obtained by the simulation unit 30 may be displayed on the display device 16.

The non-linear analysis unit 32 is a processing unit that reads the problem data 2 and performs a non-linear analysis. In the non-linear analysis, a solution is obtained using an iterative method such as the Newton-Raphson method. The non-linear analysis unit 32 iterates the non-linear analysis for a predetermined number of times, provides the linear analysis unit 34 with parameter values and the like obtained from the problem data 2 and the threshold Th (for example, the residual threshold) used for the determination of convergence for every iteration, and causes the linear analysis unit 34 to perform an analysis using a linear equation. The non-linear analysis data obtained by the non-linear analysis corresponds to nonlin_data to be described later.

The linear analysis unit 34 iterates the analysis using the linear equation until the threshold Th is satisfied, and outputs a residual, which indicates the difference between the solution for each iteration and the threshold Th, and linear analysis data such as a simulation time to the main memory 12. The process of iterating the analysis using the linear equation until the threshold Th is satisfied uses a linear solver. The linear analysis data obtained by the linear analysis unit 34 corresponds to lin_data to be described later.

The non-linear analysis data is data obtained every time the non-linear analysis is iterated, and the linear analysis data is data accumulated for every iteration. The non-linear analysis data and the linear analysis data including various parameter values, solutions, and the like correspond to simulation data 204d. The simulation data 204d is read to the machine learning unit 40 for every AI prediction.

A collection of data indicating the execution environment and the execution state indicated by the passage of time from the start to the end of the simulation is referred to as an execution log 4a (FIG. 42). The execution log 4a includes the simulation data 204d. A solution targeted for the problem data 2 is referred to as a simulation result 5.

In the first embodiment, the information processing apparatus 100 using the linear analysis for conducting the non-linear analysis determines the residual threshold Th based on log data indicating the residual transition, the calculation time, and the like for each iteration, which are obtained for each threshold Th as experimental values.

The machine learning unit 40 includes a learning unit 50 and a predicting unit 60. The learning unit 50 learns parameter values for the NN 270 adjusting the threshold Th used by the linear analysis unit 34. The predicting unit 60 predicts an increase or decrease (adjustment direction) of the threshold Th using the trained NN 270.

Figure 3:
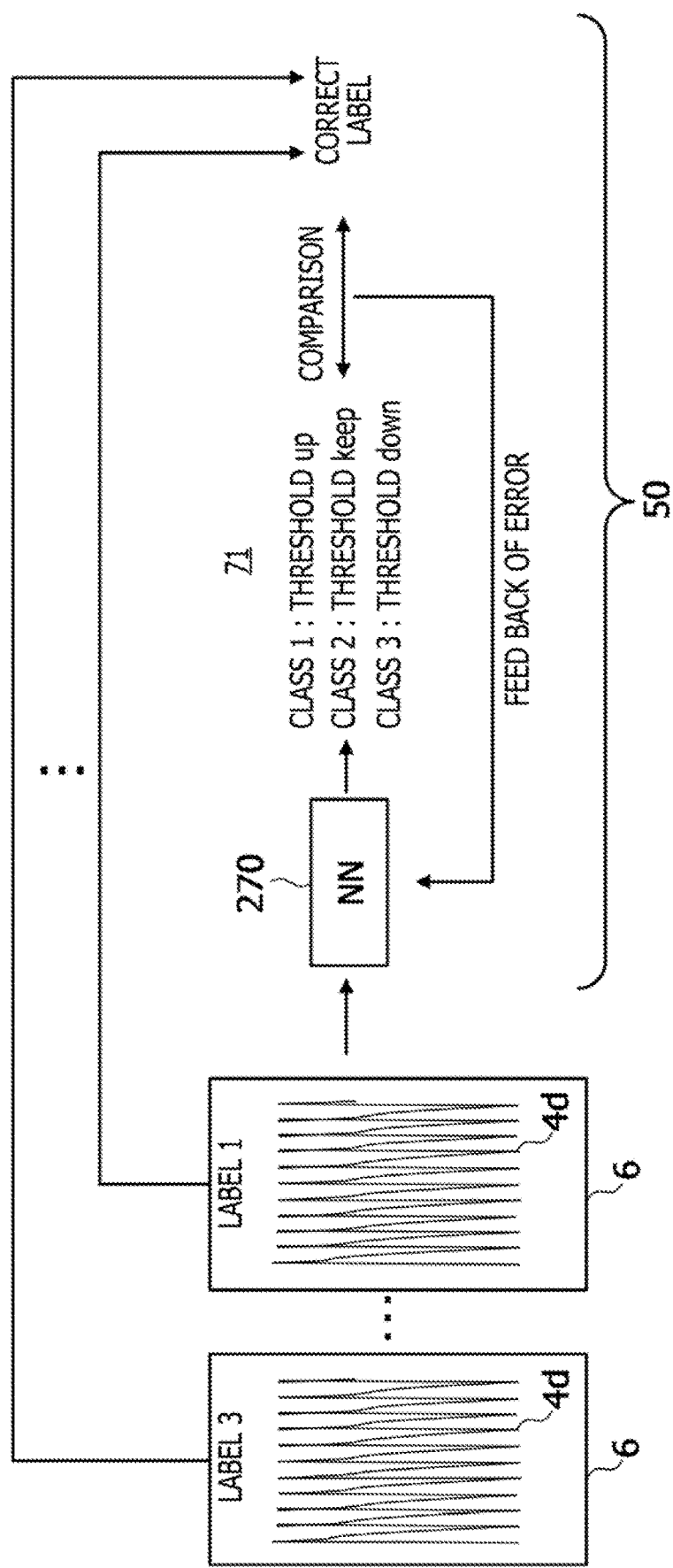
FIG. 3 is a diagram for explaining a learning process.

The learning unit 50, as illustrated in FIG. 3, inputs learning data 6g, which is generated by labeling the simulation data 204d, into the NN 270, and feeds back the error between the prediction result 71, which indicates the class predicted by the NN 270, and the label of the learning data 6g to the NN 270.

The predicting unit 60 acquires the prediction result 71, which indicates an increase or decrease of the threshold Th by the trained NN 270. As an example, the prediction result 71 is assumed to indicate any one of the classes "1", "2", and "3" classified by the NN 270. In this case, the class "1" designates an increase of the threshold Th (threshold up), the class "2" designates that the threshold Th does not have to be adjusted (threshold keep), and the class "3" designates a decrease of the threshold Th (threshold down).

The predicting unit 60 predicts the class such that the residual is reduced relative to the simulation data 204d to the trained NN 270. The prediction result 71 is stored in the main memory 12 and is a return value to the non-linear analysis unit 32 of the simulation unit 30.

The non-linear analysis unit 32 updates the threshold Th based on the prediction result 71 predicted by the predicting unit 60 and provides the updated threshold Th to the linear analysis unit 34. The adjustment of the threshold Th as described above makes it possible to shorten the time taken for the simulation.

The threshold Th is one of the conditions for convergence in the iterative method, and how the threshold Th is provided to the linear analysis unit 34 affects the accuracy of a solution and the execution time. Setting the threshold Th to any value is considered not to affect the final accuracy of a solution as long as the non-linear analysis is converged. However, when it is possible to estimate the optimum residual threshold at a high speed, this makes it possible to increase the speed of the entire non-linear analysis.

Figure 4:
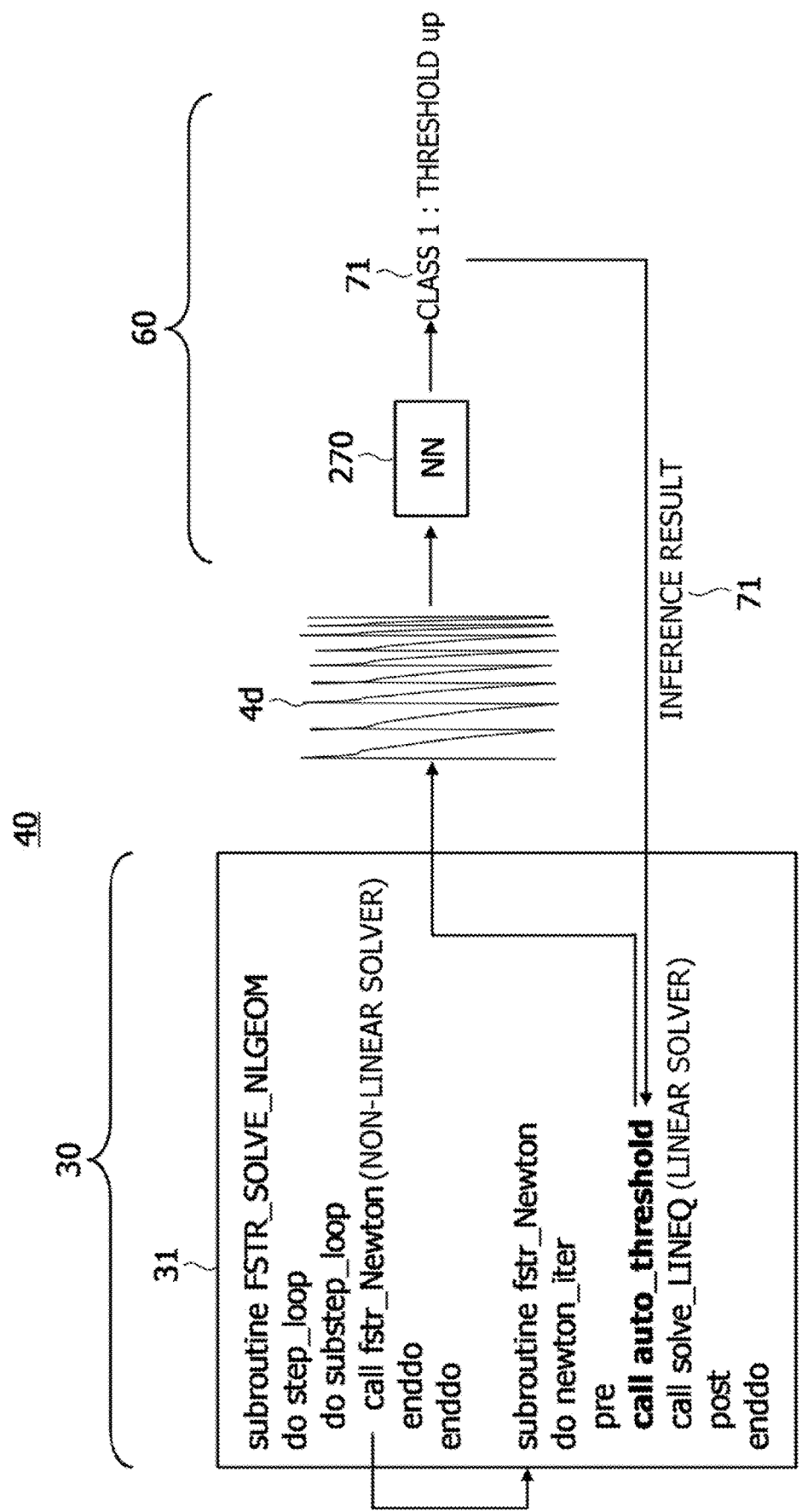
FIG. 4 is a diagram for explaining a predicting process.

From the above-described viewpoint, the present inventors found that it is possible to shift the threshold Th toward an optimum value and reduces the number of iterations and the processing time until the linear analysis is converged, by learning an increase or decrease of the threshold Th using the NN 270 and also predicting an increase or decrease of the threshold Th using the trained NN 270. With reference to FIGS. 3 and 4, the outline of the processing performed by the information processing apparatus 100 is described. In this example, the processing is described on the assumption that a convolutional neural network (CNN) is used as the NN 270; however, the NN is not limited to the CNN.

FIG. 3 is a diagram for explaining the learning process. In FIG. 3, the simulation data 204d for each of simulations using different candidate thresholds on the problem data 2 is referred to and a reference threshold for use in learning is selected from the candidate thresholds based on the residual transition, the calculation time, and the like for each iteration. Each of the residual curve data 4d is labeled based on the difference between the reference threshold and the candidate threshold and is used as the learning data 6g. The candidate threshold corresponds to an experimental value.

The simulation data 204d using a candidate threshold smaller than the reference threshold is labeled with "1". The simulation data 204d using a candidate threshold larger than the reference threshold is labeled with "3". The simulation data 204d using a candidate threshold equal to the reference threshold is labeled with "2". For example, the above-described simulation data 204d when the simulation is completed in the shortest time is labeled with "2".

The prediction result 71 is obtained by inputting the simulation data 204d into the NN 270. As an example, the prediction result 71 indicates any one of the class 1, which increases the threshold Th, the class 2, which maintains the threshold Th, and the class 3, which decreases the threshold Th. The prediction result 71 is compared with the label of the learning data 6g, and the error as the result of comparison is fed back to the NN 270. With the feed back of the error, the parameter values of the NN 270 is updated. The trained NN 270 is used by the predicting unit 60.

The above-described example is described as the case of classifying into the classes 1, 2, and 3. The classification may however be made into the case where the threshold Th is increased and the other case. In such a case, the learning unit 50 may apply the label 0 in the case where the candidate threshold 3 is lower than the reference threshold 3ref in the learning and apply the label 1 in the other case, and infer the class 0 or the class 1 as the inference result 71.

FIG. 4 is a diagram for explaining the predicting process. In FIG. 4, a pseudocode 31 is given as an example of a simulation program that causes the CPU 11 to function as the simulation unit 30.

When the non-linear analysis is executed by "call fstr_Newton" in the pseudocode 31, the predicting unit 60 of the machine learning unit 40 is called by "call auto_threshold" in the non-linear analysis unit 32. The predicting unit 60 inputs the simulation data 204d into the NN 270 and acquires the prediction result 71. The prediction result 71 thus obtained is passed to the non-linear analysis unit 32 as a return value of "call auto_threshold". The non-linear analysis unit 32 updates the threshold Th based on the prediction result 71, and executes "call solve_LINEQ" such that the processing of a linear solver is performed with the updated threshold Th.

The acquisition of the prediction result 71 by "call auto_threshold" does not have to be performed for every execution of the linear solver. The prediction result 71 may be acquired for every predetermined number of times of execution of the linear solver to update the threshold Th.

Figure 5:
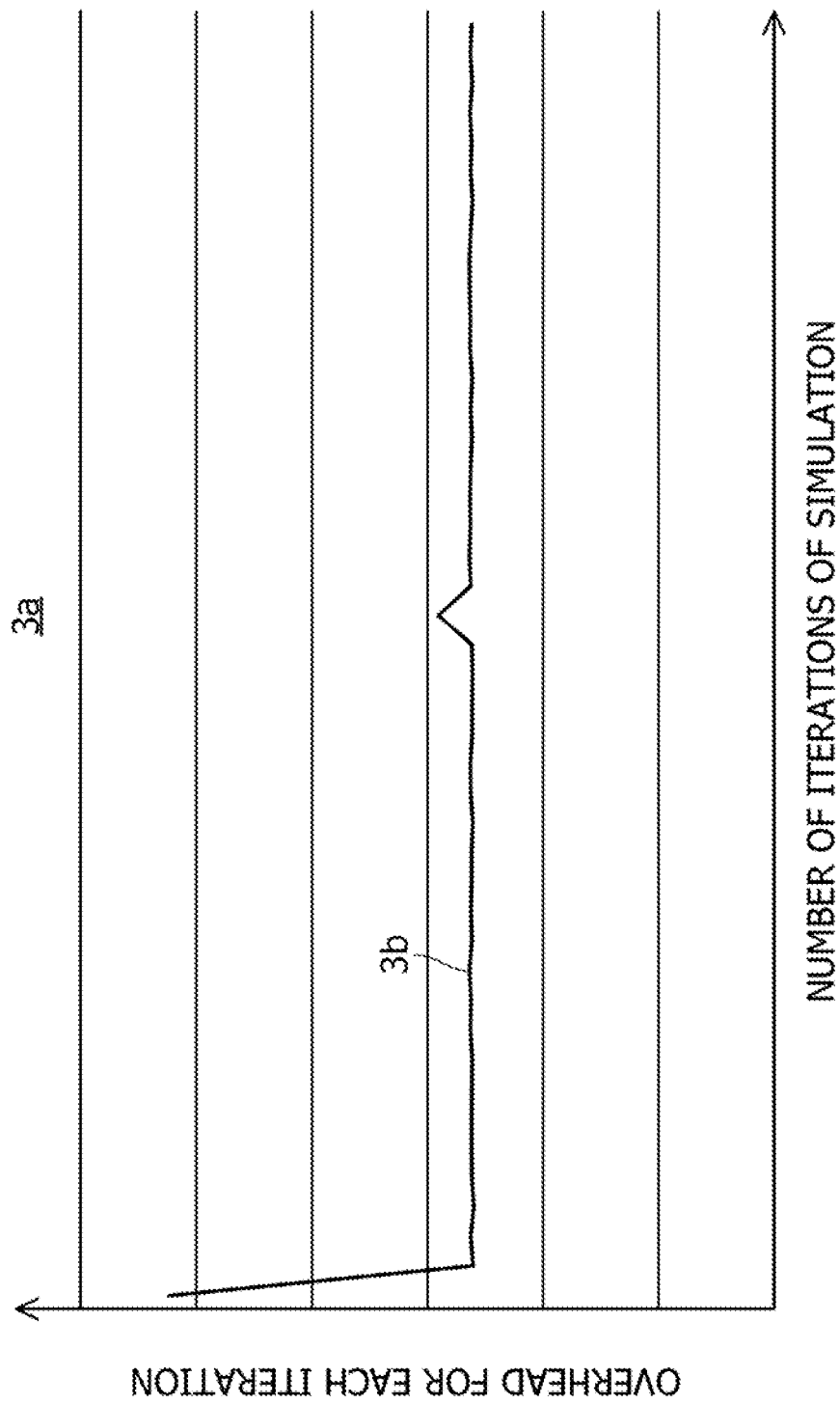
FIG. 5 is a diagram illustrating a graph of a result of checking.

In the above-described configuration, the present inventors checked the overhead in the case where the simulation data 204d had a data size of 1 GB. FIG. 5 is a diagram illustrating a graph of the result of the check. In FIG. 5, the vertical axis indicates the overhead for each iteration with time (second) and the horizontal axis indicates the number of iterations. The overhead due to the input and output of the simulation data 204d indicates the processing time for the linear analysis for each iteration.

In the graph 3a of FIG. 5, the processing time 3b involving a file access to the simulation data 204d is indicated in a case where the number of iterations for the linear analysis in the simulation is 86. From the result of the check, it is understood that the speed of the simulation was increased by adjusting the threshold Th using the NN 270.

As described above, the simulation program for implementing the simulation unit 30 and the machine learning program for implementing the machine learning unit 40 use different languages. As an example, the simulation program is a program using a procedural language for a scientific calculation such as FrontISTR in the case of a structural analysis solver. As of the machine learning program, a script language constituting NN such as Python and a deep learning language for Keras or the like in a library usable from Python and the like are used.

Hence, the programming language of the simulation unit 30 and the script language utilizing the NN 270 in the machine learning unit 40 are executed by the CPU 11, the NN 270 is stored in GPUm as a library, and executed by the GPU 15g.

Although the programming language and the script language are executed by the CPU 11, they are different languages. For this reason, the simulation data 204d and the prediction result 71 are normally stored in the disk 13, and transmission and reception of data between the simulation unit 30 and the machine learning unit 40 are performed through file access. This file access has a problem of consuming the simulation time. The file access is for example performed when the predicting unit 60 acquires the simulation data 204d and when the non-linear analysis unit 32 acquires the prediction result 71 in FIG. 4.

In the first embodiment, a mechanism that improves the consumption of the processing time by this file access is described with reference to FIGS. 6 and 7. Input data to the NN 270, such as the simulation data 204d, and the prediction result 71, which is a return value from the NN, are transferred through the shared memory with no access to the disk 13. Access by the simulation unit 30 to the shared memory is also blocked until the threshold Th is updated.

Figure 6:
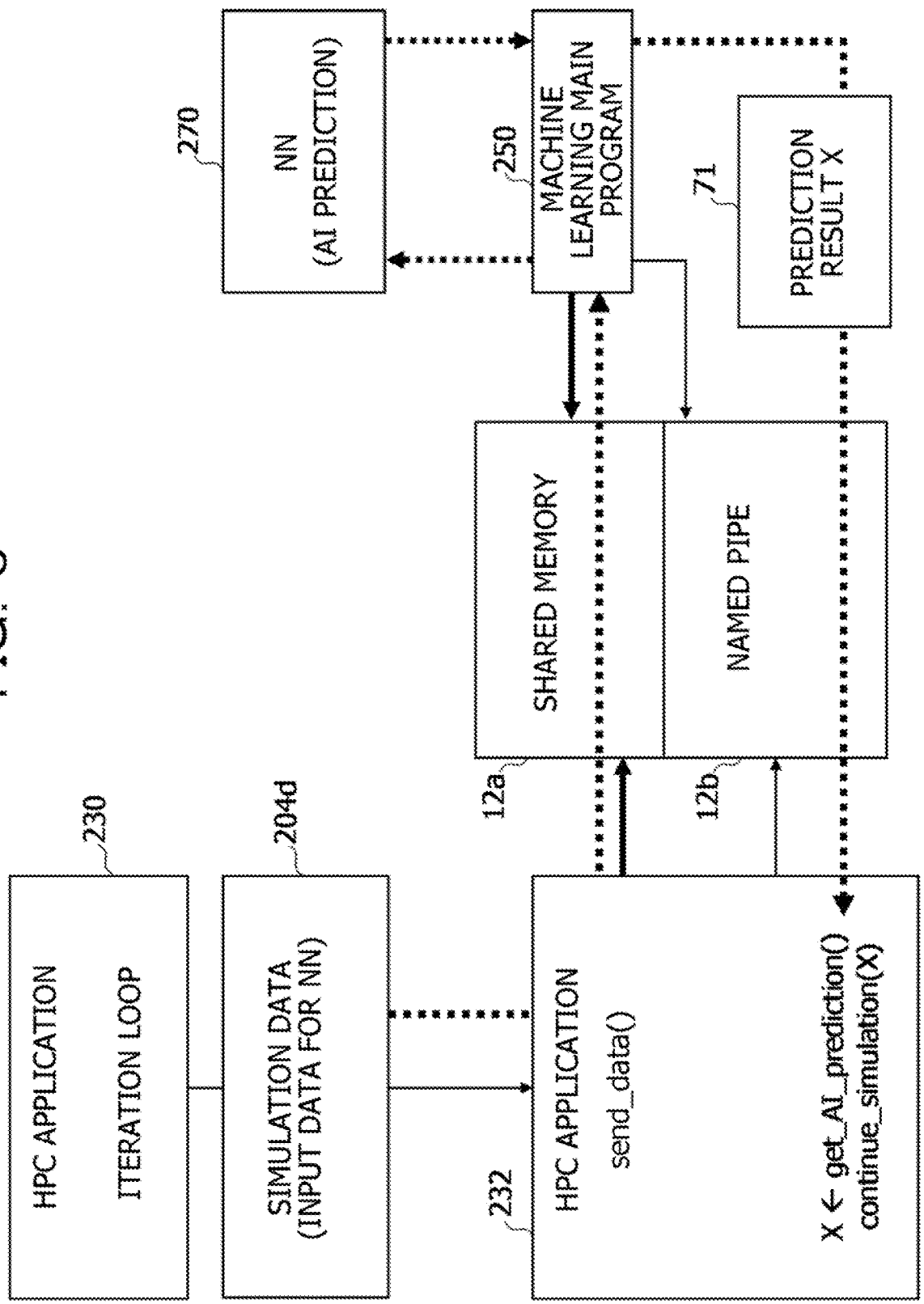
FIG. 6 is a diagram for explaining transmission and reception of data in an inter-process communication in a first embodiment.

FIG. 6 is a diagram for explaining transmission and reception of data in the inter-process communication in the first embodiment. In FIG. 6, the dotted line indicates the flow of data and the solid line indicates the flow of processing. Hereinafter, the information processing apparatus 100 is described as implementing a UNIX-based operating system (OS) (LINUX or the like, as an example); however, the OS is not limited thereto.

In FIG. 6, a high-performance computing (HPC) application 230 including an iteration loop outputs the simulation data 204d for every processing iteration. The simulation data 204d here is data to be inputted into the NN 270 so as to adjust values relating to the increase of the speed of the simulation processing.

A HPC application 232 is part of the HPC application 230 and corresponds to a portion having a data transfer function.

The HPC application 232 writes the simulation data 204d into the shared memory 12a (send_data( )) and sets data transfer completion in the named pipe 12b. For example, the data transfer completion is indicated by setting the start address of the simulation data 204d.

The machine learning main program 250 reads the start address from the named pipe 12b, accesses the shared memory 12a to read the simulation data 204d and input the read simulation data 204d into the NN 270. The AI prediction is executed by the NN 270. When obtaining the prediction result 71 from the NN 270, the machine learning main program 250 sets the prediction result 71 in the named pipe 12b.

The HPC application 232 acquires the prediction result 71 from the named pipe 12b and continues the simulation. For example, the threshold Th is increased, decreased, or maintained using the acquired prediction result 71 (X<-get_AI_prediction( )), and the simulation is continued using the threshold Th after adjustment (variable X) (continue_simulation(X)).

In FIG. 6, the simulation unit 30, the non-linear analysis unit 32, and the linear analysis unit 34 in FIG. 2 correspond respectively to the HPC application 230, the HPC application 232, and continue_simulation(X). The machine learning unit 40 in FIG. 2 is implemented by the machine learning main program 250. In the following description, the same correspondence is applied in the similar drawings.

Figure 7:
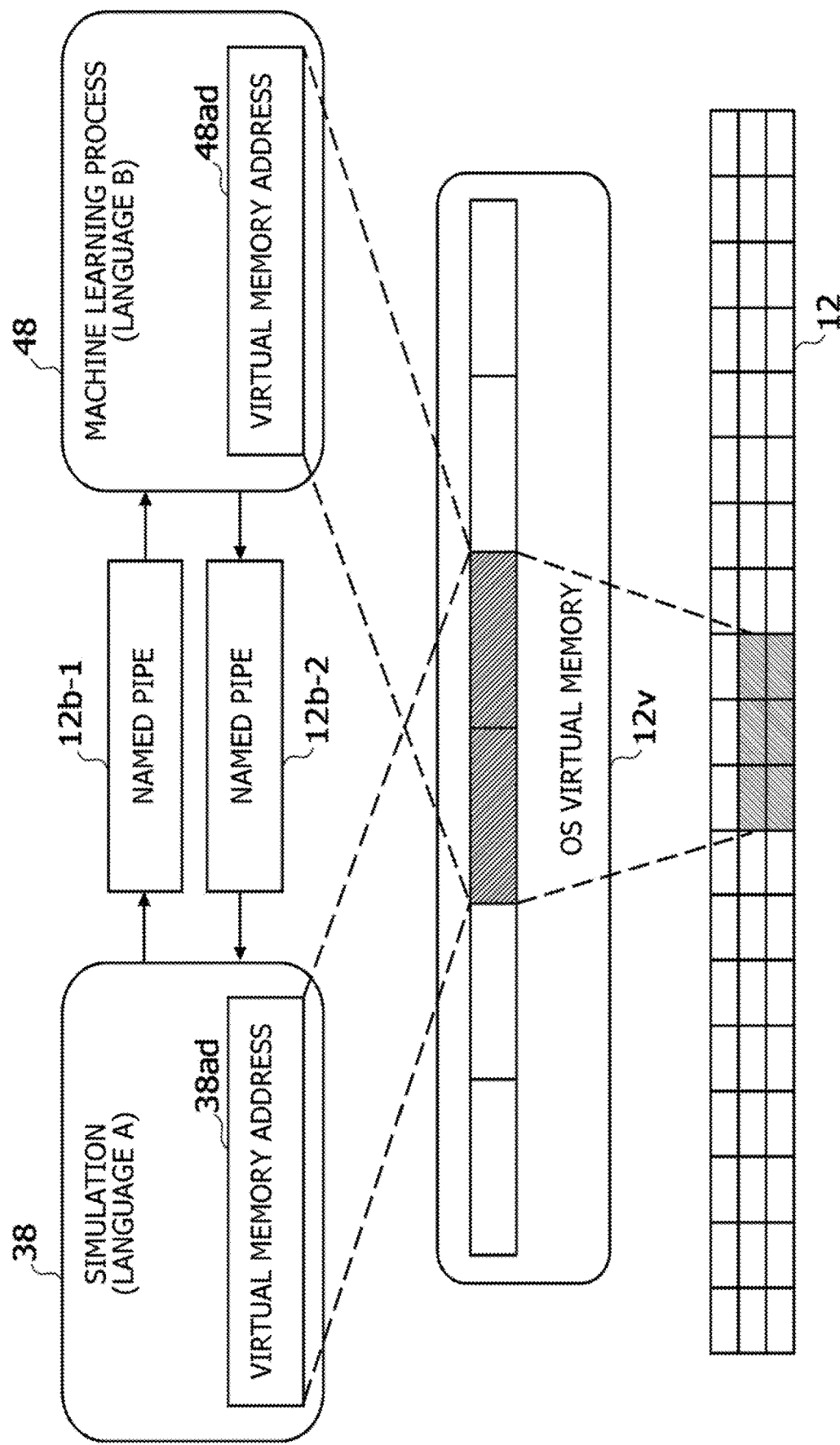
FIG. 7 is a diagram for explaining an outline of the inter-process communication between different program languages.

FIG. 7 is a diagram for explaining an outline of the inter-process communication between different program languages. In FIG. 7, the simulation 38 is a process executed by the simulation unit 30, which accesses the main memory 12 through an OS virtual memory 12v using a virtual memory address 38ad. A machine learning process 48 is a process executed by the machine learning unit 40, which accesses the main memory 12 through the OS virtual memory 12v using the virtual memory address 48ad.

Into the main memory 12, the simulation data 204d, which is input data for the NN 270, is written from the disk 13 by the simulation 38 using the virtual memory address 38ad. The simulation data 204d is read from the main memory 12 by the machine learning process 48 using the virtual memory address 48ad.

The named pipe 12b preferably has: a named pipe 12b-1 used for transmission and reception of the simulation data 204d; and a named pipe 12b-2 used for outputting of the inference result 71 (for example, the return value).

Figure 8:
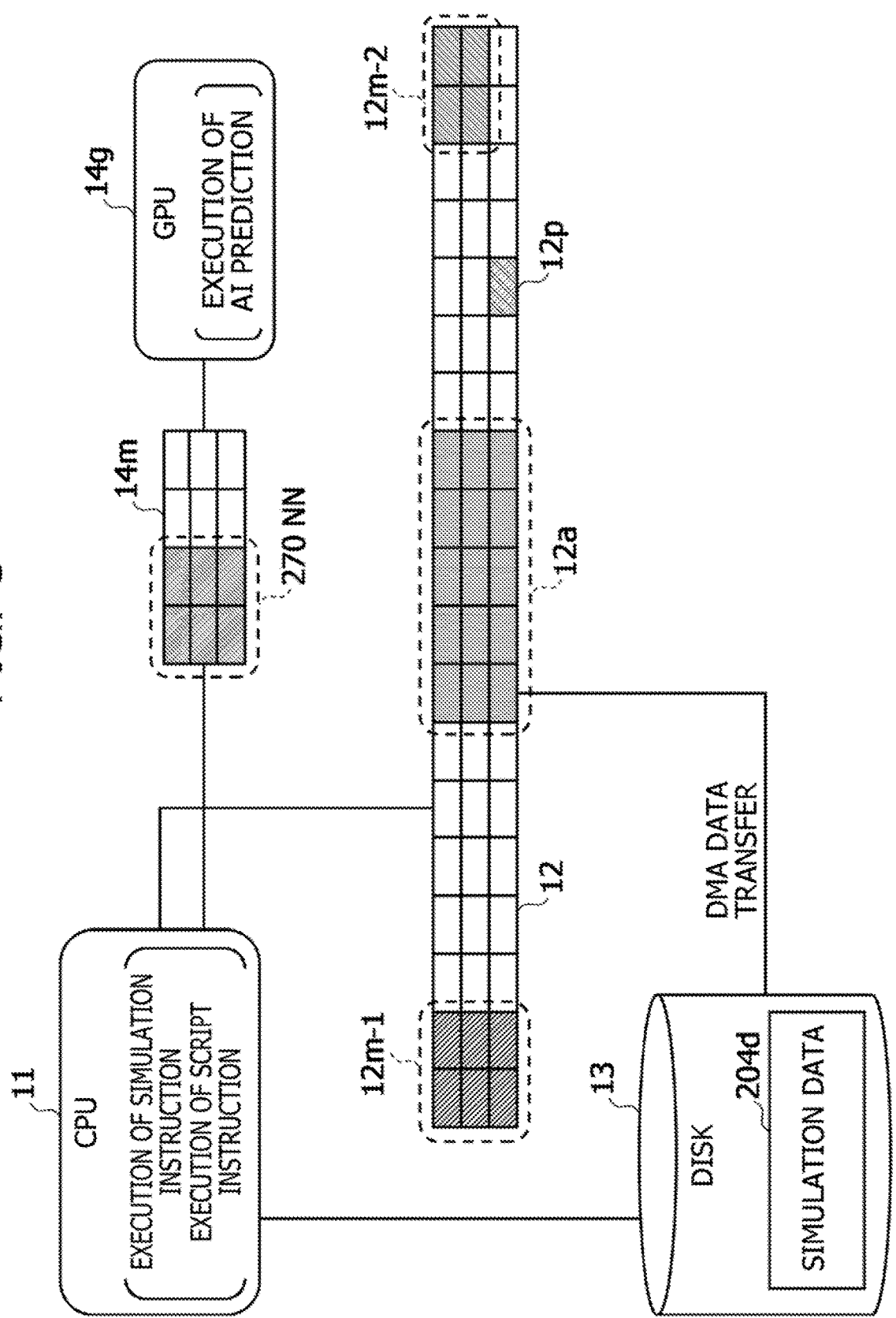
FIG. 8 is a diagram for explaining an outline of the inter-process communication in the case where AI is utilized in a simulation.

FIG. 8 is a diagram for explaining an outline of the inter-process communication in the case where AI is utilized in the simulation. In FIG. 8, the main memory 12 includes a CM area 12m-1, a shared memory 12a, a named pipe area 12p, and a ML area 12m-2.

The CM area 12m-1 stores an instruction of the simulation program (hereinafter referred to as "simulation instruction") and data, and the ML area 12m-2 stores an instruction of the machine learning program (hereinafter referred to as "script instruction") and data. The shared memory 12a stores the simulation data 204d transmitted from the disk 13 through a direct memory access (DMA). The named pipe area 12p is an area used as the named pipe 12b-1 and the named pipe 12b-2.

The CPU 11 performs simulation by executing the simulation instructions in order from the CM area 12m-1, stores the simulation data 204d obtained by the simulation in the disk 13, and performs a data transfer instruction. The latest simulation data 204d is transmitted to the shared memory 12a by the DMA. The CPU 11 writes the start address into the named pipe 12b-1 in the named pipe area 12p.

At the times of learning and predicting for the adjustment of the threshold Th by the machine learning, the CPU 11 executes the script instructions in order from the ML area 12m-2. The CPU 11 reads the simulation data 204d to be provided to the NN 270 from the shared memory 12a and provide the simulation data 204d to the NN 270 as input data. The NN 270 is executed by the GPU 14g using the GPU 14m.

Figure 9:
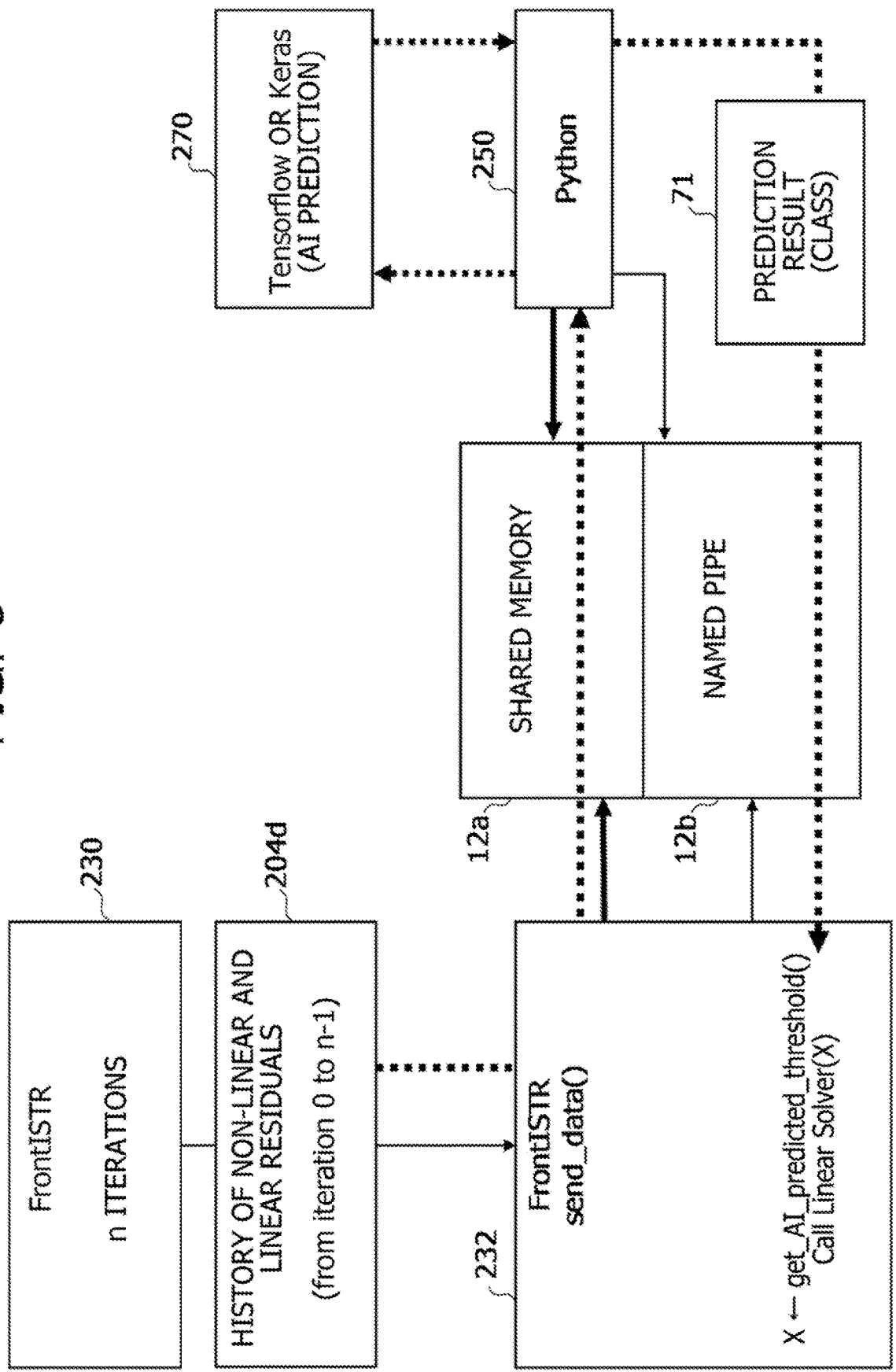
FIG. 9 is a diagram illustrating an implementation example in FIG. 6.
Figure 10:
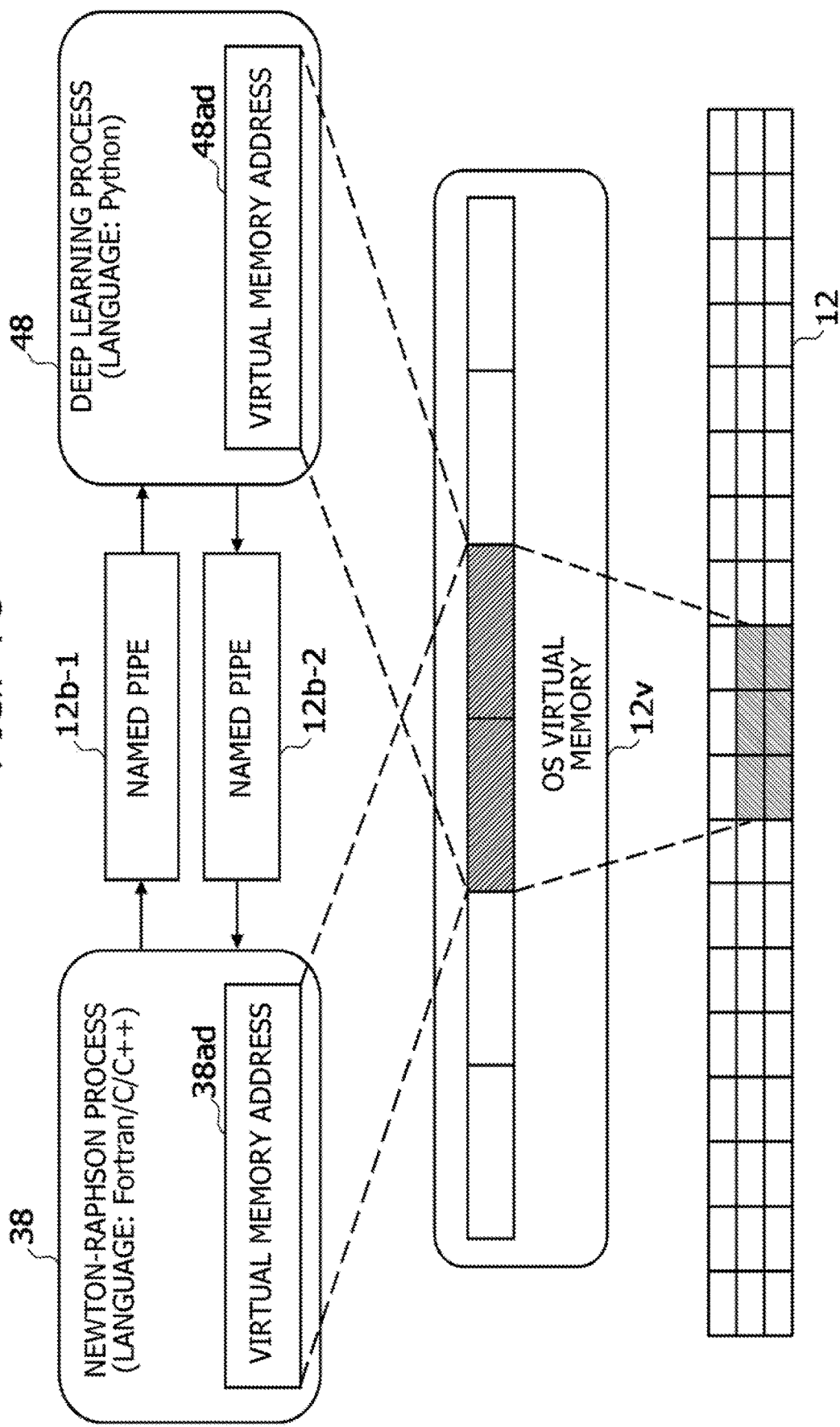
FIG. 10 is a diagram illustrating an implementation example in FIG. 7.

Next, implementation examples are illustrated in FIGS. 9 and 10. FIG. 9 is a diagram illustrating an implementation example in FIG. 6. FIG. 9 illustrates an example of a program language that is capable of being implemented in the functional configuration of FIG. 2 in association with FIG. 6.

The HPC applications 230 and 232 are programmed with FrontISTR, which is a Fortran language. When an iterative process is performed n times by the HPC application 230, the simulation data 204d contains a log indicating the residual transition of the linear analysis for each iteration of the non-linear analysis (iteration 0 to n−1). The machine learning main program 250 is programmed with Python, which is a script language, and utilizes the NN 270 with Tensor flow, which is produced by Google LLC, through an application programming interface (API) such as Keras.

FIG. 10 is a diagram illustrating an implementation example in FIG. 7. In FIG. 10, the simulation 38 is implemented by programming a process based on the Newton-Raphson method (a Newton-Raphson process) with Fortran, C, C++, or the like. The machine learning process 48 is implemented by programming a deep learning process with Python or the like.

Figure 11:
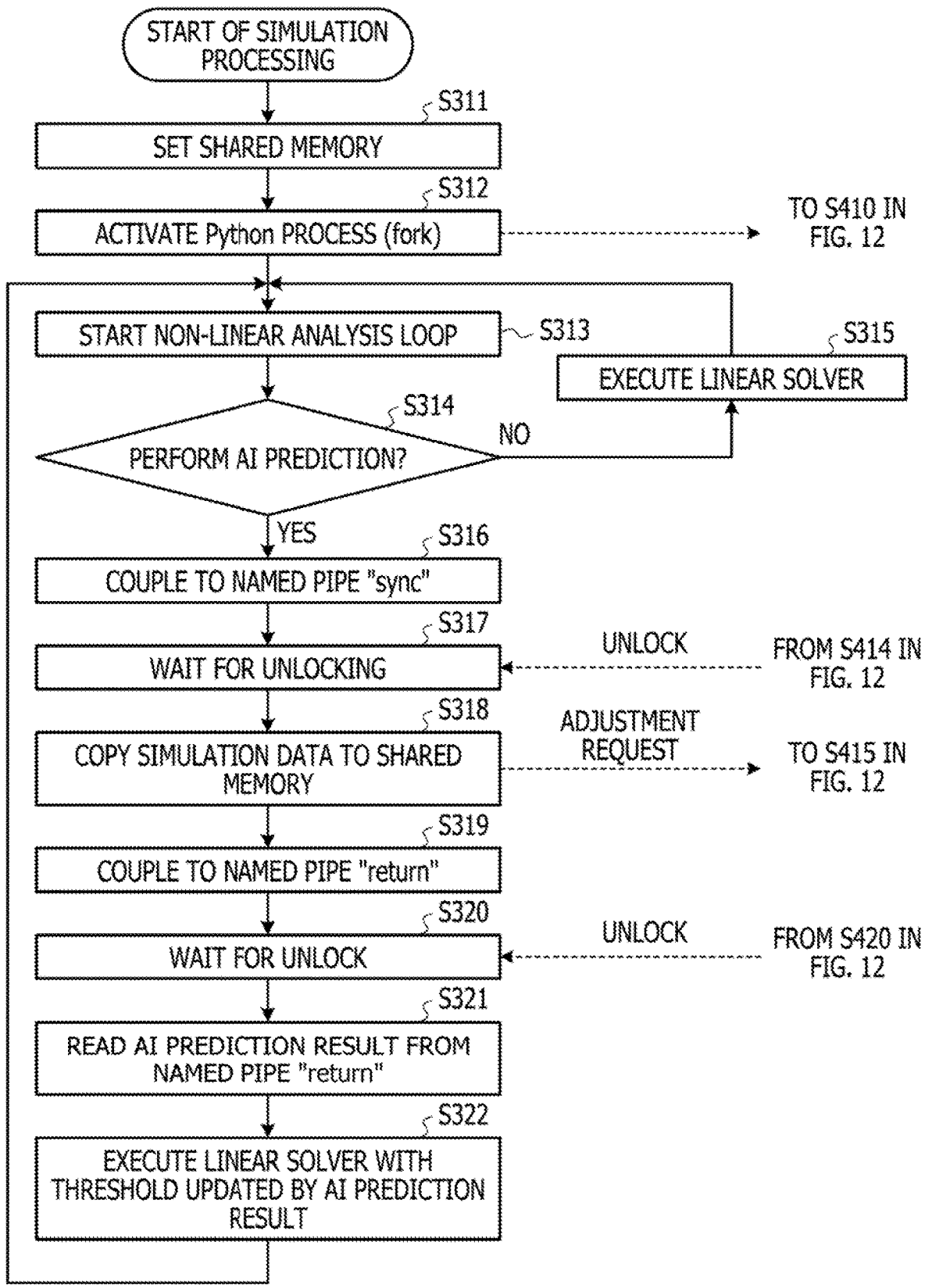
FIG. 11 is a flowchart for explaining simulation processing.
Figure 12:
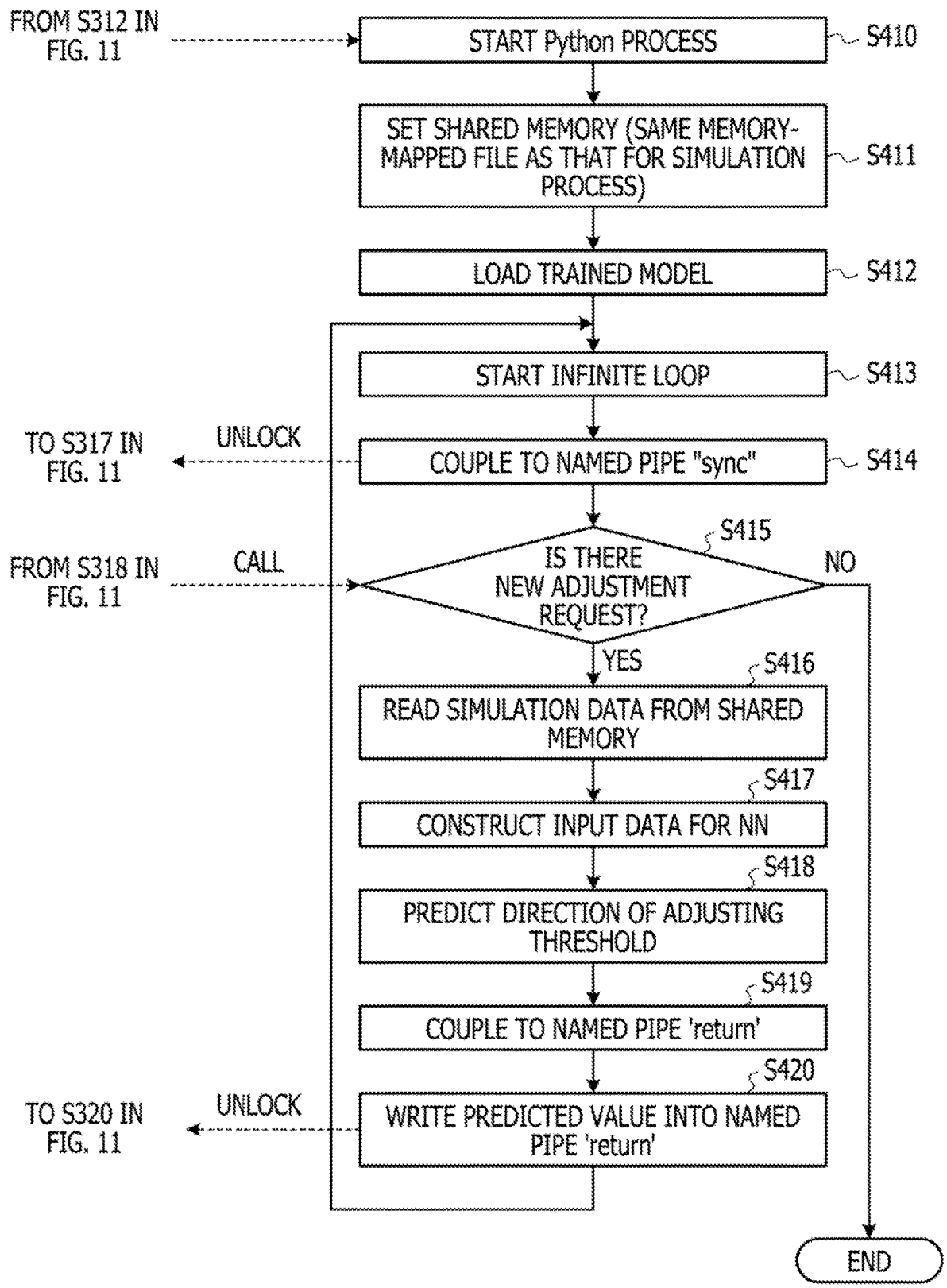
FIG. 12 is a flowchart for explaining a machine learning process operated in alignment with the simulation.

Next, the processing in the information processing apparatus 100 through the inter-process communication is described with reference to FIGS. 11 and 12. In FIGS. 11 and 12, the named pipe 12b-1 is denoted by "sync" and the named pipe 12b-2 is denoted by "return". FIG. 11 is a flowchart for explaining simulation processing.

As illustrated in FIG. 11, once starting the simulation process, the simulation unit 30 sets the shared memory 12a (step S311), and activates a Python process (fork) (step S312). The shared memory 12a is deployed in the OS virtual memory 12v with a memory-mapped file. The machine learning is started by the machine learning unit 40 (FIG. 12).

The non-linear analysis unit 32 then starts the non-linear analysis loop with the non-linear analysis unit 32 (step S313), and determines whether to perform the AI prediction (step S314). In the first embodiment, the A prediction corresponds to a machine learning process of predicting an increase or decrease of the residual threshold Th. As an example of determination on whether to perform the AI prediction, it may be determined whether or not an event of calling the machine learning process by "call auto_threshold" as illustrated in FIG. 4 have occurred.

In a case where the AI prediction is not performed (NO in step S314), the simulation unit 30 executes a linear solver (step S315). The linear analysis unit 34 performs the linear analysis. Thereafter, the simulation unit 30 returns to step S313 and iterates the non-linear analysis. In a case where the AI prediction is performed (YES in step S314), the non-linear analysis unit 32 is coupled to the named pipe "sync" and waits for unlocking (step S317).

When detecting the unlocking, the non-linear analysis unit 32 copies (writes) the simulation data 204d to the shared memory 12a (step S318). The simulation data 204d is written to the shared memory 12a by the DMA data transfer. The non-linear analysis unit 32 calls the machine learning unit 40 and perform adjustment request.

Thereafter, the non-linear analysis unit 32 reads and acquires the prediction result 71 from the named pipe "return" (step S321) and executes the linear solver with the threshold Th updated using the acquired prediction result 71 (step S322). After the processing by the linear solver is completed, the non-linear analysis unit 32 returns to step S313 and repeats the same processing as described above.

FIG. 12 is a flowchart for explaining the machine learning process operated in alignment with the simulation. In FIG. 12, the machine learning unit 40 is assumed to be programmed with Python. In response to the start of the Python process from the simulation process, the machine learning process is started by the machine learning unit 40 (step S410). The following description is made for the case where the predicting process is performed by the predicting unit 60. The learning process of the learning unit 50 is described in detail in the second embodiment.

The machine learning unit 40 sets the shared memory 12*a* (step S411), and the predicting unit 60 loads a trained model (step S412). The shared memory 12*a* is set by the same memory-mapped file as that for the simulation process. The trained model corresponds to the NN 270 trained by the learning unit 50.

The predicting unit 60 starts an infinite loop (step S413). With the start of the infinite loop, the predicting unit 60 is coupled to the named pipe "sync" (step S414). The coupling to the named pipe "sync" notifies the non-linear analysis unit 32 of the unlocking. The predicting unit 60 determines whether or not there is a new adjustment request (step S415).

The predicting unit 60 constructs input data from the simulation data 204*d* to allow the NN 270 (step S417), and input the input data into the NN 270 to predict the direction of adjustment of the threshold Th (step S418).

Figure 13:
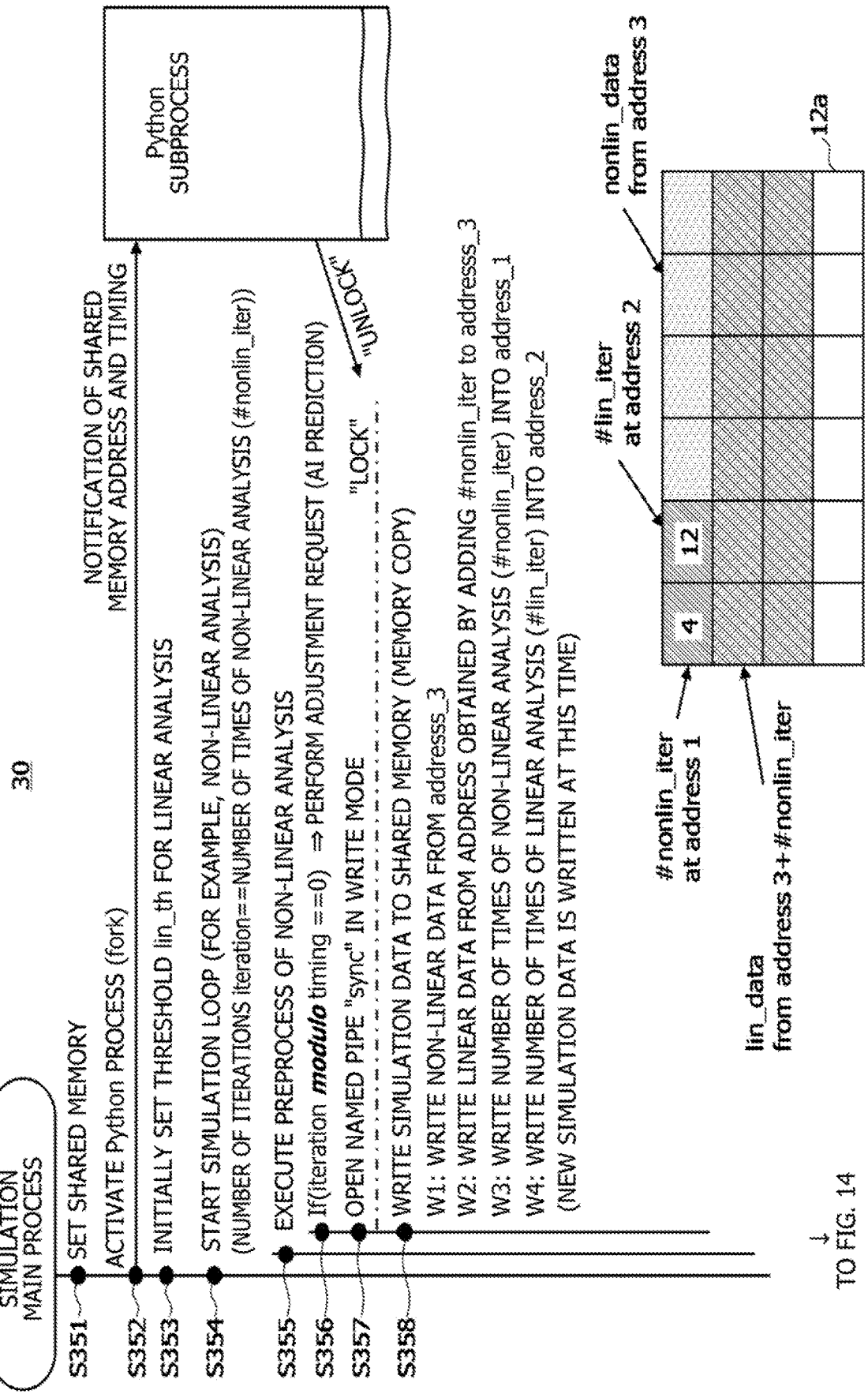
FIG. 13 is a diagram for explaining an example of processing involved in the inter-process communication in a main process of the simulation.
Figure 14:
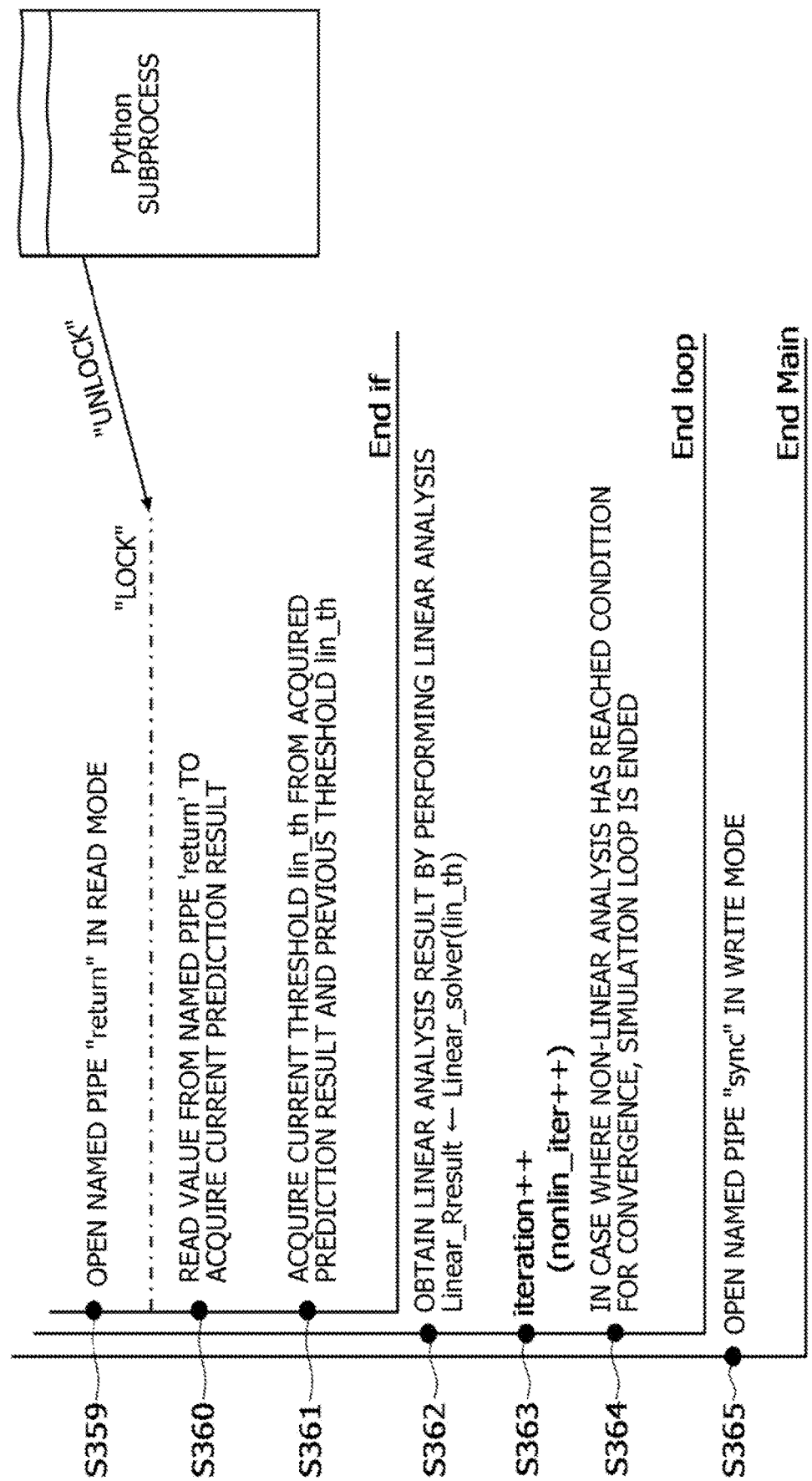
FIG. 14 is a diagram for explaining an example of processing involved in the inter-process communication in the main process of the simulation.

Next, the inter-process communication is described using an example. FIGS. 13 and 14 are diagrams for explaining an example of processing involved in the inter-process communication in the main process of the simulation.

As illustrated in FIG. 13, the simulation unit 30 sets the shared memory 12*a* at the time of starting the simulation (step S351). The simulation unit 30 activates the Python process (fork) (step S352). A Python subprocess is activated, and the Python subprocess is notified of the shared memory address and timing to share the shared memory 12*a*. The timing identifies the timing of performing the adjustment request. In a case where the timing indicates 2, this means that the adjustment request is made for every 2 times of the non-linear analysis.

The simulation unit 30 initializes a threshold lin_th for the linear analysis (step S353). The threshold lin_th is a variable corresponding to the threshold Th in FIG. 2. The initial set value of the threshold lin_th may be incorporated in the program of the simulation unit 30 or may be set by the user at the time of starting the simulation.

When the threshold lin_th is initially set, the simulation loop is started (step S354). For example, #nonlin_iter is set to an iteration value indicating the number of iterations such that the non-linear analysis by the non-linear analysis unit 32 is iterated the predetermined number of times (#nonlin_iter). Since the initial value of #nonlin_iter is 0, 0 is set as the iteration value at the time of initial setting. The non-linear analysis unit 32 executes a preprocess (step S355). The specific content of the preprocess is described with steps S356 to S361.

It is determined whether or not the iteration value is 0 (step S356). Simultaneously, the adjustment request for the threshold T is transmitted to the machine learning unit 40. In a case where the iteration value 0 (YES in step S356), the non-linear analysis unit 32 proceeds to step S362.

In a case where the iteration value is not 0 (NO in step S356), the non-linear analysis unit 32 opens the named pipe "sync" in a write mode (step S357). The non-linear analysis unit 32 waits for the unlocking from the machine learning unit 40 and then starts writing into the shared memory 12*a*.

When detecting the unlocking, the non-linear analysis unit 32 writes the simulation data 204*d* into the shared memory 12*a* (step S358). The simulation data 204*d* accumulated in the disk 13 is copied to the shared memory 12*a* through DMA data transfer.

Next, the non-linear analysis unit 32 performs writing to the shared memory 12*a* in order from W1 to W4 as described below. In the following description, an example where the shared memory 12*a* has 24 (=4×6) cells; however, the memory size is not limited to this.

Addresss_1 indicates the address of a cell in which #nonlin_iter (the number of iterations in the non-linear analysis) is stored, addresss_2 indicates the address of a cell in which #lin_iter (the number of iterations in the linear analysis) is stored, and addresss_3 indicates the start address of the non-linear analysis data. Since the non-linear analysis data is accumulated every time the non-linear analysis is iterated, the number of cells is increased. For this reason, the start address of the linear analysis data is indicated by a value obtained by adding #nonlin_iter to addresss_3.

W1: Write non-linear data from addresss_3.
W2: Write linear data from the address obtained by adding #nonlin_iter to addresss_3.
W3: Store #nonlin_iter in addresss_1. #nonlin_iter is updated.
W4: Store #lin_iter in addresss_2. #lin_iter is updated.

After the non-linear data and the linear data are written, #nonlin_iter and #lin_iter, which serve as counters, are updated. Ending of W1 to W4 indicates that the writing of new data is completed.

As illustrated in FIG. 14, the non-linear analysis unit 32 opens the named pipe "return" in a read mode (step S359). In response to the unlocking by the machine learning unit 40, the non-linear analysis unit 32 reads a value from the named pipe "return" to acquire the current prediction result 71 (step S360).

The non-linear analysis unit 32 acquires the current threshold lin_th from the acquired prediction result and the previous threshold lin_th (step S361). As an example, a processing unit (algorithm) that updates the threshold lin_th based on a prediction result may be included.

Upon acquisition of the current threshold lin_th by the update, the non-linear analysis unit 32 passes through the if clause in step S356 and causes the linear analysis unit 34 to perform a linear analysis to acquire a linear analysis result (step S362). The linear analysis unit 34 is notified of the current threshold lin_th. Then, iteration, which indicates the number of iterations, is incremented by 1 (step S363).

The non-linear analysis unit 32 determines whether or not the non-linear analysis has reached the condition for convergence (step S364). In a case where the non-linear analysis has not reached the condition for convergence (NO in step S364), the non-linear analysis unit 32 returns to step S356 in FIG. 13 and repeats the above-described processing. In a case where the non-linear analysis has reached the condition for convergence (YES in step S364), the non-linear analysis unit 32 ends the simulation loop.

After the simulation loop is ended, the simulation unit 30 opens the named pipe "sync" in the write mode (step S365). This main process is ended.

Figure 15:
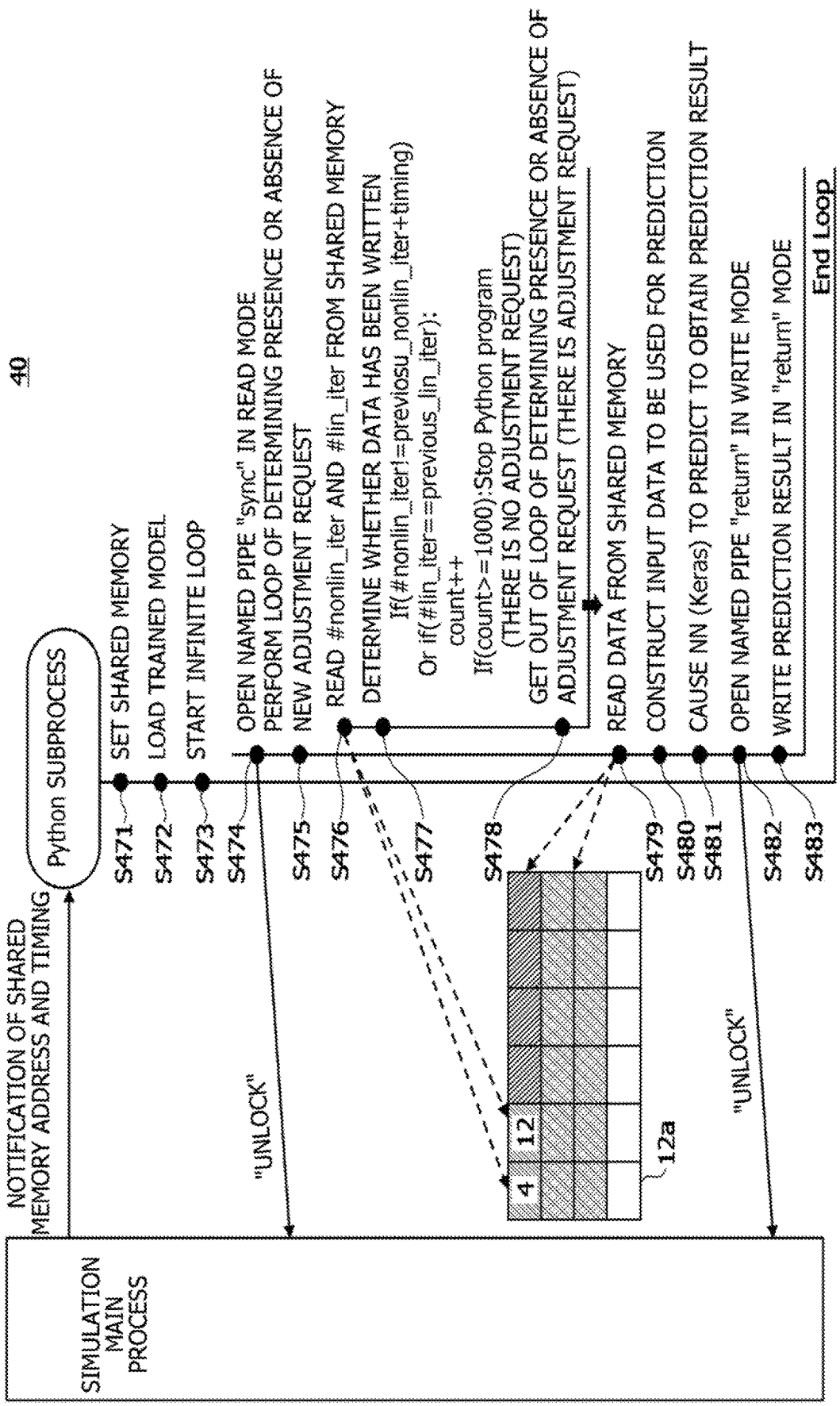
FIG. 15 is a diagram for explaining an example of processing involved in the inter-process communication in a Python subprocess.

FIG. 15 is a diagram for explaining an example of processing involved in the inter-process communication in the Python subprocess. In FIG. 15, in response to the notification of the shared memory address and timing from the simulation unit 30, the Python subprocess is activated, and machine learning according to the adjustment of the threshold Th by the machine learning unit 40 is performed in the Python subprocess.

The machine learning unit 40 sets the shared memory 12a based on the shared memory address provided by the simulation unit 30 (step S471) and loads the trained model (step S472). The infinite loop by the machine learning unit 40 is started (step S473). The content of processing performed in each infinite loop is described with steps S474 to S483.

The machine learning unit 40 opens the named pipe "sync" in the read mode (step S474). The simulation main process (the simulation unit 30) is notified of the unlocking. The machine learning unit 40 performs a loop of determining presence or absence of a new adjustment request (step S475).

For example, the machine learning unit 40 reads #nonlin_iter and #lin_iter, which indicate the number of analyses, from the shared memory 12a (step S476), and determines whether or not data has been written (step S477). For example, processing as described below is performed.

In a case where #nonlin_iter does not coincide with the value obtained by adding the timing to the previous number of times of the non-linear analysis (condition A) or where #lin_iter coincides with the previous number of times of the linear analysis (condition B), the count is incremented by 1. In a case where both conditions A and B are satisfied or in a case where the current count is more than or equal to a set value (for example, "1000") after the update of the count, the machine learning unit 40 determines that there is no new adjustment request, and ends the Python program.

In a case where either condition A or B is not satisfied, for example, in a case where the writing of data is confirmed, the machine learning unit 40 determines that there is a new adjustment request, gets out of the loop of determining presence or absence of a new adjustment request (step S478), and reads data from the shared memory 12a (step S479).

The predicting unit 40 constructs input data to be use for prediction (step S480) and predicts the adjustment of the threshold Th using the NN 270 (step S481). The NN 270 is Keras or the like and operates in the GPU 14g. The prediction result 71 is outputted from the predicting unit 40.

The machine learning unit 40 opens the named pipe "return" in the write mode (step S482) and writes the prediction result into the named pipe "return" in the "return" mode. Thereafter, the infinite loop is ended and the processing by the machine learning unit 40 is ended. The Python subprocess is ended.

FIG. 16A to 16C are diagram illustrating state examples of the inter-process communication. The timing at which an adjustment request is performed is supposed to be 2. FIG. 16A illustrates a state example of the shared memory 12a immediately after the simulation has been iterated 4 times. In the shared memory 12a, #nonlin_iter indicates 4 times, and the non-linear analysis data is written in 4 cells. #lin_iter indicates 12 times, and the linear analysis data is written in 12 cells.

The state of the machine learning unit 40 is supposed such that the current #nonlin_iter is recognized as 2 times and #lin_iter is recognized as 6 times. The timing is supposed to be 2. In this case, a value "4" obtained by adding the current #nonlin_iter "2 times" and the timing "2" coincides with #nonlin_iter "4 times" in the shared memory 12a. The current #lin_iter "6 times" does not coincide with #lin_iter "12 times". In this case, it is determined that there is a new adjustment request.

FIG. 16B illustrates a state example in which data has been written in the simulation but the counter has not been updated. In the shared memory 12a, #nonlin_iter indicates 4 times, and the non-linear analysis data is written in 6 cells. #lin_iter indicates 12 times, and the linear analysis data is written in 16 cells.

This state is such that the non-linear analysis has been performed 2 times and each result has been written in each cell, and 6 cells in total have been utilized. This state is such that since using the threshold Th updated in FIG. 16A, the linear analysis is executed 2 times and the linear analysis data is written into 2 cells for each execution, 16 cells in total including the previous and earlier data have been utilized. #lin_iter has not updated.

The state of the machine learning unit 40 is supposed such that the current #nonlin_iter is recognized as 4 times and #lin_iter is recognized as 12 times. In this case, a value "6" obtained by adding the current #nonlin_iter "4 times" and the timing "2" does not coincide with #nonlin_iter "4 times" in the shared memory 12a. The current #lin_iter "12 times" coincides with #lin_iter "12 times". In this case, it is determined that there is no new adjustment request.

FIG. 16C illustrates a state example in which after the completion of the writing of data, the simulation has stored the counter in the shared memory. In the shared memory 12a, #nonlin_iter has been updated to 6 times. #lin_iter has been updated to 16 times.

The state of the machine learning unit 40 is supposed such that the current #nonlin_iter is recognized as 4 times and #lin_iter is recognized as 12 times. In this case, a value "6" obtained by adding the current #nonlin_iter "4 times" and the timing "2" coincides with #nonlin_iter "6 times" in the shared memory 12a. The current #lin_iter "12 times" coincides with #lin_iter "12 times". In this case, it is determined that there is a new adjustment request.

Figure 17:
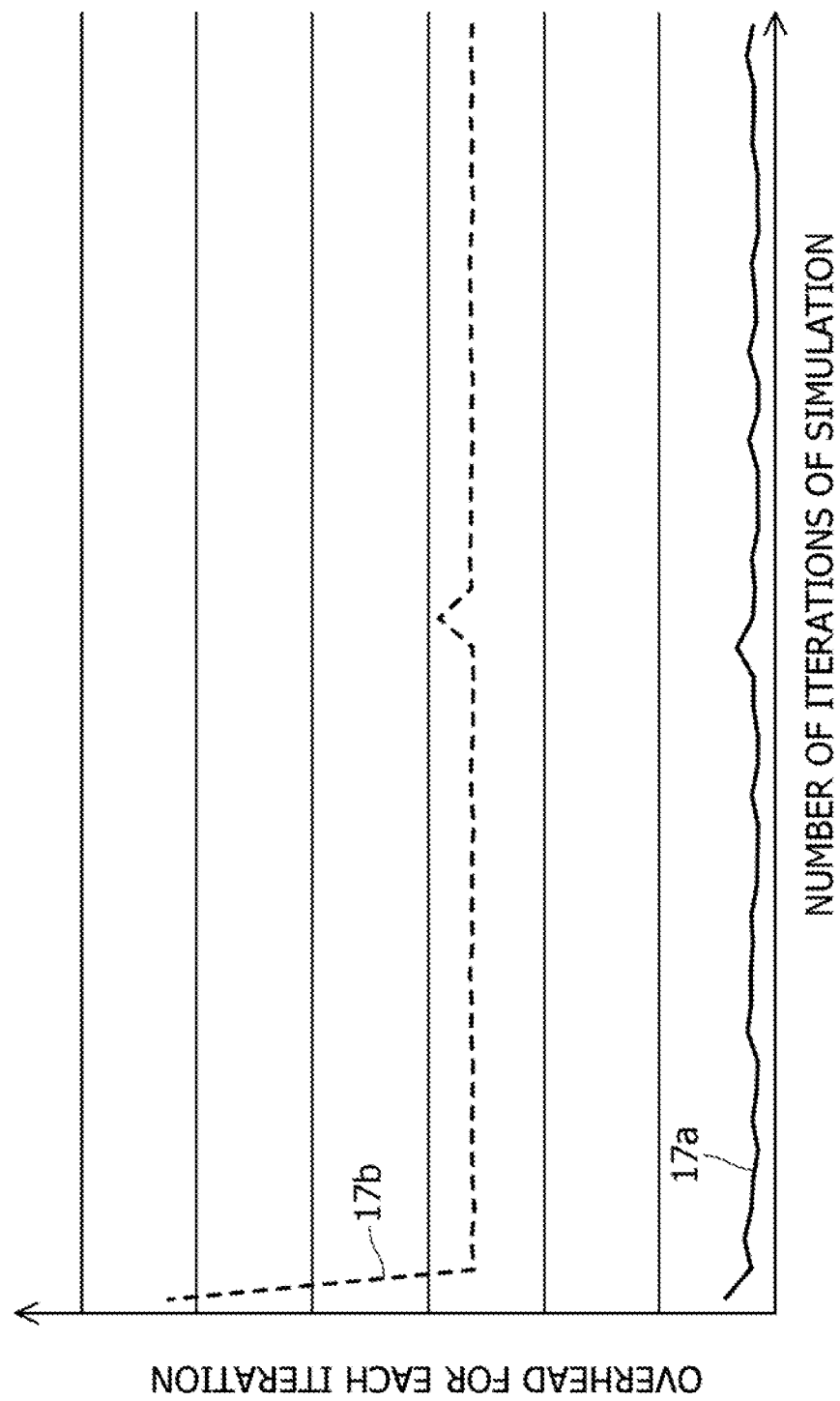
FIG. 17 is a diagram illustrating an example of a result of checking an overhead.

FIG. 17 is a diagram illustrating an example of a result of checking an overhead. In FIG. 17, the horizontal axis indicates the number of iterations of the simulation (for example, the non-linear analysis) and the vertical axis indicates the time of an overhead for each iteration.

The operating environment is such that in a case where the data size is 1 GB, the overhead 17a indicates an overhead obtained when data shared between the simulation unit 30 and the machine learning unit 40 is a memory-mapped file using the shared memory 12a in the first embodiment, and the overhead 17b indicates an overhead applied due to input to or output from the disk 13.

It is seen that the first embodiment is capable of reducing the overhead from the sum of the overhead 17b and the overhead 17a in the first embodiment.

Figure 18:
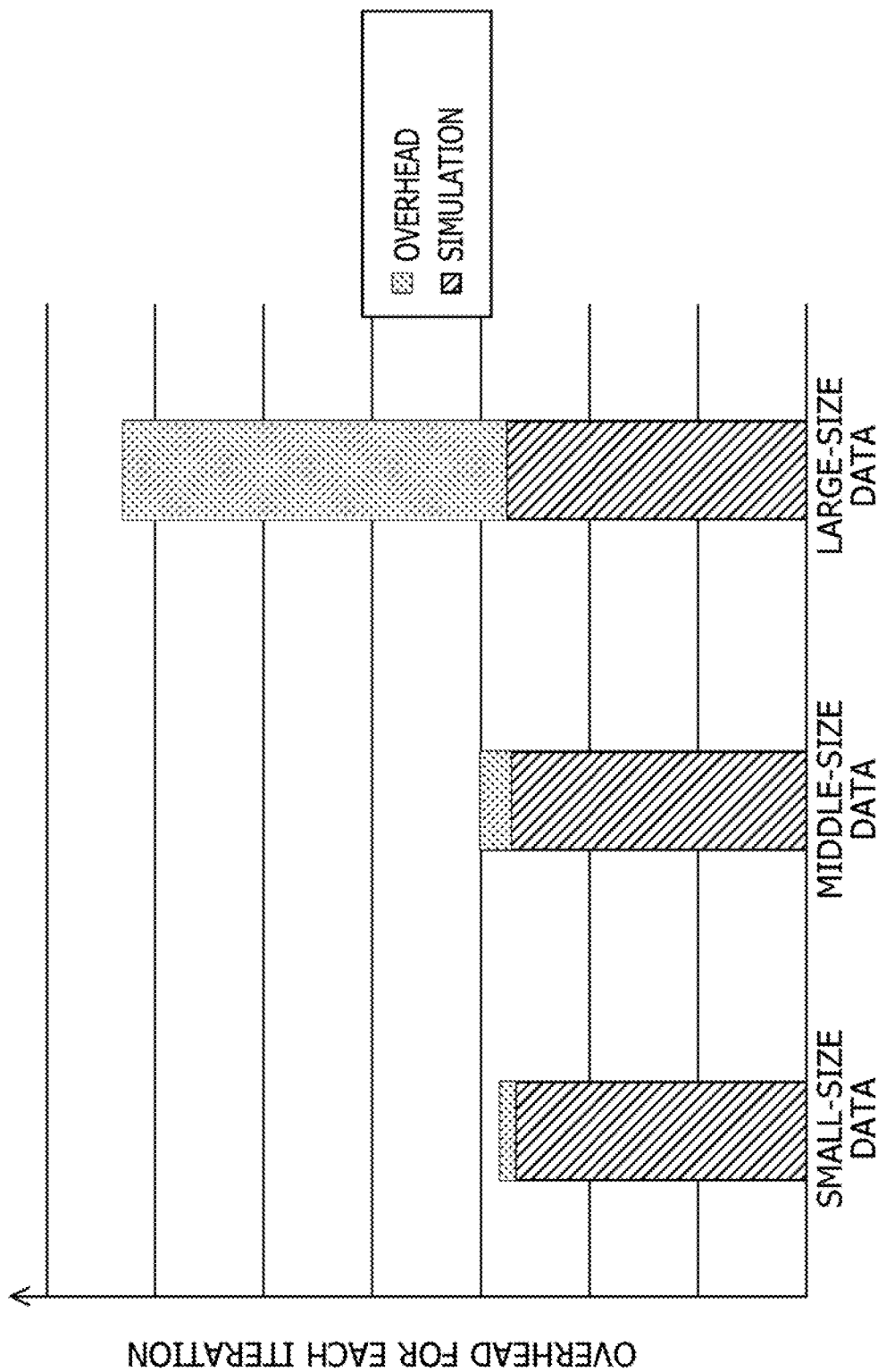
FIG. 18 is a diagram illustrating a result of checking overheads for different data sizes in input to and output from a disk.
Figure 19:
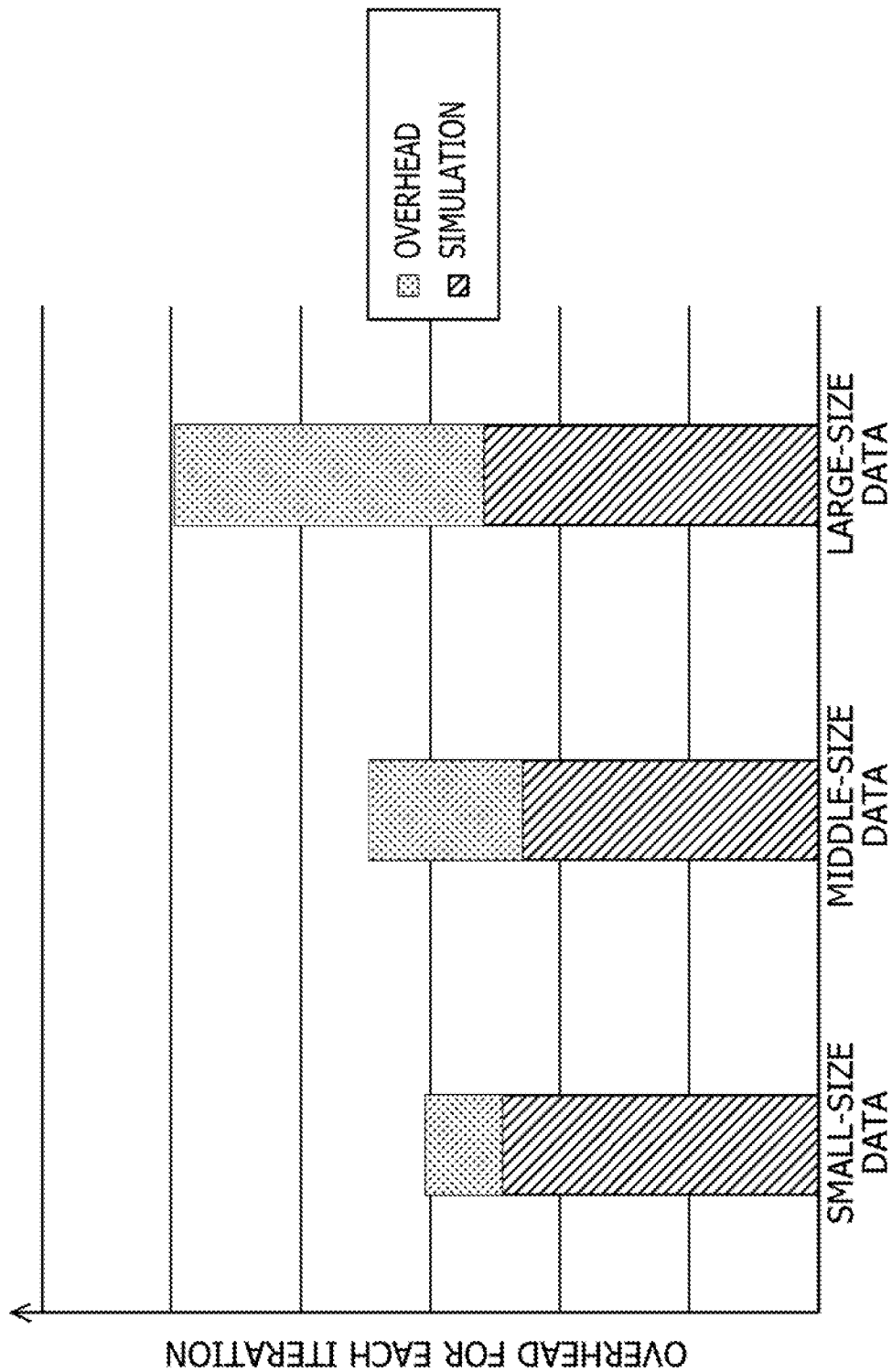
FIG. 19 is a diagram illustrating a result of checking overheads for different data sizes in input to and output from a disk.

Furthermore, results of checking an overhead in terms of differences in data size are illustrated in FIGS. 18 and 19.

FIG. 18 is a diagram illustrating a result of checking overheads for different data sizes in input to and output from the disk. FIG. 18 illustrates times for an overhead and a simulation of each data size and a proportion of the overhead to the entire time.

FIG. 19 is a diagram illustrating a result of checking overheads for different data sizes in input to and output from the disk. FIG. 19 illustrates times for an overhead and a simulation of each data size and a proportion of the overhead to the entire time.

As described above, in a simulation using machine learning, the first embodiment is capable of obviously shortening the processing time.

Hereinafter, in the second embodiment, a mechanism that improves the adjustment accuracy of the threshold Th by machine learning is described.

Second Embodiment

In the second embodiment, in a simulation such as a structural analysis or a fluid analysis, using a non-linear analysis to obtain a solution by iteratively solving a linear analysis, the threshold Th used for determination of convergence in the linear analysis is dynamically adjusted by machine learning in accordance with the state of execution of the simulation.

Figure 20:
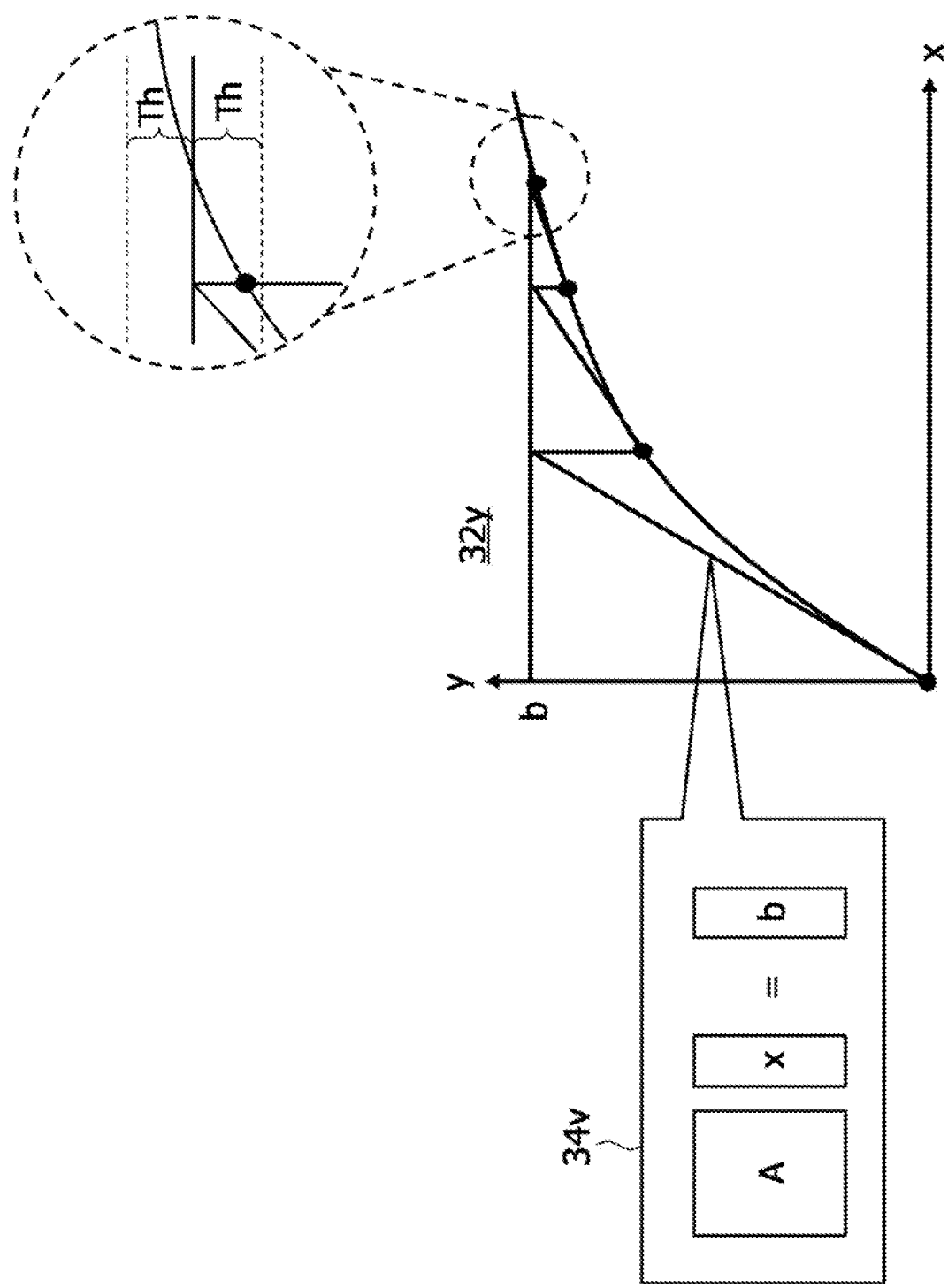
FIG. 20 is a diagram for explaining a non-linear analysis.

FIG. 20 is a diagram for explaining the non-linear analysis. In a linear solver that performs a linear analysis, a solution is obtained using the CG method as an iterative method. As illustrated in FIG. 20, for iteration, a solution vector x is iteratively updated until conditions for convergence is satisfied. As one of the conditions for convergence, the residual threshold Th is used. The residual is expressed by a norm of a residual vector r, and the residual vector r is initialized in accordance with $r_0 = b - Ax$. When the residual becomes lower than or equal to the threshold Th, the solution vector x is considered to have been converged and the iteration is ended.

The threshold Th affects the accuracy of the solution and the execution time. The smaller the threshold, the higher the accuracy of the solution. However, since an increase in the number of iterations leads to an increase in execution time, it is favorable to set a threshold value that makes it possible to obtain a solution with desired accuracy with as little number of iterations as possible. However, the threshold Th is set by the user's empirical or heuristic determination. Hence, an approach to increase the speed of the entire non-linear analysis (for example, the entire simulation) by estimating an optimum residual threshold Th at a high speed using machine learning is described.

Figure 21:
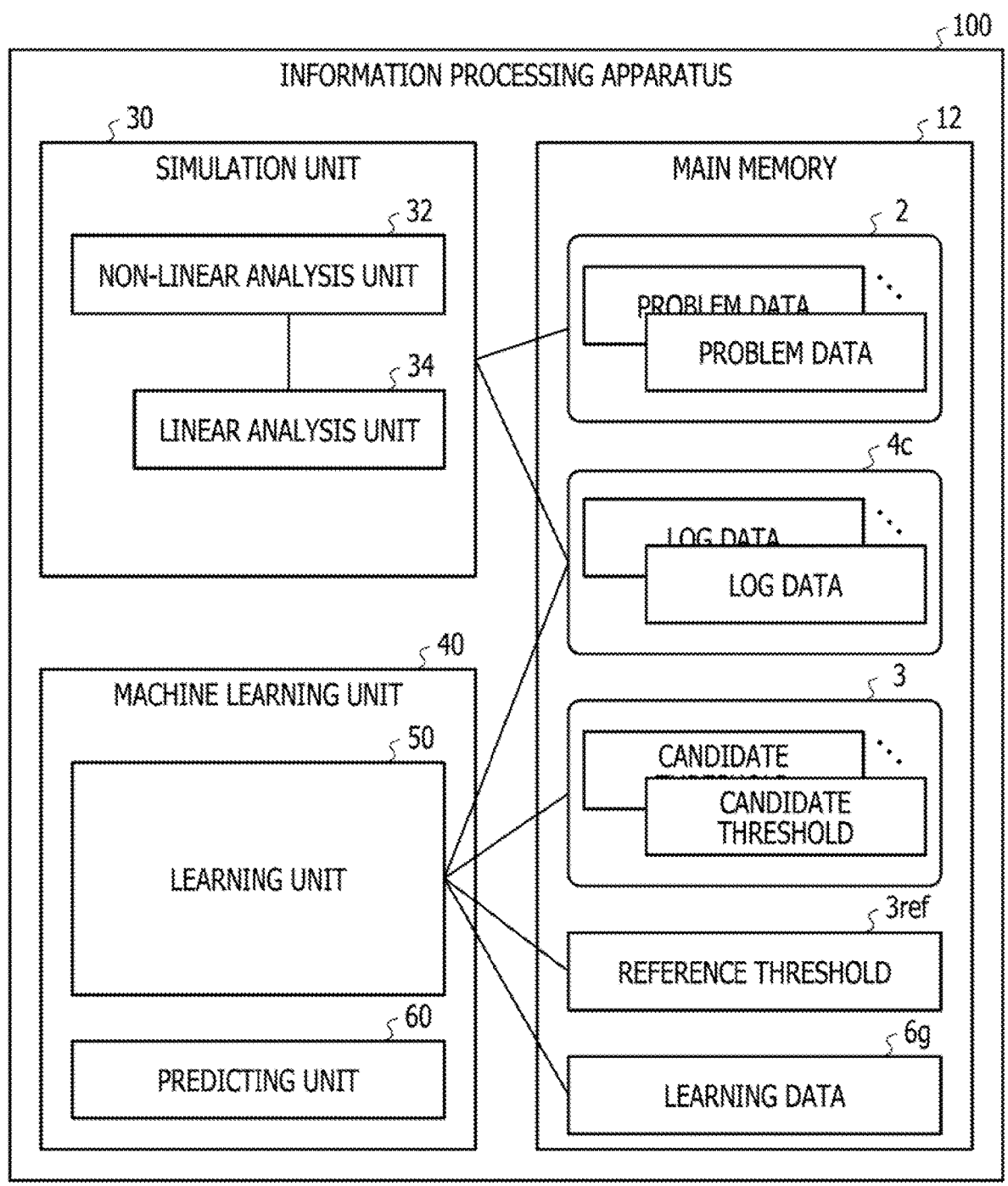
FIG. 21 is a diagram for explaining an outline of a learning unit in a first functional configuration example of an information processing apparatus according to a second embodiment.

FIG. 21 is a diagram for explaining an outline of a learning unit in a first functional configuration example of an information processing apparatus according to the second embodiment. In FIG. 21, the information processing apparatus 100 mainly includes a simulation unit 30 and a machine learning unit 40. The main memory 12 stores a problem data 2, a log data 4c, candidate thresholds 3, a reference threshold 3ref, learning data 6g, and the like. Part of the main memory 12 is utilized as a shared memory 12a as described in the first embodiment.

The simulation unit 30, as described in FIG. 2, includes a non-linear analysis unit 32 and a linear analysis unit 34, acquires a residual and time for each iteration of a linear analysis, and outputs a log data 4c. The log data 4c records the residual and time at the time of a linear analysis iteratively executed until the residual is converged into the threshold Th for a predetermined number of iterations of a non-linear analysis.

When called from the learning unit 50, the simulation unit 30 performs a simulation with the fixed threshold Th given from the learning unit 50. For example, a simulation that does not use machine learning is performed. For example, a simulation is performed with "call auto_threshold" in the pseudocode 31 in FIG. 4 being deactivated.

The machine learning unit 40, as illustrated in FIG. 21, includes: a learning unit 50, which learns the adjustment of the threshold Th with the NN 270; and a predicting unit 60, which performs the adjustment of the threshold Th in the simulation. The predicting unit 60 is described with reference to FIG. 22.

The learning unit 50 learns the NN 270 for adjusting the threshold Th using log data 4c obtained by the simulation unit 30 giving each problem data 2 each candidate threshold 3 of the plurality of candidate thresholds 3. Each of the plurality of candidate thresholds 3 is given to the simulation unit 30, which is then caused to perform the simulation to acquire the log data 4c. Alternatively, the learning unit 50 may include a processing unit that causes the simulation to be performed on each of the plurality of candidate thresholds 3.

By giving a selected candidate threshold 3 to the simulation unit 30, the learning unit 50 causes the simulation unit 30 to perform the simulation on the problem data 2. The simulation unit 30 outputs log data 4c which indicates the time taken for each iteration of the linear analysis and residual r. The log data 4c is obtained for each candidate threshold 3. The input and output of the log data 4c may be performed through an inter-process communication similar to that using the shared memory 12a, which is described in the first embodiment.

The learning unit 50 refers to the log data 4c obtained for each candidate threshold 3, determines the reference threshold 3ref from among the candidate thresholds 3 using the residual transition, the calculation time, and the like for each iteration, and stores the reference threshold 3ref into the main memory 12.

The learning unit 50 applies a label to each log data 4c based on the reference threshold 3ref to generate learning data 6g. The labeling is performed based on a result of comparison between the candidate threshold 3 of the log data 4c and the reference threshold 3ref.

As an example of the labeling, label "1" is applied to the log data 4c of the candidate threshold 3 that is smaller than the reference threshold 3ref, and label "3" is applied to the log data 4c of the candidate threshold 3 that is larger than the reference threshold 3ref. The learning unit 50 applies label "2" to the log data 4c using the candidate threshold 3 that coincides with the reference threshold 3ref.

In the learning unit 50, once the prediction result 71 is obtained by constructing input data from the learning data 6g and inputting the input data 6g into the NN 270, an error obtained by comparison with the label applied to the learning data 6g is fed back to the NN 270. The learning unit 50 learns the NN 270 using all the log data 4c obtained by the simulation unit 30.

Figure 22:
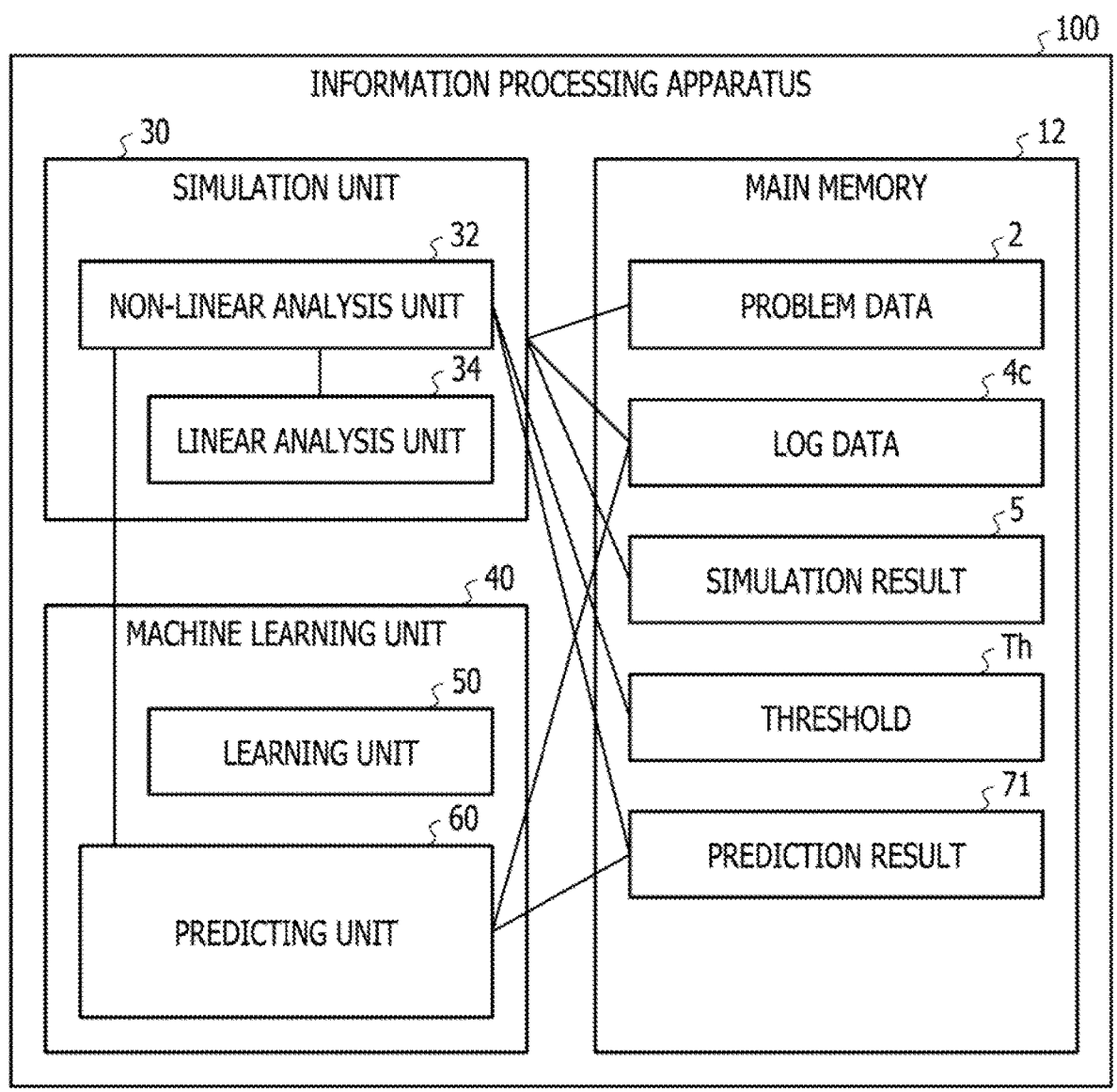
FIG. 22 is a diagram for explaining an outline of a predicting unit in the first functional configuration example of the information processing apparatus according to the second embodiment.

FIG. 22 is a diagram for explaining an outline of the predicting unit in the first functional configuration example of the information processing apparatus according to the second embodiment. In FIG. 22, in the information processing apparatus 100, mainly the simulation unit 30 and the predicting unit 60 of the machine learning unit 40 operate at the time of prediction. The main memory 12 stores the problem data 2, the log data 4c, the simulation result 5, the threshold Th, the prediction result 71, and the like. The predicting unit 60 is described here.

The simulation unit 30 analyzes unknown problem data 2 and outputs obtained log data 4c. The log data 4c corresponds to the simulation data 204d in the first embodiment and may be handled as a memory-mapped file. The log data 4c is stored in the shared memory 12a, and the start address of the log data 4c is identified in the named pipe 12b-1.

In response to call from the non-linear analysis unit 32 of the simulation unit 30, the predicting unit 60 predicts an increase or decrease of the threshold Th using the trained NN 270 with the log data 4c obtained by the simulation unit 30, and outputs the obtained prediction result 71. The non-linear analysis unit 32 is notified of the prediction result 71 as a return value. The return value may be set in the named pipe 12b-2 (FIGS. 7 and 11).

Next, a determination example of the reference threshold 3ref is described. As an example, a simulation time for each candidate threshold is checked in advance, and the candidate threshold 3 having the shortest execution time among obtained execution times may be set as the reference threshold 3ref.

Figure 23:
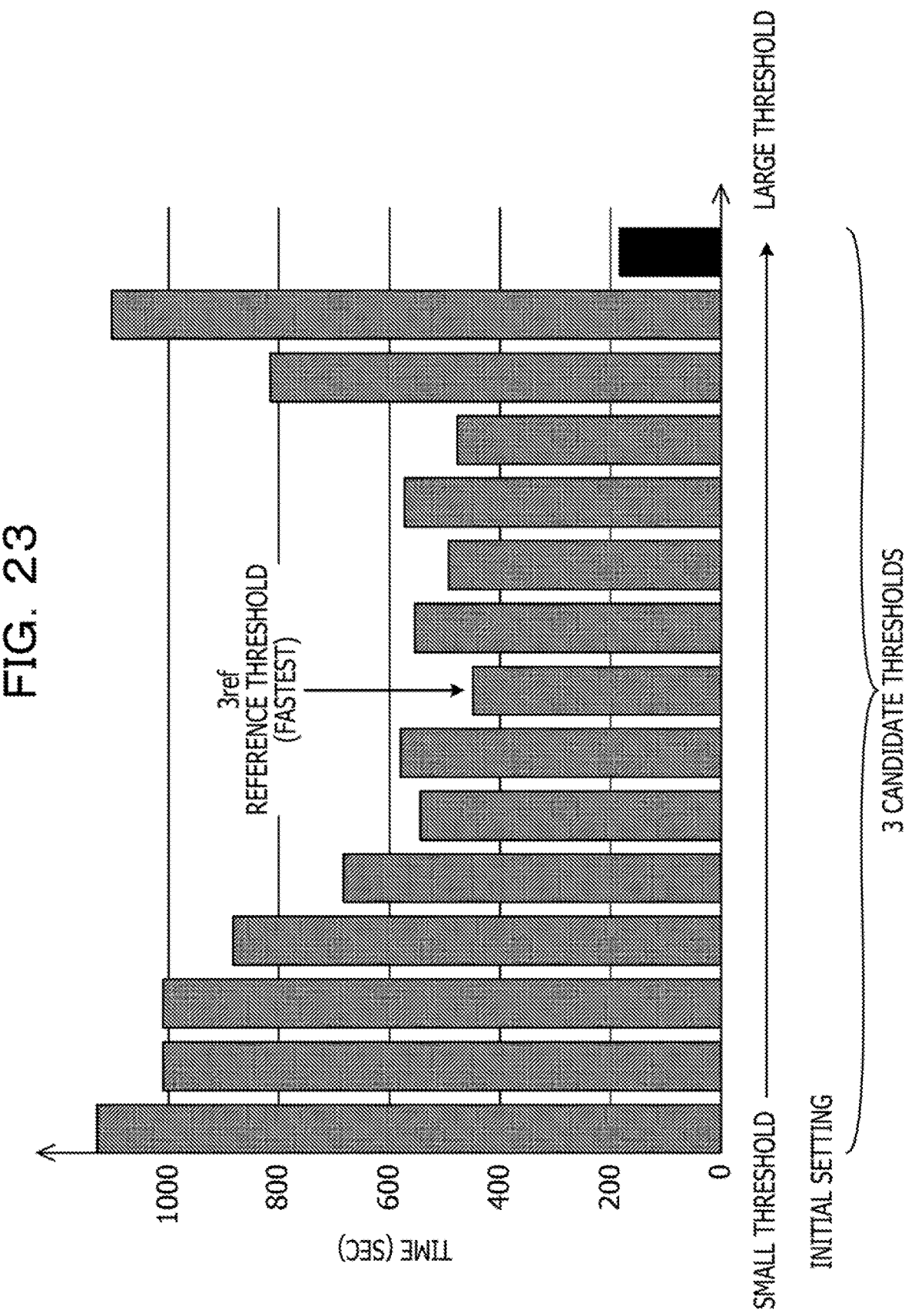
FIG. 23 is a diagram illustrating a checking example of a simulation time for each candidate threshold.

FIG. 23 is a diagram illustrating a checking example of a simulation time for each candidate threshold.

The candidate threshold having the shortest simulation time among those obtained by performing the simulation with the respective candidate threshold 3 is set as the reference threshold 3ref. The reference threshold 3ref determined as described above is used as a boundary, and the change of the threshold is determined based on the boundary.

Figure 24B:
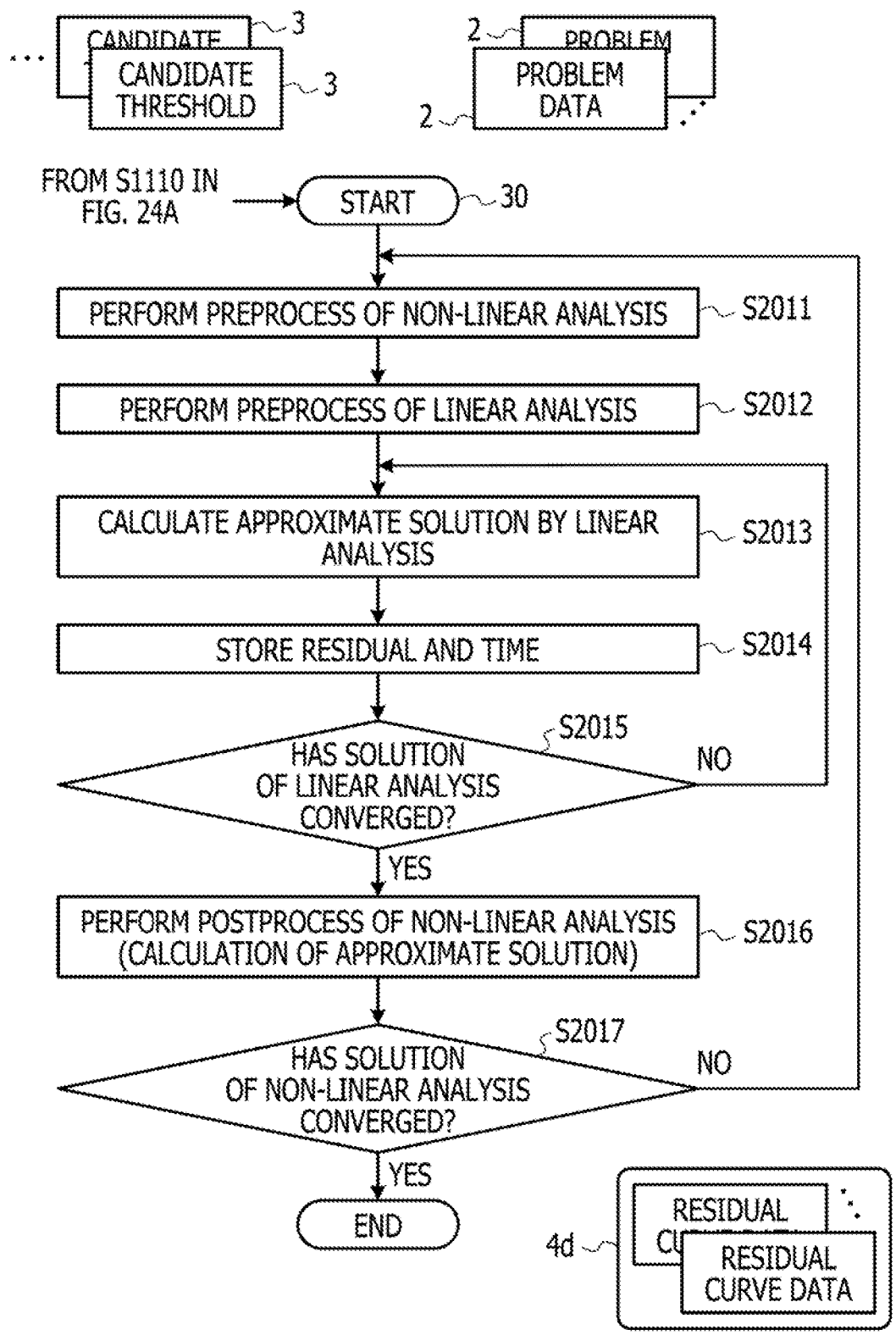
FIG. 24B is a flowchart for explaining a learning process in the first functional configuration example.

FIGS. 24A and 24B are a flowchart for explaining the learning process in the first functional configuration example. In FIG. 24A, in the machine learning unit 40, the learning unit 50 gives a plurality of candidate thresholds 3 in order to the simulation unit 30, which is then caused to perform the simulation to acquire log data 4c for each candidate threshold 3 (step S1110). The log data 4c contains a residual and execution time of the simulation for each iteration of the linear analysis.

Upon acquisition of the log data 4c, the learning unit 50 identifies a candidate threshold 3 that ended the simulation in the shortest time from among the plurality of log data 4c (step S1120). The learning unit 50 then sets the identified candidate threshold 3 as the reference threshold 3ref, and labels the log data 4c based on a magnitude relation between the reference threshold 3ref and the candidate threshold 3 to generate learning data 6g (step S1130).

The learning unit 50 learns the NN 270 using the generated learning data 6g (step S1150). After ending the learning using different learning data 6g of the candidate thresholds 3 for a plurality of problem data 2, the learning unit 50 ends this learning process.

On the other hand, upon receipt of the candidate threshold 3, the simulation unit 30 starts the simulation accordance with flow chart as shown FIG. 24B. The simulation unit 30 reads one of the problem data 2, and sets the candidate threshold 3 to the threshold Th. The non-linear analysis unit 32 performs a preprocess of the non-linear analysis (step S2011).

Next, after performing the preprocess (step S2012), the linear analysis unit 34 calculates an approximate solution with the linear analysis (step S2013) and stores the obtained residual and time into the main memory 12 (step S2014). The linear analysis unit 34 performs determination of convergence as to whether or not the solution of the linear analysis has been converged using the threshold Th (=the candidate threshold 3) (step S2015). In a case where the solution is determined not to have converged (NO in step S2015), the linear analysis unit 34 returns to step S2013 and repeats the above-described processing.

In a case where the solution is determined to have converged (YES in step S2015), the non-linear analysis unit 32 performs a postprocess of the non-linear analysis (calculation of an approximate solution) (step S2016) and performs determination of convergence as to whether or not the solution of the non-linear analysis has been converged (step S2017). The determination of convergence of the non-linear analysis is made using a threshold for the non-linear analysis.

As a result, in a case where the solution is determined not to have converged (NO in step S2017), the non-linear analysis unit 32 returns to step S2011 and repeats the above-described processing. In a case where the solution is determined to have converged (YES in step S2017), the simulation unit 30 stores a simulation end time into the main memory 12 and ends this simulation. At the time of ending the simulation, the simulation end time may be stored with the residual being 0.

The simulation unit 30 may notify the learning unit 50 of the machine learning unit 40 of the end for each of the ends of the respective simulations of the problem data 2, or may notify the learning unit 50 of the machine learning unit 40 of the end after the simulation for the last candidate threshold 3 is ended. Alternatively, the simulation unit 30 may notify the learning unit 50 of the end of the simulation after outputting the log data 4c for all combinations of the problem data 2 and the candidate thresholds 3. The same applies to the other functional configuration examples in the second embodiment.

Figure 25:
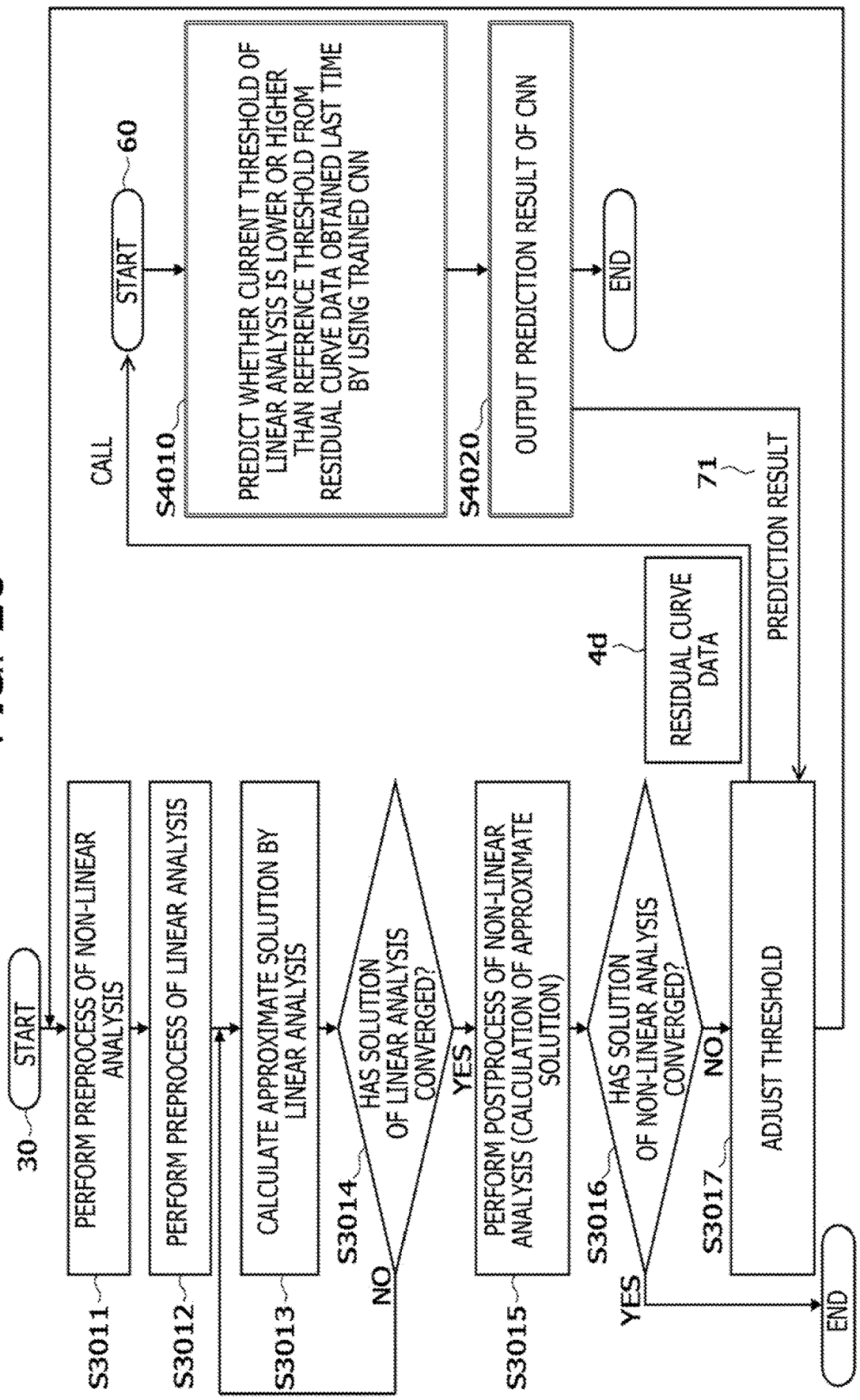
FIG. 25 is a flowchart for explaining a predicting process in the first functional configuration example.

FIG. 25 is a flowchart for explaining the predicting process in the first functional configuration example. In FIG. 25, at the time of activating the simulation unit 30, the simulation time is reset and time measurement is started.

At the time of starting the simulation, the simulation unit 30 initially sets the threshold Th, and the non-linear analysis unit 32 performs a preprocess of the non-linear analysis (step S3011). The linear analysis unit 34 then performs a preprocess of the linear analysis (step S3012), calculates an approximate solution of the linear analysis (step S3013), and performs determination of convergence as to whether or not the solution of the linear analysis has been converged using the threshold Th (step S3014). In a case where the solution is determined not to have converged (NO in step S3014), the linear analysis unit 34 returns to step S3013 and repeats the above-described processing.

In a case where the solution is determined to have converged (YES in step S3014), the non-linear analysis unit 32 performs a postprocess of the non-linear analysis (calculation of an approximate solution) (step S3015) and performs determination of convergence as to whether or not the solution of the non-linear analysis has been converged (step S3016). The determination of convergence of the non-linear analysis is made using a threshold for the non-linear analysis.

As a result, in a case where the solution is determined not to have converged (NO in step S3016), the non-linear analysis unit 32 issues an adjustment request to cause the predicting unit 60 to predict the adjustment of the threshold Th, updates the threshold Th using the obtained prediction result 71 (step S3017), and returns to step S3011 and repeats the above-described processing. In a case where the solution is determined to have converged (YES in step S3016), the non-linear analysis unit 32 returns to step S3013 and repeats the above-described processing.

In response to the adjustment request, the predicting unit 60 predicts whether the current threshold Th of the linear analysis is lower or higher than the reference threshold 3ref from the log data 4c obtained the last time by using the trained NN 270 (step S4010). The predicting unit 60 outputs the obtained prediction result 71 (step S4020), and ends this predicting process.

Although the log data 4c is used as it is in the above-described first functional configuration example, segmenting the log data 4c into certain segments for learning makes it possible to expand data and improve the accuracy in adjustment of the threshold Th in the first functional configuration example.

The above-described first functional configuration example is described as the case of classifying into the classes 1, 2, and 3. The classification may however be made into the case where the threshold Th is increased and the other case. In such a case, the learning unit 40 may apply the label 0 in the case where the candidate threshold 3 is lower than the reference threshold 3ref in the learning and apply the label 1 in the other case, and infer the class 0 or the class 1 as the inference result 71. The non-linear analysis unit 32 may perform a steady analysis such as that including a linear solver inside. The same applies to a second functional configuration example described below.

Figure 26:
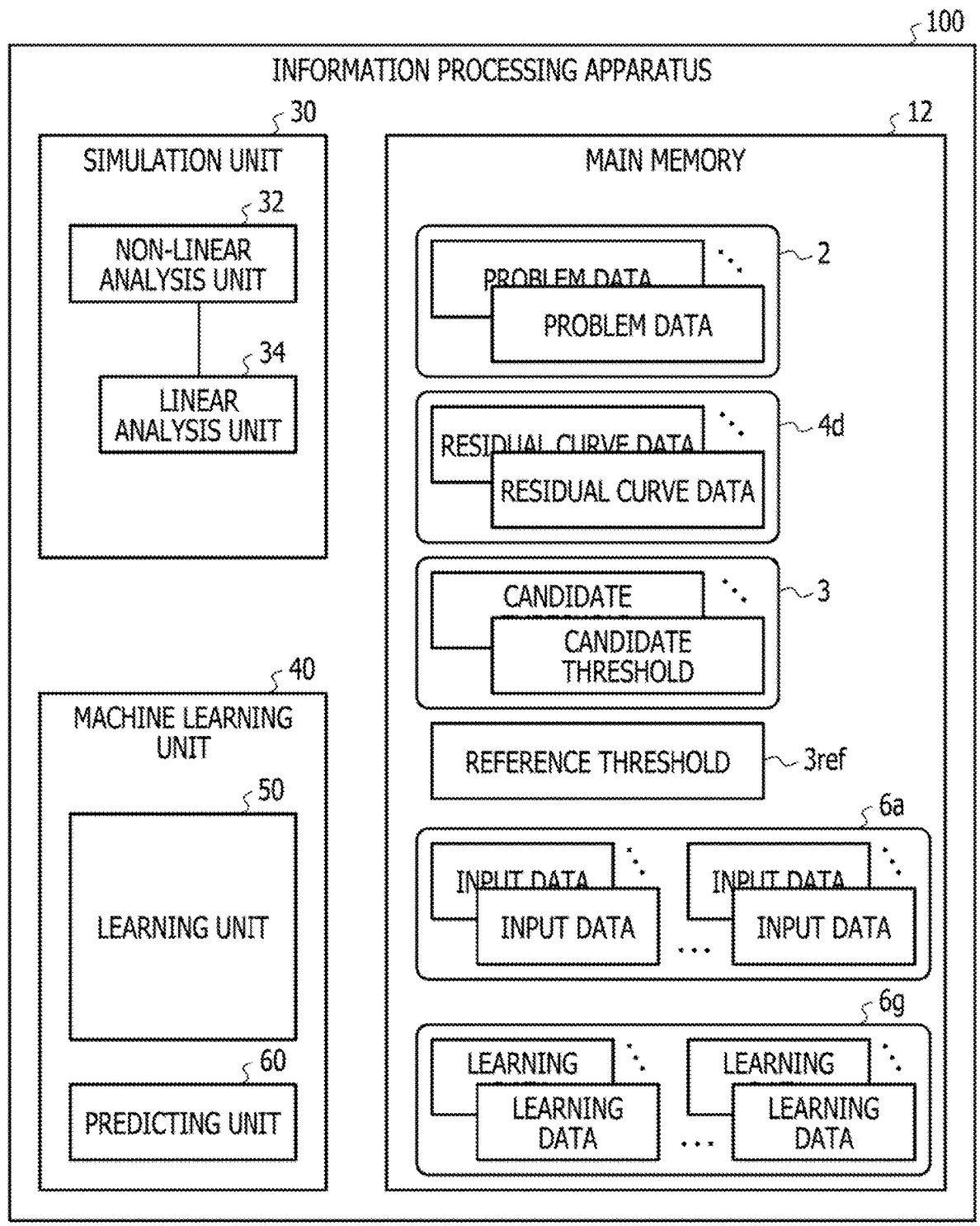
FIG. 26 is a diagram for explaining an outline of a learning unit in a second functional configuration example of the information processing apparatus according to the second embodiment.

FIG. 26 is a diagram for explaining an outline of a learning unit in a second functional configuration example of the information processing apparatus according to the second embodiment. In FIG. 26, the same processing units and data as those in FIG. 21 are denoted by the same reference signs, and description of these is omitted. In the second embodiment, a plurality of input data are generated by segmenting a residual curve into certain segments for learning. Data representing a residual curve contained in log data 4c is referred to as a residual curve data 4d.

Like the first functional configuration example, the learning unit 50 determines a reference threshold 3ref from a plurality of residual curve data 4d obtained by the simulation unit 30 giving each problem data 2 each candidate threshold 3 of a plurality of candidate thresholds 3. The learning unit 50 identifies a candidate threshold 3 that has ended the simulation in the shortest time and sets the candidate threshold 3 as the reference threshold 3ref. The learning unit 50 determines a label based on whether or not the candidate threshold 3 of the residual curve data 4d is smaller than the reference threshold 3ref.

Thereafter, in the second functional configuration example, the learning unit 50 generates a plurality of input data 6a by segmenting the residual curve data 4d into certain segments, and applies the label determined for the residual curve data 4d to each of the plurality of input data 6a to generate a plurality of learning data 6g. The labeling is as described above.

The learning unit 50 feeds back, to the NN 270, the error between a prediction result 71 obtained by inputting each one of the generated learning data 6g into the NN 270 and the label applied to the learning data 6g, to improve the accuracy in correct answer of the NN 270.

Figure 27:
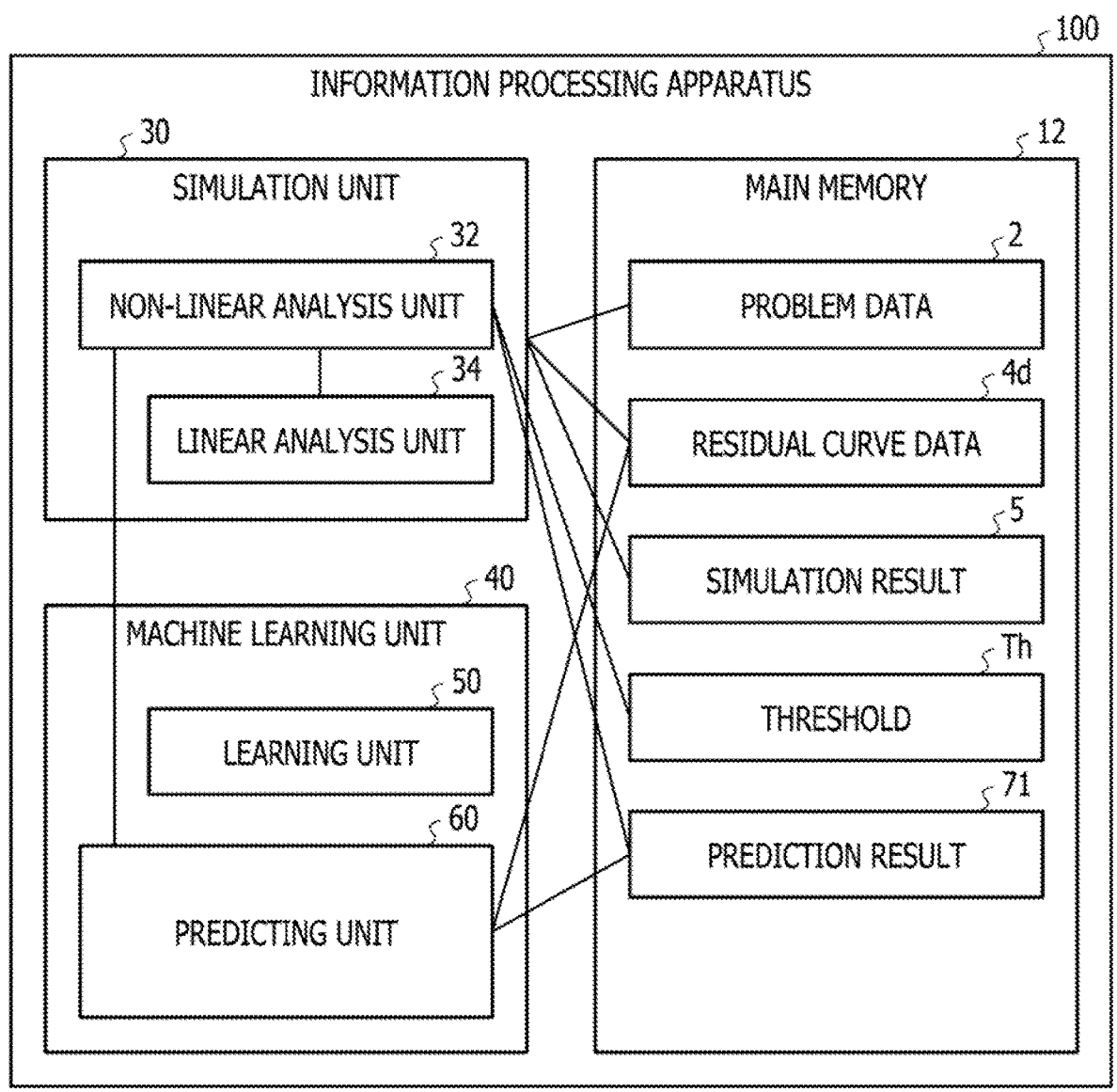
FIG. 27 is a diagram for explaining an outline of a predicting unit in the second functional configuration example of the information processing apparatus according to the second embodiment.

FIG. 27 is a diagram for explaining an outline of the predicting unit in the second functional configuration example of the information processing apparatus according to the second embodiment. In FIG. 27, in the information processing apparatus 100, mainly the simulation unit 30 and the predicting unit 60 of the machine learning unit 40 operate at the time of prediction. The main memory 12 stores the problem data 2, the residual curve data 4d, the threshold Th, the prediction result 71, and the like. Part of the main memory 12 is utilized as a shared memory 12a as described in the first embodiment. The predicting unit 60 is described here.

The simulation unit 30 outputs the residual curve data 4d. In response to an adjustment request from the non-linear analysis unit 32 of the simulation unit 30, the predicting unit 60 predicts an increase or decrease of the threshold Th from the trained NN 270 using the residual curve data 4d obtained by the simulation unit 30, and outputs the obtained prediction result 71. The non-linear analysis unit 32 is notified of the prediction result 71 as a return value.

When the trained NN 270 is used, in response to an adjustment request from the non-linear analysis unit 32 of the simulation unit 30, the predicting unit 60 predicts an increase or decrease of the threshold Th with the trained NN 270 using the residual curve data 4d obtained by the simulation unit 30, and outputs the obtained prediction result 71. The non-linear analysis unit 32 is notified of the prediction result 71 as a return value.

Figure 28B:
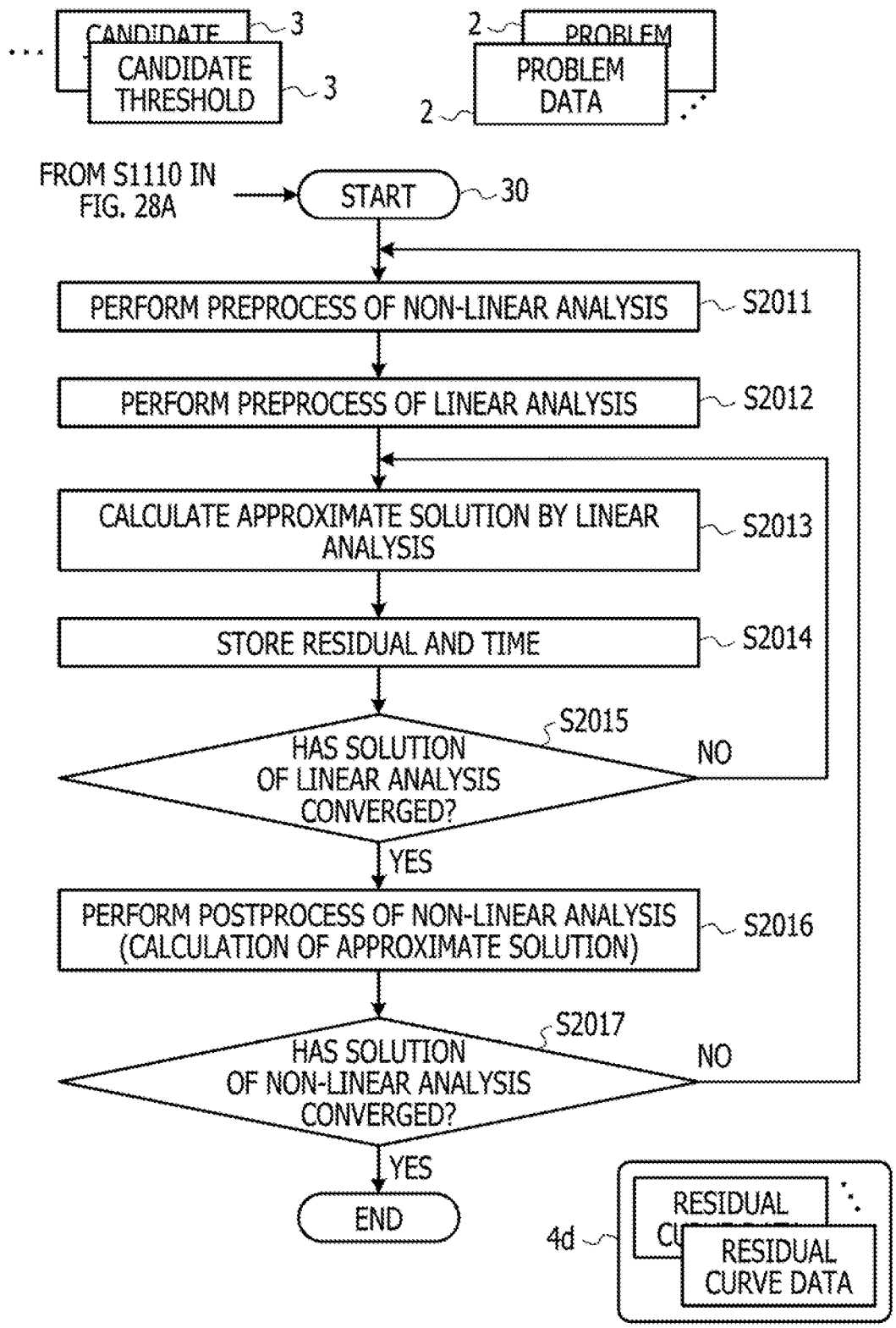
FIG. 28B is a flowchart for explaining a first example of a learning process in the second functional configuration example.

FIGS. 28A and 28B are a flowchart for explaining a first example of a learning process in the second functional configuration example. In FIG. 28A, the same contents as those in FIG. 24A are denoted by the same step number, and description of these is omitted. In FIG. 28A, in the machine learning unit 40, the learning unit 50 gives a plurality of candidate thresholds 3 in order to the simulation unit 30, which is then caused to perform the simulation to acquire residual curve data 4d for each candidate threshold 3 (step S1110). The residual curve data 4d contains a residual and execution time of the simulation for each iteration of the linear analysis.

Upon acquisition of the residual curve data 4d, the learning unit 50 identify a candidate threshold 3 that ended the simulation in the shortest time from among the plurality of residual curve data 4d (step S1120). The learning unit 50 sets the identified candidate threshold 3 as the reference threshold 3ref, and determines a label for the residual curve data 4d based on a magnitude relation between the reference threshold 3ref and the candidate threshold 3 (step S1131).

The learning unit 50 generates a plurality of input data 6a by segmenting the residual curve into certain segments and applies the label determined in step S1130 to each of the plurality of generated input data 6a to generate learning data 6g (step S1140).

The learning unit 50 learns the NN 270 using the generated learning data 6g (step S1150). After ending the learning using different learning data 6g of the candidate thresholds 3 for a plurality of problem data 2, the learning unit 50 ends this learning process.

The processing in the simulation unit 30 as shown FIG. 28B is the same as that in the first functional configuration example (FIG. 24B), and description of this is omitted.

Figure 29:
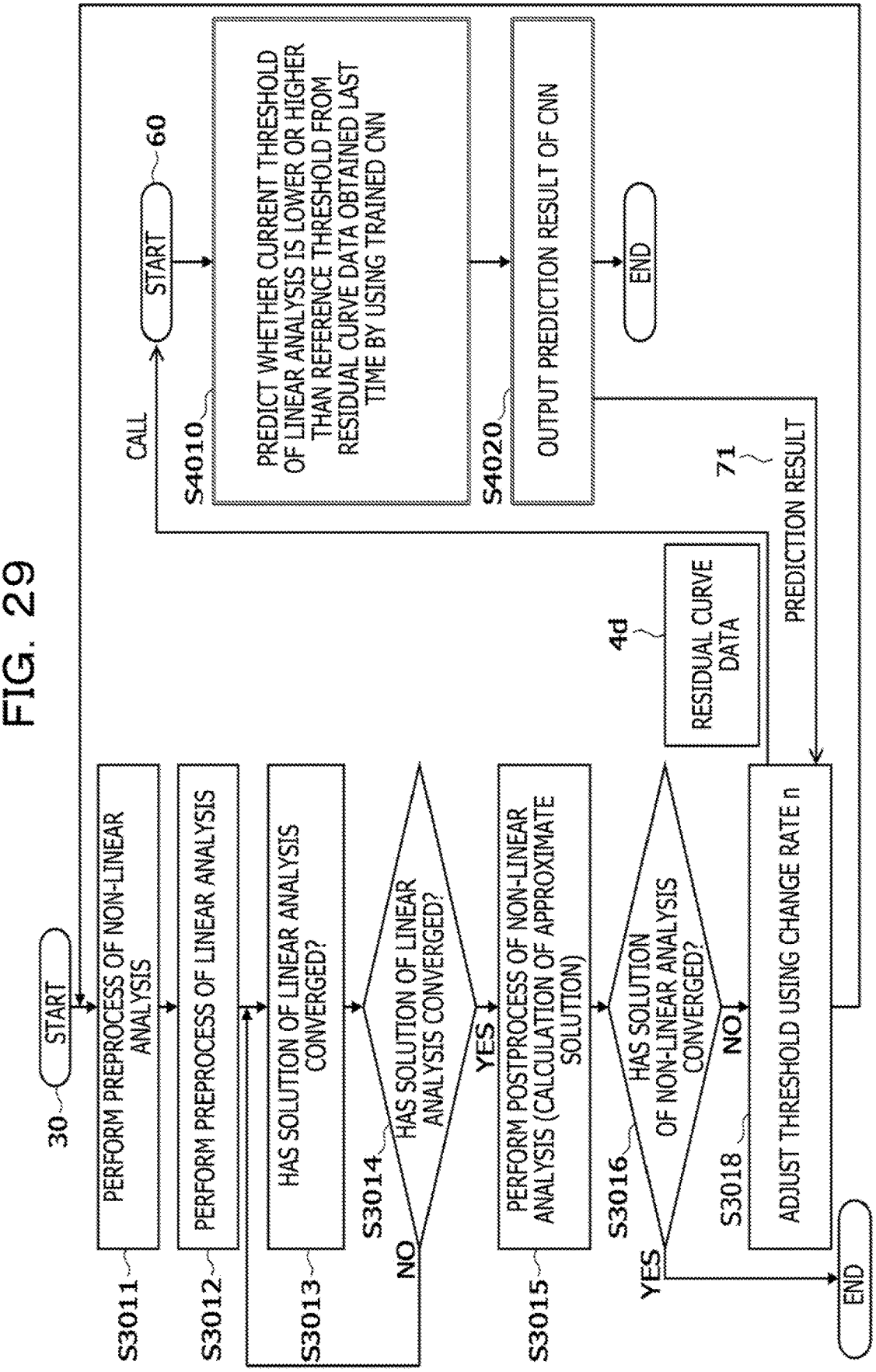
FIG. 29 is a flowchart for explaining a predicting process in the second functional configuration example.

FIG. 29 is a flowchart for explaining the predicting process in the second functional configuration example. In FIG. 29, the same contents as those in FIG. 25 are denoted by the same step numbers, and description of these is omitted. In the second functional configuration example, an example of adjustment of the threshold Th by the simulation unit 30 using the prediction result 71 is described. The processing in the predicting unit 60 is the same as that in the first functional configuration example, description of this is omitted.

In FIG. 29, the non-linear analysis unit 32 designates the residual curve data 4d and performs an adjustment request to an adjusting unit 60 to adjust the threshold Th with a change rate of n or 1/n of the residual threshold of the linear analysis in accordance with the prediction result 71 obtained from the adjusting unit 60 (step S3018), and returns to step S3011 and repeats the above-described processing.

In step S3018, for example, in a case of where the prediction result 71 indicates increasing the threshold Th using the change rate n (n is a natural number of 2 or more), the non-linear analysis unit 32 multiplies the threshold Th by n. On the other hand, the threshold Th is to be decreased, the non-linear analysis unit 32 multiplies the threshold Th by 1/n (multiplies the threshold Th by a reciprocal of the change rate). As another example, in a case where the prediction result 71 does not indicate increasing the threshold Th, the threshold Th may be multiplied by 1/n.

Figure 30A:
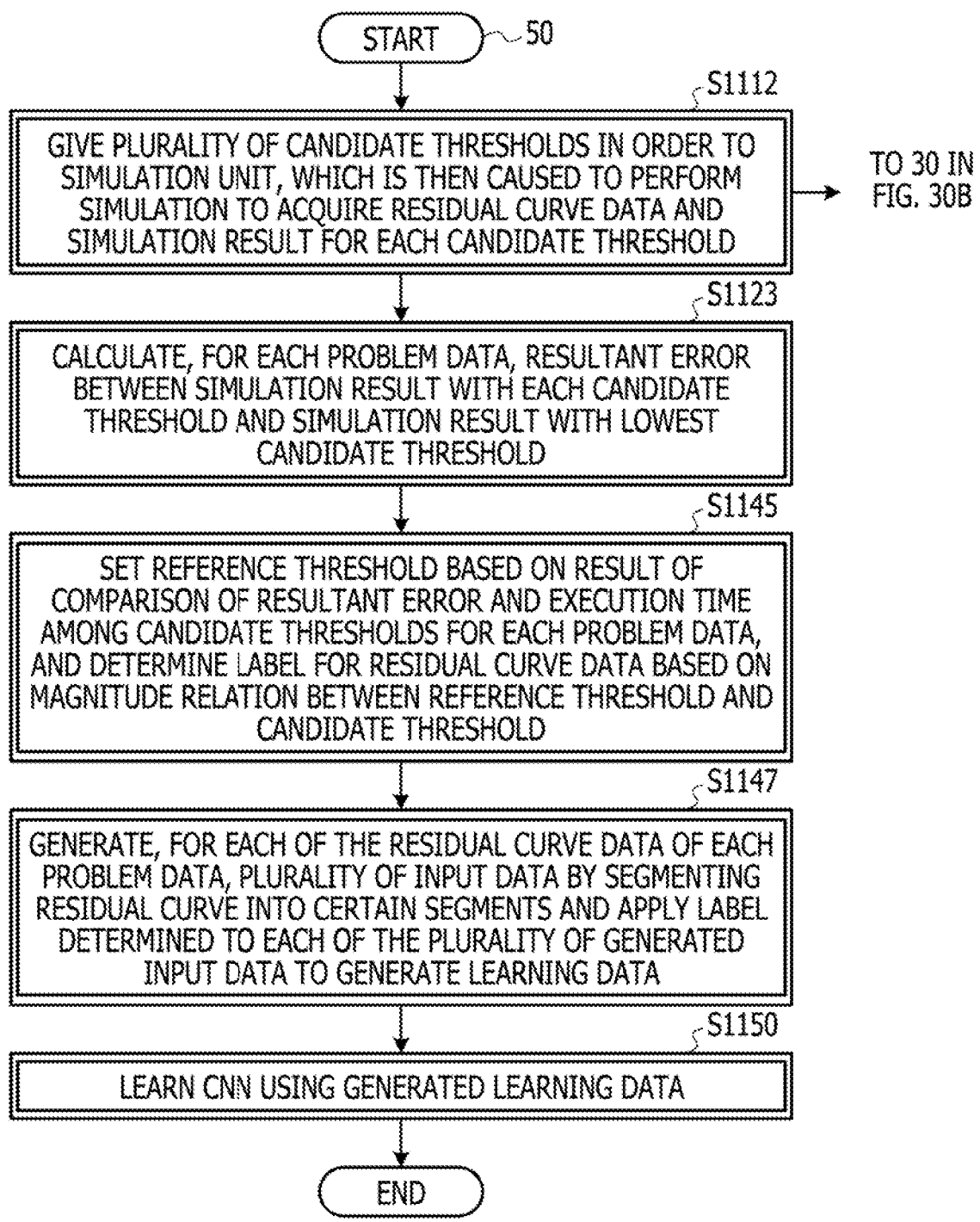
FIG. 30A is a flowchart for explaining a second example of the learning process in the second functional configuration example.
Figure 30B:
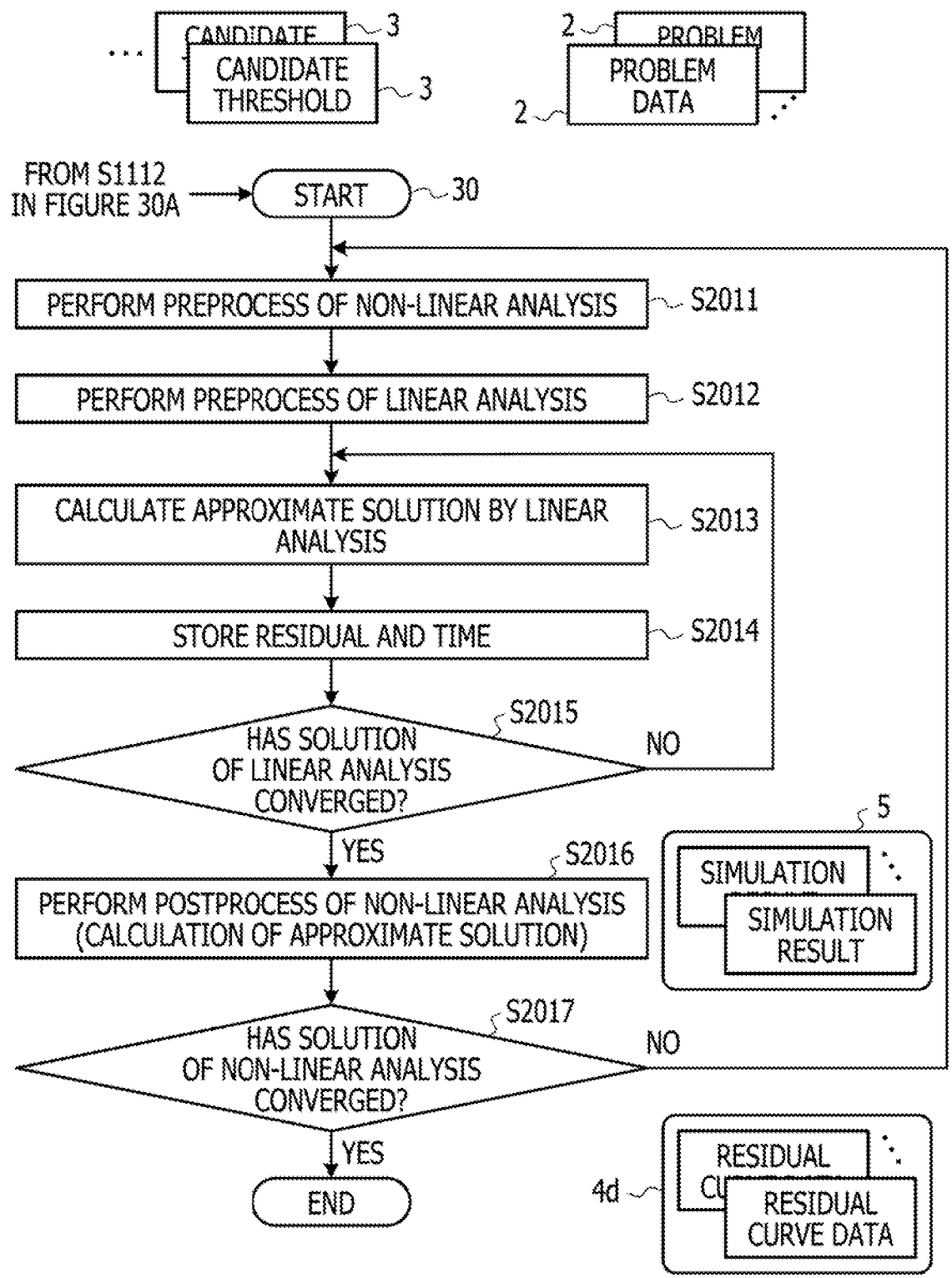
FIG. 30B is a flowchart for explaining a second example of the learning process in the second functional configuration example.

FIGS. 30A and 30B are a flowchart for explaining a second example of the learning process in the second functional configuration example. In FIG. 30A, the same contents as those in FIG. 28A are denoted by the same step numbers, and description of these is omitted. In the second example of the learning process, the reference threshold 3ref is not specified from the candidate thresholds 3, but the reference threshold 3ref is generated from comparison between simulation results 5 of a plurality of candidate thresholds 3 for each problem data 2.

In FIG. 30A, in the machine learning unit 40, the learning unit 50 gives a plurality of candidate thresholds 3 in order to the simulation unit 30, which is then caused to perform the simulation to acquire residual curve data 4d and a simulation result 5 for each candidate threshold 3 (step S1112). The residual curve data 4d contains a residual and execution time of the simulation for each iteration of the linear analysis.

The learning unit 50 calculates, for each problem data 2, a resultant error between the simulation result 5 with each candidate threshold 3 and the simulation result 5 with the lowest candidate threshold 3 (step S1123). As an example of calculating a resultant error, the learning unit 50 calculates the difference between the value of each element of the simulation result 5 and the value of an element with the lowest candidate threshold 3 in the same problem to calculate a mean absolute error (MAE), obtaining a resultant error.

The learning unit 50 sets the reference threshold 3ref based on the result of comparison of the resultant error and the execution time among the candidate thresholds 3 for each problem data 2, and determines a label for the residual curve data 4d based on a magnitude relation between the reference threshold 3ref and the candidate threshold 3 (step S1145). As an example of the method of determining the reference threshold 3ref, the learning unit 50 refers to both of the resultant error (for example, accuracy) and the execution time (for example, speed), and obtains a candidate threshold 3 that is closest to predetermined conditions. As an example of the conditions, a candidate threshold 3 that is fastest among those with accuracies satisfying the user's use may be set as the reference threshold 3ref. Alternatively, a candidate threshold 3 that has the smallest product of the resultant error and the execution time may be used as the reference threshold 3ref.

The learning unit 50 generates, for each of the residual curve data 4d of each problem data 2, a plurality of input data 6a by segmenting the residual curve into certain segments and applies the label determined in step S1146 to each of the plurality of generated input data 6a to generate learning data 6g (step S1147). The learning unit 50 then learns the NN 270 using the generated learning data 6g (step S1150).

The processing in the simulation unit 30 as shown FIG. 30B is the same as that in the first functional configuration example (FIG. 28B or 28B), and description of this is omitted.

Figure 31:
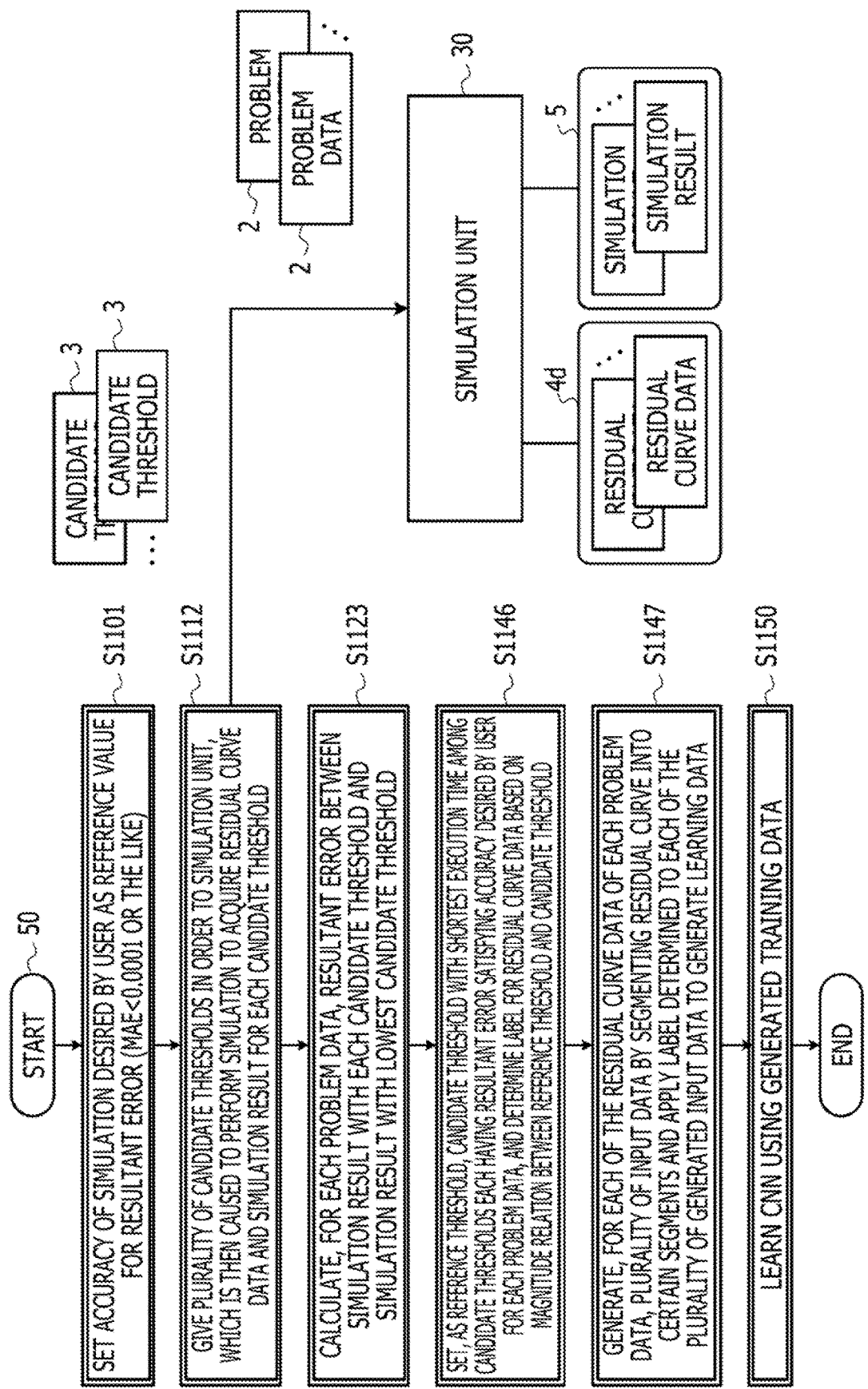
FIG. 31 is a flowchart for explaining a third example of the learning process in the second functional configuration example.

FIG. 31 is a flowchart for explaining a third example of the learning process in the second functional configuration example. In FIG. 31, the same contents as those in FIG. 30 are denoted by the same step numbers, and description of these is omitted. In the third example of the learning process, the reference threshold 3ref is specified from candidate thresholds 3 in consideration of the accuracy of the simulation desired by the user. Since the processing of the simulation unit 30 is the same as that in FIG. 30, the processing is simplified and description of this is omitted.

In FIG. 30A, in the machine learning unit 40, the accuracy of the simulation desired by the user is set as a reference value for the resultant error (step S1150). An example is MAE<0.0001 or the like. For this reason, step S1146 is performed in place of step S1145 in FIG. 30A.

In step S1146, the learning unit 50 sets, as the reference threshold 3ref, a candidate threshold 3 with the shortest execution time among candidate thresholds 3 each having a resultant error satisfying an accuracy desired by the user for each problem data 2, and determines a label for the residual curve data based on a magnitude relation between the reference threshold 3ref and the candidate threshold 3. Hereinafter, since steps S1147 and S1150 are the same as those in FIG. 30A, description of these is omitted.

As a learning environment in the above-described first embodiment and second embodiment,

NN 270

As an example, CNN may be constructed using AlexNet.

AI framework

Keras or the like may be used as TensorFlow and API to TensorFlow. In the information processing apparatus 100 having such a learning environment, an approach of dynamically adjusting the threshold Th for linear analysis, which has been developed by the present inventors, was applied to the simulation. Various pieces of information obtained as a result of the application of the approach are presented below.

Figure 32:
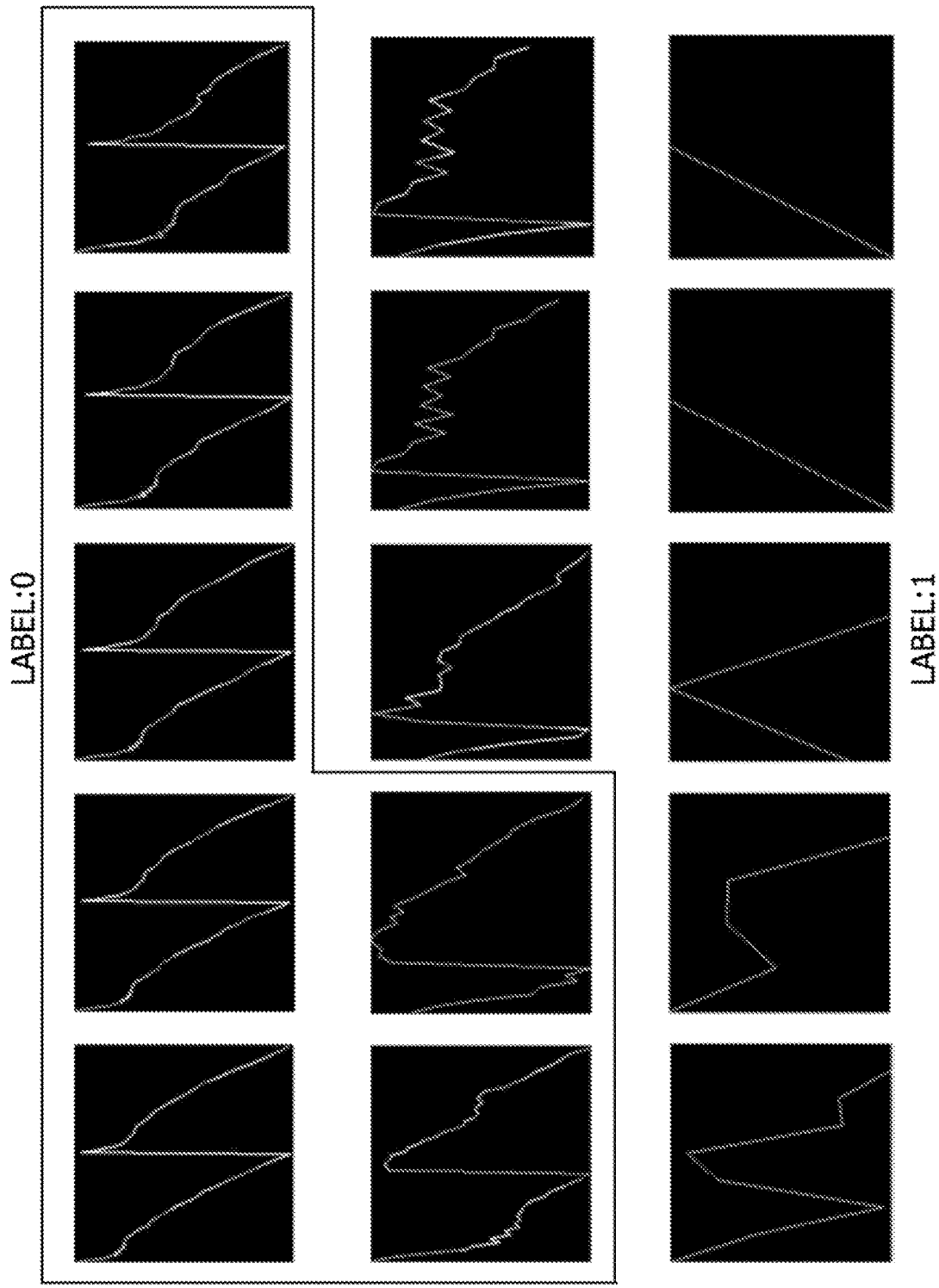
FIG. 32 is a diagram illustrating a learning result for each candidate threshold in the first example of the learning process.
Figure 33B:
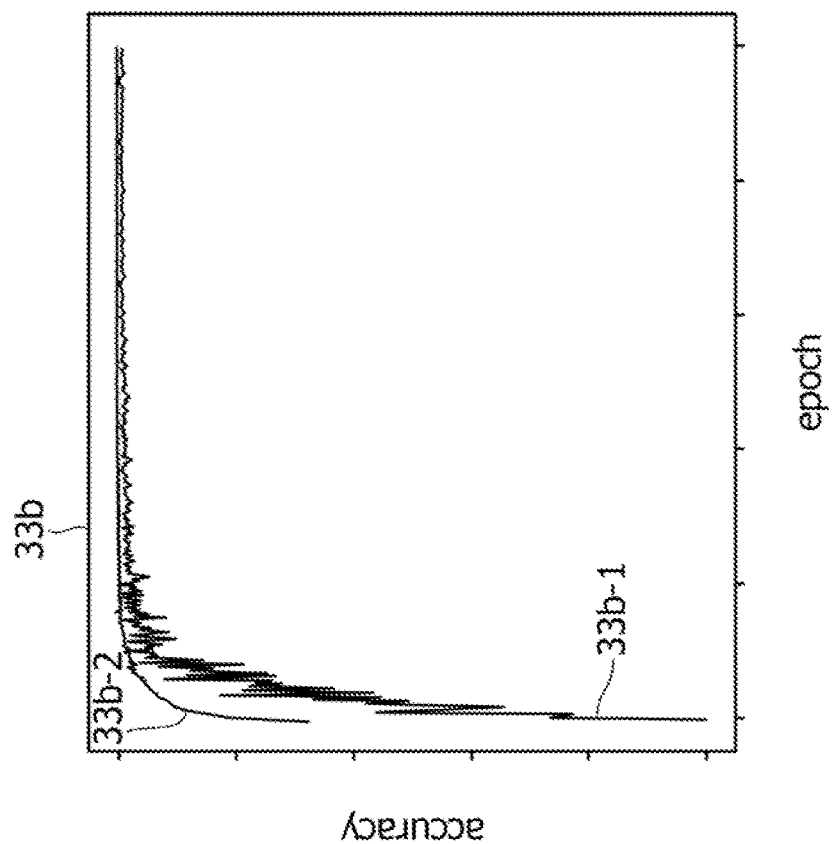
FIG. 33B is diagram illustrating learning results based on labeling in FIG. 32.
Figure 33A:
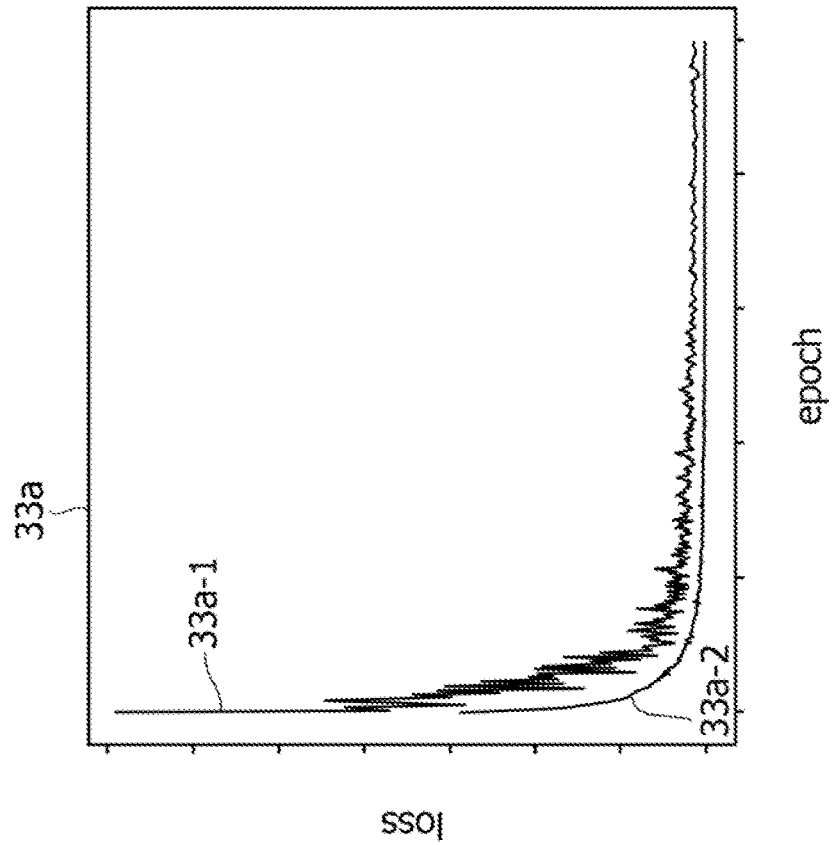
FIG. 33A is diagram illustrating learning results based on labeling in FIG. 32.

Next, learning results of the first example of the learning process in the second functional configuration example are illustrated in FIGS. 32, 33A and 33B. FIG. 32 is a diagram illustrating a learning result for each candidate threshold in the first example of the learning process. In this example, 15 candidate thresholds 3 within a residual threshold range for the linear analysis described in FIG. 23 are used.

FIG. 32 illustrates a residual curve for every 2 convergences of a linear residual curve for each of the candidate thresholds 3. The label "0" is set for candidate thresholds 3 smaller than the reference threshold 3ref, and the label "1" is set for the other candidate thresholds 3.

The learning results in the case where learning data 6g labeled as described above was used are illustrated in FIGS. 33A and 33B. FIGS. 33A and 33B are diagram illustrating learning results based on the labeling in FIG. 32.

From the check as described above, in a loss graph 33a illustrated in FIG. 33A, a learning loss value 33a-1 and a checking loss value 33a-2 are indicated while in an accuracy graph 33b illustrated in FIG. 33B, a learning accuracy value 33b-1 and a checking accuracy value 33b-2 are indicated. The loss is improved rapidly when the epoch is small, and the same tendency as that in the learning is indicated also in the data for checking. The accuracy is improved rapidly when the epoch is small, and the same tendency as that in the learning is indicated also in the data for checking. It is said that appropriate learning was performed.

Figure 35B:
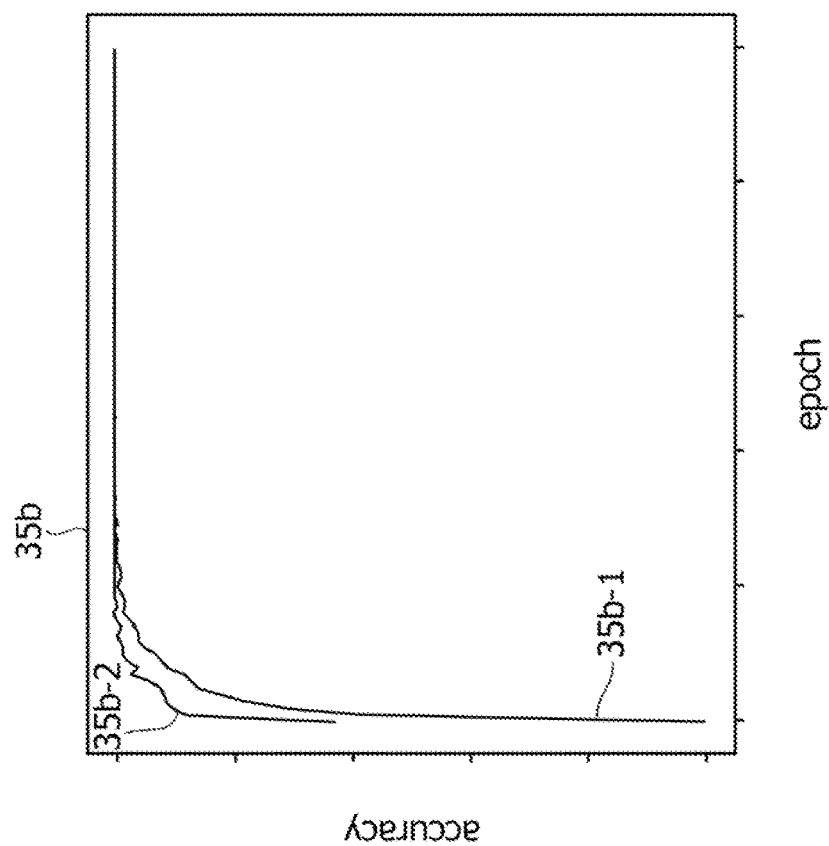
FIG. 35B is diagram illustrating learning results based on labeling in FIG. 34.
Figure 35A:
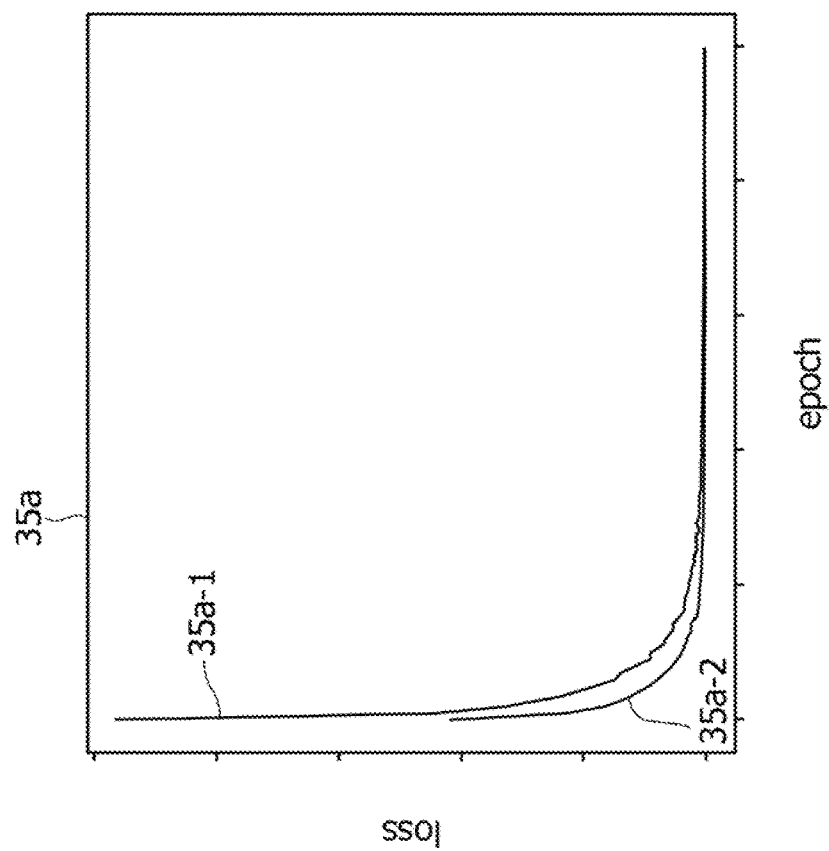
FIG. 35A is diagram illustrating learning results based on labeling in FIG. 34.

Next, learning results of the second example of the learning process in the second functional configuration example are illustrated in FIGS. 34, 35A and 35B. FIG. 34 is a diagram illustrating a learning result for each candidate threshold in the second example of the learning process. In this example, 15 candidate thresholds 3 for the residual threshold of the linear analysis are used.

FIG. 34 illustrates a residual curve for every 2 convergences of a linear residual curve for each of the candidate thresholds 3. A structural analysis model using CG and the algebraic multigrid (AMG) are used. The label "0" is set for candidate thresholds 3 that have sufficient accuracy of the simulation result and are smaller than the candidate threshold 3 at the fastest speed, the label "1" is set for the other candidate thresholds 3.

The learning results in the case where learning data 6g labeled as described above was used are illustrated in FIGS. 35A and 35B. FIGS. 35A and 35B are diagram illustrating learning results based on the labeling in FIG. 34.

From the checking as described above, a loss graph 35a illustrated in FIG. 35A and an accuracy graph 35b illustrated in FIG. 35B are obtained. In the loss graph 35a illustrated in FIG. 35A, a learning loss value 35a-1 and a checking loss value 35a-2 are indicated while in the accuracy graph 35b illustrated in FIG. 35B, a learning accuracy value 35b-1 and a checking accuracy value 35b-2 are indicated. The loss is improved rapidly when the epoch is small, and the same tendency as that in the learning is indicated also in the data for checking. The accuracy is improved rapidly when the epoch is small, and the same tendency as that in the learning is indicated also in the data for checking. In the second example of the learning process, for example, the checking loss value 35a-2 and the checking accuracy value 35b-2 are transitioned very smoothly, so it may be said that the learning process was performed with higher accuracy than that of the first example of the learning process.

A result of comparing and checking the first example of the learning process and the second example of the learning process in the second embodiment is described below. The checking environment is as described below.

Interval at which to call the learning unit 50 (AI unit): each 2 non-linear loops.

Trained Model:

Labeling in the first example:

The label 0 is set when the residual threshold for the linear analysis is smaller than that of the candidate threshold 3 at the fastest speed.

The label 1 is set in the other cases.

Labeling in the second example:

Label 0 is set for candidate thresholds that have sufficient accuracy of the simulation result and are smaller than the candidate threshold is smaller than the candidate threshold 3 at the fastest speed.

The label 1 is set in the other cases.

Change rate of the residual threshold of the linear analysis: the results from 2 times or 1/2 times are described.

FIG. 36 is a diagram for explaining examples of generating learning data. In FIG. 36, in the second embodiment, the learning unit 50 segments each of the residual curve data 4d-1 and 4d-2 into certain segments to generate input data 6a.

Examples are illustrated in each of which the label "1" is applied to all the input data 6a in a case where the candidate threshold 3 of the residual curve data 4d is larger than or equal to the reference threshold 3ref, and the label "0" is applied in the other cases. As an example, 12 learning data 6g are supposed to be generated for one residual curve data 4d.

The learning unit 50 learns the NN 270 using a plurality of learning data 6g to which the same label is attached for one residual curve data 4d. The error is fed back to the NN 270. Since the second embodiment is capable of obtaining a plurality of learning data 6g with the same label from one residual curve data 4d, it is possible to cause the NN 270 to learn the label "1 or "0" with high accuracy. For this reason, it is possible in the predicting unit 60 to appropriately change the threshold Th to an optimum value to shorten the simulation time.

The result of checking the execution time of the simulation and the accuracy of the simulation result 5 is illustrated below.

Figure 37:
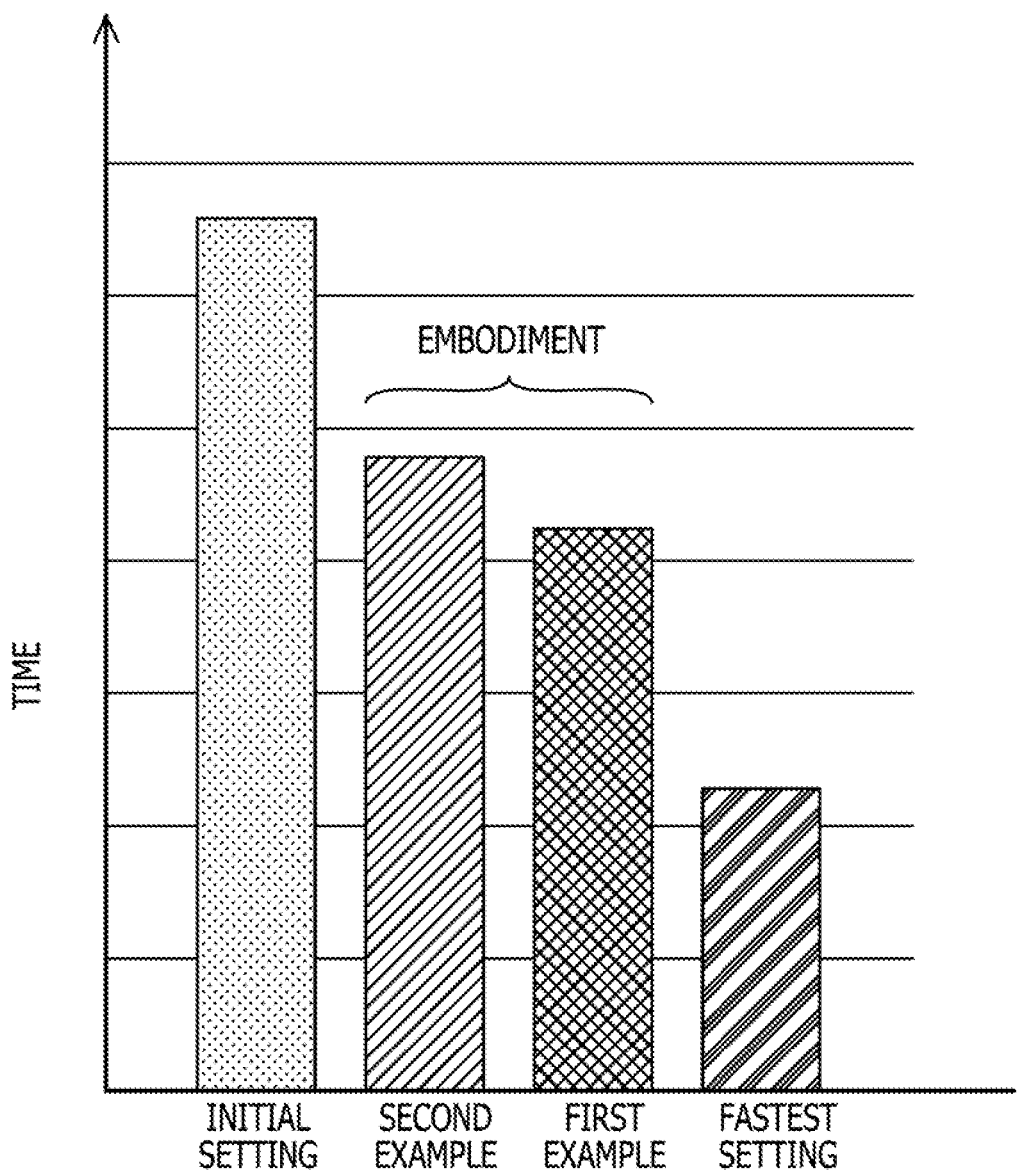
FIG. 37 is a diagram illustrating a result of checking the execution time.

FIG. 37 is a diagram illustrating the result of checking the execution time. In FIG. 37, the vertical axis indicates time (second), and from the left, the execution times of the case where the simulation is executed with a defined value "1.0e-08" used for the initial setting, the case of the second example, the case of the first example, and the case where the simulation is executed with the threshold when the execution time is fastest as illustrated in FIG. 23 are illustrated.

The execution time becomes lower in the order from the initial setting, the second example, the first example, and the fastest setting. Although the fastest setting results in the shortest execution time, the second example and the first example have achieved an increase in speed relative to the initial setting resulting in the longest execution time.

Figure 38:
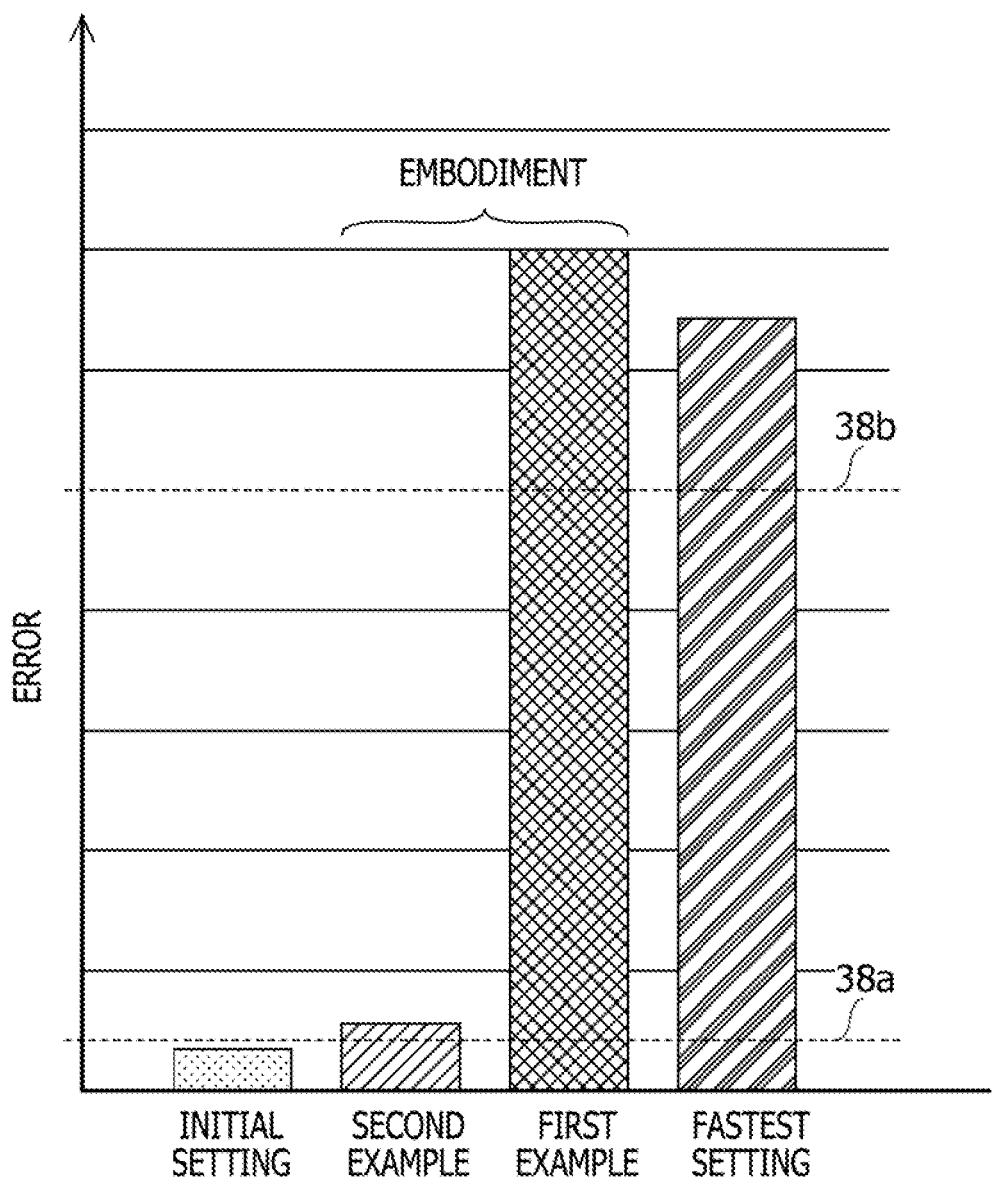
FIG. 38 is a diagram illustrating a result of checking simulation results.

FIG. 38 is a diagram illustrating the result of checking simulation results. In FIG. 38, the vertical axis indicates errors in simulation results, and like FIG. 37, the errors are indicated in the order from the initial setting, the second example, the first example, and the fastest setting.

The initial setting reaches the standard 38a, or the significant figure coincides in average of 4 digits. The second example exhibits an error larger than the standard 38a, but exhibits an accuracy close to the standard 38a. On the other hand, the accuracies of the first example and the fastest setting have significant figures that are larger than the standard 38b of coinciding in average of 3 digits, but exhibit errors substantially equal to that of the standard 38b.

From the above-described checking, it may be said that the first example and the second example achieve maintaining accuracies while improving execution speeds from the viewpoint of attempting an increase in speed while maintaining the accuracy of the simulation result 5.

Figure 39:
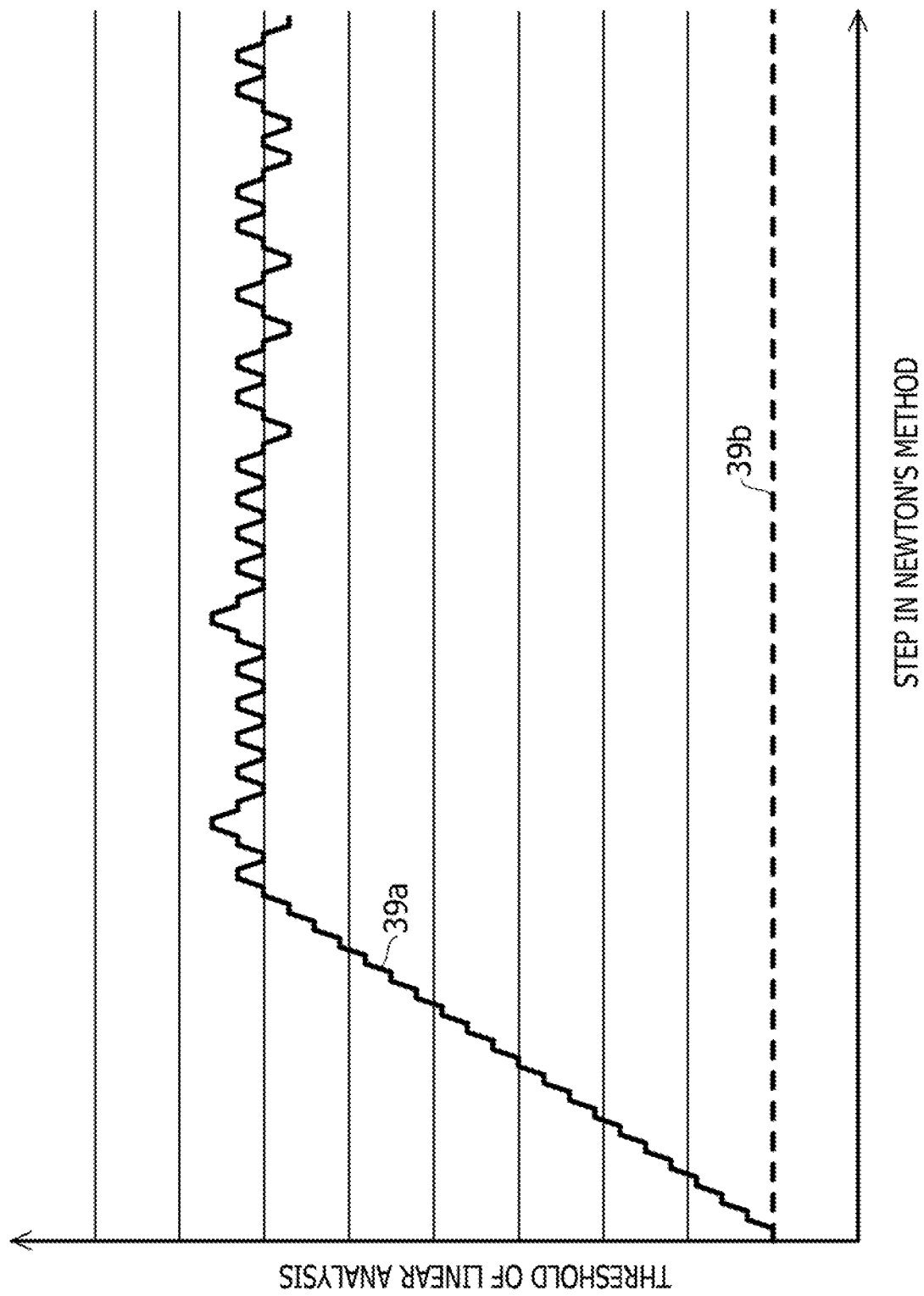
FIG. 39 is a diagram illustrating examples of changes in threshold.

FIG. 39 is a diagram illustrating examples of changes in threshold. In FIG. 39, the vertical axis indicates a threshold of the linear analysis and the horizontal axis indicates the number of steps in the Newton's method. FIG. 39 illustrates a threshold change 39a of the simulation according to the present embodiment and a threshold change 39b of the existing simulation not using the present embodiment for every predetermined steps.

The simulation according to the present embodiment corresponds to the simulation performed by the information processing apparatus 100 having the functional configurations illustrated in the first embodiment and the second embodiment. The step corresponds to a step in a linear solver based on the Newton's method and the predetermined steps are 2 steps in this example.

It is seen from FIG. 39 that the threshold change 39a in the information processing apparatus 100 is such that the threshold Th Is set to the initial value in step 1, increases until step 41, and thereafter dynamically changes while the linear analysis is performed. On the other hand, the threshold change 39b of the existing simulation indicates the state of maintaining the initial value.

Figure 40:
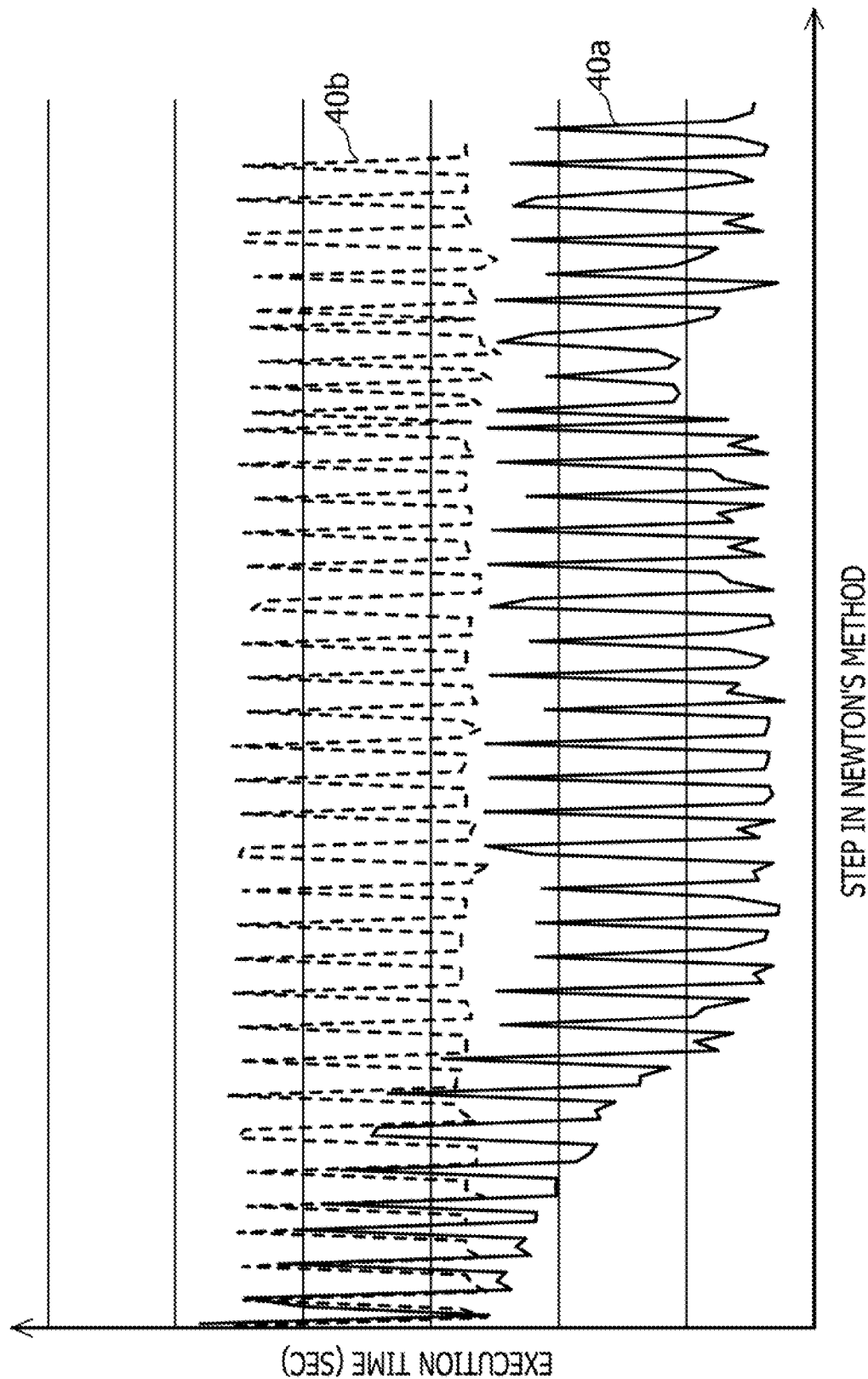
FIG. 40 is a diagram illustrating an example of processing time transition.

FIG. 40 is a diagram illustrating an example of processing time transition. In FIG. 40, the vertical axis indicates the execution time and the horizontal axis indicates the number of steps in the Newton's method. The execution time indicates a time taken for 1 step in the Newton's method. FIG. 40 illustrates the processing time transition 40a according to the present embodiment and the existing processing time transition 40b not using the present embodiment as measured for each step.

The existing processing time transition 40b is such that the execution time repeatedly transitions within a certain variation range. On the other hand, the processing time transition 40a according to the present embodiment is such that the execution time decreases every time the step is iterated, and approximately after 35 steps, the execution time repeatedly transitions within a certain variation range. The variation range of the processing time transition 40a according to the present embodiment is apparently faster range than the variation range of the existing processing time transition 40b.

FIG. 41 is a diagram illustrating an example of transition of the number of iterations. In FIG. 41, the vertical axis indicates the number of iterations of the linear analysis and the horizontal axis indicates the number of steps in the Newton's method. FIG. 41 illustrates transition of the number of iterations 41a of the linear analysis in the simulation of the present embodiment and transition of the number of iterations 41b of the linear analysis in the existing simulation not using the present embodiment.

The transition of the number of iterations 41b is such that even when the number of steps increases the linear analysis is performed for substantially the same number of iterations, and in this example, the linear analysis is not converged to 60 times or less. On the other hand, the transition of the number of iterations 41a continues to decrease, and transitions while varying between certain numbers of iterations.

The above-described checking according to the second embodiment is illustrated as an example using the following languages and libraries.

Simulation Unit 30

FrontISTR, which is structural analysis open source software (OSS), is used.

Machine Learning Unit 40

A general-purpose script language, such as Python, which is capable of being incorporated in many applications, may be used as the main program of the learning unit 50 and the predicting unit 60.

As the program that performs AI prediction (corresponding to the NN 270) to be called from the learning unit 50 and the predicting unit 60, TensorFlow, which is a machine learning library, may be used, and an API of Keras, which is capable of easily calling TensorFlow, may be used.

As described above, the simulation unit 30 and the machine learning unit 40 have different structures of program languages. The passage of data between the simulation unit 30 and the machine learning unit 40 may be performed through the existing disk 13 (FIG. 1), and accordingly the implementation of the first embodiment does not have to be employed. However, as illustrated in FIGS. 37 and 38, the execution speed and the accuracy of the simulation result 5 are in a trade-off relationship. From the viewpoint of increasing the speed while maintaining the accuracy of the simulation, it is more preferable to implement the inter-process communication as described in the first embodiment.

In the second embodiment using the above-described languages and libraries, when the simulation is executed, an execution log as illustrated in FIG. 42 is obtained. FIG. 42 is a diagram illustrating an example of the execution log in the second embodiment.

The execution log 4a Illustrated in FIG. 42 corresponds to a log outputted when the simulation unit 30 programmed with FrontISTR is executed. In the execution log 4a, a processor that executes the AI process corresponding to the NN 270 is called by a log statement 42a. The processor is indicated by the product name of the GPU 14 or the like. In a log statement 42b, the AI framework is called, and in this example, it is indicated that Tensorflow is called.

From log statements 42c and 42d, it is understood that the residual threshold Th is changed substantially 1e-08 to substantially 2e-08. In the existing simulation not employing the second embodiment, the threshold Th does not vary in this way. For example, when the threshold h is 1e-08, a log indicating 1e-08 all the time is recorded.

In the information processing apparatus 100 which implements the first embodiment and the second embodiment, as a program for performing the AI process, if the main program is Python, setting files, such as python_main_path=/path/to/ai_main.py, are generated and stored in a specific storage area. In this specific storage area, when a trained AI model is generated, setting files, such as trained_model_path=/path/to/trained_model.h5, are generated and stored, for example, so as to be utilized by the predicting unit 60.

In the above description, the residual curve is an example of data representing the residual transition, the execution time is an example of the calculation time of the simulation, and the NN 270 is an example of a prediction model.

The present disclosure is not limited to the specifically disclosed embodiment, and various modifications and variations are possible without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method comprising:
    executing a first process of performing a non-linear analysis by iterating a linear analysis;
    executing a second process of predicting a residual threshold to be used for determination of convergence of the linear analysis by a prediction model, based on a residual transition and calculation time for each iteration of the linear analysis obtained for each residual threshold using a plurality of experimental values by the first process; and
    performing passage of data between the first process and the second process through an inter-process communication using a shared memory set in a memory;
    the first process includes:
    storing, in the shared memory, the residual transition and the calculation time for each iteration of the linear analysis, sets an address in a first named pipe, and
    acquiring a prediction result of the prediction model written in the second process from a second named pipe; and
    the second process includes:
    acquiring the residual transition and the calculation time from the address set in the first named pipe in the shared memory;
    causing the prediction model to perform learning of predicting the residual threshold from a reference threshold and the residual transition, the reference threshold being determined from the residual transition and the calculation time, and writes the prediction result outputted by the prediction model into the second named pipe;

setting the experimental value used when the calculation time is shortest to the reference threshold;

labeling the residual transition in accordance with a result of comparing the reference threshold and the experimental value used for each residual transition to generate learning data; and performing the prediction model using the learning data.

2. The information processing method according to claim 1, wherein the second process further includes:

setting the experimental value used when the calculation time is shortest to the reference threshold;

determining a label for the residual transition in accordance with a result of comparing the reference threshold and the experimental value used for each residual transition;

generating a plurality of input data by segmenting the residual transition into certain segments and applies the determined label to each of the plurality of input data to generate a plurality of learning data; and performing the prediction model on each of the plurality of learning data.

3. The information processing method according to claim 1, wherein the second process includes:

specifying the experimental value used when the calculation time is shortest for each problem data of the non-linear analysis, calculates a resultant error between a first result obtained in the first process using the specified experimental value and each of second results obtained in the first process using the other experimental values;

setting the reference threshold based on a result of comparing the resultant error and the execution time for each experimental value for each problem data, determining a label for the residual transition in accordance with a result of comparing the reference threshold and the experimental value used for each residual transition;

generating a plurality of input data by segmenting the residual transition into certain segments and applies the determined label to each of the plurality of input data to generate a plurality of learning data; and performing the prediction model on each of the plurality of learning data.

4. The information processing method according to claim 1, wherein the second process includes acquiring the prediction result obtained by causing the trained model to predict the residual threshold using the residual transition obtained by the first process in response to a call from the first process, and writes the prediction result in the second named pipe as a return value to the first process, and the first process further includes reading the prediction result from the second named pipe, and updates the residual threshold using the read prediction result and a predetermined change rate.

5. The information processing method according to claim 1, wherein the first process includes:

coupling to the first named pipe and waiting for first unlocking from the second process;

in response to detection of the first unlocking, writing non-linear analysis data obtained by the non-linear analysis and linear analysis data obtained by the linear analysis into the shared memory;

writing the number of iterations of the non-linear analysis and the number of iterations of the linear analysis into the shared memory;

coupling to the second named pipe and waits for second unlocking from the second process; and in response to the second unlocking, acquiring the prediction result from the second named pipe.

6. The information processing method according to claim 5, wherein the second process further includes:

coupling to the first named pipe and unlocking the first named pipe;

in response to a request from the first process, reading the linear analysis data and the non-linear analysis data from the shared memory, acquiring the residual transition and the calculation time from each of the linear analysis data and the non-linear analysis data, and causing the trained prediction model to predict the residual threshold; and coupling to the second named pipe and writing a prediction result by the trained prediction model into the second named pipe, and unlocks the second named pipe.

7. An information processing apparatus, comprising:

a memory; and one or a plurality of processors coupled to the memory, the one or the plurality of processors:

execute a first process of performing a non-linear analysis by iterating a linear analysis;

execute a second process of predicting a residual threshold to be used for determination of convergence of the linear analysis by a prediction model, based on a residual transition and calculation time for each iteration of the linear analysis obtained for each residual threshold using a plurality of experimental values by the first process; and perform passage of data between the first process and the second process through an inter-process communication using a shared memory set in the memory, the first process includes:

storing, in the shared memory, the residual transition and the calculation time for each iteration of the linear analysis, sets an address in a first named pipe; and acquiring a prediction result of the prediction model written in the second process from a second named pipe, and the second process includes:

acquiring the residual transition and the calculation time from the address set in the first named pipe in the shared memory;

causing the prediction model to perform learning of predicting the residual threshold from a reference threshold and the residual transition, the reference threshold being determined from the residual transition and the calculation time, and writing the prediction result outputted by the prediction model into the second named pipe;

setting the experimental value used when the calculation time is shortest to the reference threshold;

labeling the residual transition in accordance with a result of comparing the reference threshold and the experimental value used for each residual transition to generate learning data; and performing the prediction model using the learning data.

* * * * *